US010866706B2

(12) United States Patent
Keam et al.

(10) Patent No.: US 10,866,706 B2
(45) Date of Patent: Dec. 15, 2020

(54) ELECTRONIC DEVICE FOR DISPLAYING APPLICATION AND OPERATING METHOD THEREOF

(71) Applicant: Samsung Electronics Co., Ltd., Suwon-si (KR)

(72) Inventors: Byeongkuk Keam, Suwon-si (KR); Seungkyu Lee, Seoul (KR); Hoyoung Lee, Suwon-si (KR); Won Jin Choi, Yongin-si (KR); Yujin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 16/108,478

(22) Filed: Aug. 22, 2018

(65) Prior Publication Data
US 2019/0065018 A1 Feb. 28, 2019

(30) Foreign Application Priority Data

Aug. 23, 2017 (KR) .................. 10-2017-0106445

(51) Int. Cl.
*G06F 3/0484* (2013.01)
*G06F 3/147* (2006.01)
(Continued)

(52) U.S. Cl.
CPC ............ *G06F 3/0484* (2013.01); *G06F 3/041* (2013.01); *G06F 3/14* (2013.01); *G06F 3/147* (2013.01);
(Continued)

(58) Field of Classification Search
CPC ..... H04N 21/4122; G06F 3/1454; G06F 3/14; G06F 3/04886; G06F 3/017;
(Continued)

(56) References Cited

U.S. PATENT DOCUMENTS 10,509,614 B2 12/2019 Urata et al.
10,516,576 B2 12/2019 Matsumoto et al.
(Continued)

FOREIGN PATENT DOCUMENTS

CN 103677257 A 3/2014
CN 104796862 A 7/2015
(Continued)

OTHER PUBLICATIONS

European Search Report dated Mar. 19, 2019, issued in European Patent Application No. 18190382.4.
(Continued)

*Primary Examiner* — Ajay M Bhatia
*Assistant Examiner* — Mong-Shune Chung
(74) *Attorney, Agent, or Firm* — Jefferson IP Law, LLP

(57) ABSTRACT

An electronic device is provided. The electronic device includes a memory for storing at least one application, a wireless and/or wired communication interface, and a processor. The processor is configured to detect a display event for the at least one application, in response to the detection of display event, determine whether the electronic device is in a state of being connected to an external output device through the communication interface, when it is determined that the electronic device is in the state of being connected to the external output device, determine whether execution of the at least one application is possible, based on a state of connection with the external output device, and control to display, on the external output device, information indicating whether execution of the at least one application is possible.

7 Claims, 28 Drawing Sheets

(51) Int. Cl.
*G06F 15/16* (2006.01)
*G06F 3/041* (2006.01)
*G09G 5/12* (2006.01)
*G06F 3/14* (2006.01)
*H04N 21/414* (2011.01)
*H04N 21/41* (2011.01)

(52) U.S. Cl.
CPC ............ *G06F 3/1454* (2013.01); *G06F 15/16* (2013.01); *G09G 5/12* (2013.01); *G09G 2370/02* (2013.01); *G09G 2370/04* (2013.01); *H04N 21/4122* (2013.01); *H04N 21/41407* (2013.01)

(58) Field of Classification Search
CPC .. G06F 3/04883; G06F 3/0488; G06F 3/0487; G06F 3/0481; G06F 3/04817; G06F 3/0482; G06F 2203/04104; G09G 2370/04; G09G 5/12; H04M 2250/22
See application file for complete search history.

(56) References Cited

U.S. PATENT DOCUMENTS

| | | |
|---|---|---|
| 2006/0107227 A1 | 5/2006 | Kiljander |
| 2008/0088744 A1 | 4/2008 | Lee et al. |
| 2014/0059494 A1 | 2/2014 | Lee et al. |
| 2014/0080469 A1 | 3/2014 | Ko et al. |
| 2014/0344862 A1* | 11/2014 | Cho .................. H04N 21/4753 725/46 |
| 2014/0359002 A1 | 12/2014 | Kim et al. |
| 2015/0301700 A1 | 10/2015 | Komori |
| 2015/0348493 A1* | 12/2015 | Chae .................. G06F 3/0481 345/212 |
| 2016/0173679 A1 | 6/2016 | Ham et al. |
| 2016/0253142 A1 | 9/2016 | Choi et al. |
| 2016/0349962 A1* | 12/2016 | Chen .................. G06F 3/0488 |
| 2016/0381553 A1 | 12/2016 | Lee et al. |
| 2019/0236263 A1* | 8/2019 | Fu .................. H04L 63/0815 |

FOREIGN PATENT DOCUMENTS

| | | |
|---|---|---|
| CN | 106055327 A | 10/2016 |
| CN | 106959796 A | 7/2017 |
| CN | 111614994 A | 9/2020 |
| KR | 10-1312456 B1 | 10/2013 |
| KR | 10-2014-0128579 A | 11/2014 |
| KR | 10-2015-0065508 A | 6/2015 |
| KR | 10-1733458 B1 | 5/2017 |

OTHER PUBLICATIONS

International Search Report dated Oct. 29, 2018; International application No. PCT/KR2018/009678; Applicant's or agent's file reference No. SP18245-PCT.

Chinese Office Action dated Sep. 29, 2020 issued in Chinese International Application No. 201810964651.0.

* cited by examiner

ELECTRONIC DEVICE FOR DISPLAYING APPLICATION AND OPERATING METHOD THEREOF

CROSS-REFERENCE TO RELATED APPLICATION(S)

This application is based on and claims priority under 35 U.S.C. § 119(a) of a Korean patent application number 10-2017-0106445, filed on Aug. 23, 2017, in the Korean Intellectual Property Office, the disclosure of which is incorporated by reference herein in its entirety.

BACKGROUND

1) Field

The disclosure relates to an electronic device and method for displaying an application.

2) Description of Related Art

With the development of information and communication technologies and semiconductor technologies, various types of electronic devices have developed into multimedia devices that provide various multimedia services. For example, an electronic device may provide various services, such as a voice call service, a message service, a broadcast service, a wireless Internet service, a camera service, a music playback service, and a game service, using an application installed in the electronic device.

The electronic device may be connected to various external electronic devices via a docking device (or directly connected). For example, the electronic device may be connected to a television, a monitor, a mouse, a keyboard, or the like. The electronic device may output video and/or audio data via external electronic devices connected to the electronic device.

The electronic device may use, as a display device of the electronic device, an external electronic device connected thereto. For example, the electronic device may perform control such that an execution screen of an application being executed in the electronic device is displayed on a monitor connected to the electronic device. To this end, the electronic device may control a size and/or resolution of an application execution screen, based on a size and/or resolution of a display area of the external electronic device, and output, to the external electronic device, the application execution screen of which the size and/or resolution is controlled. However, some applications may be designed to support only the size and/or resolution of the display area of the electronic device, thereby not supporting the size and/or resolution of the display area of the external electronic device. For example, some applications may not provide a function capable of adjusting the size and/or resolution of the execution screen. Therefore, in a situation where the electronic device uses an external electronic device as a display device, some applications may not be executed or may be executed abnormally. For example, in a situation where the electronic device uses an external electronic device as a display device, an execution screen for some applications may not be displayed normally. In a situation where the electronic device uses the external electronic device as a display device, a user of the electronic device may not recognize in advance an application may not be executed or an application is abnormally executed. Accordingly, the electronic device may attempt to install and/or execute an application, normal execution of which is impossible, based on a user input in a state where the external electronic device is connected, thereby generating inconvenience due to an application, normal execution of which is not performed.

To solve the above problem, various embodiments of the disclosure may provide a method and apparatus for displaying, by an electronic device, information related to whether at least one application is being executed or not, based on a state of connection with an external electronic device.

Various embodiments of the disclosure provide a method and apparatus for recommending an application by an electronic device, based on a state of connection with an external electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first surface and a second surface oriented in a direction opposite to the first surface, a touch screen display exposed through a portion of the first surface, at least one wireless and/or wired communication circuit located inside the housing, at least one processor located inside the housing and electrically connected to the at least one wireless and/or wired communication circuit and the touch screen display, and a memory located inside the housing and electrically connected to the at least one processor. The memory is configured to store a plurality of application programs downloaded through the at least one wireless and/or wired communication circuit, the plurality of application programs including a first application program having a first user interface and a second application program having a second user interface. The memory stores instructions which, when executed, cause the at least one processor to control to receive information on a first application program from an external server through the at least one wireless and/or wired communication circuit, in a first operation, control to display, on the touch screen display, a plurality of first icons arranged in a matrix, wherein the plurality of first icons include a first application icon representing the first application program and a second application icon representing the second application program, wherein, when a first user input for selecting the first application icon is received, control to display the first user interface using a first set of display properties, and wherein, when a second user input for selecting the second application icon is received, control to display the second user interface by using the first set of display properties, in a second operation in which the electronic device is electrically connected to an external display device through the at least one wireless and/or wired communication circuit, control the external display device to display a first window including a plurality of second icons arranged in a matrix, wherein the plurality of second icons include a third icon representing the first application program, the third icon including at least a portion of the first application icon and an indication indicating that the first application program, which is changed to be used in the second operation, based on at least a part of information, and wherein, when a third user input for selecting the third icon is received, control to display a third user interface, which has been changed according to the second operation, on the external display device, by using a second set of display properties.

In accordance with another aspect of the disclosure, an electronic device is provided. The electronic device includes a memory for storing at least one application, a wireless and/or wired communication interface, and a processor. The processor is configured to detect a display event for the at least one application, in response to the detection of the display event, determine whether the electronic device is in a state of being connected to an external output device through the wireless and/or wired communication interface, when the electronic device is in the state of being connected to the external output device, determine whether execution of at least one application is possible, based on a state of connection with the external output device, and control to display, on the external output device, information indicating whether execution of the at least one application is possible.

In accordance with another aspect of the disclosure, a server is provided. The server includes a transceiver, and a processor. The processor controls the transceiver to obtain, from at least one electronic device, connection state information of an external output device and execution-related information of at least one application, determine whether execution of the at least one application is possible in a state of being connected to the external output device, based on the connection state information of the external output device and the execution-related information of the application, and transmit, to another electronic device, information indicating whether execution of the at least one application is possible in the state of being connected to the external output device.

An electronic device and operating method therefor according to an embodiment of the disclosure may display information related to whether at least one application is being executed, through an external electronic device, based on a state of connection with the external electronic device, by the electronic device, thereby improving user convenience in application use. For example, an electronic device according to an embodiment of the disclosure allows a user to easily distinguish between an executable application and a non-executable application in a state where an external electronic device is connected to the electronic device. In addition, an electronic device according to an embodiment of the disclosure may prevent an execution operation of an application, execution of which is impossible in a state where an external electronic device is connected to the electronic device and/or a delete operation after installation thereof from being performed. In addition, an electronic device according to an embodiment of the disclosure relates to a state of being connected to the external electronic device, so as to induce a user to use an application optimized for the state of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, an expression "A or B," "A and/or B," or the like may include all possible combinations of items enumerated together. Although expressions such as "$1^{st}$," "$2^{nd}$," "first," and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., $3^{rd}$) constitutional element.

An expression "configured to" used in the disclosure may be interchangeably used with, for example, "suitable for," "having the capacity to," "adapted to," "made to," "capable of," or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory device.

Figure 1:
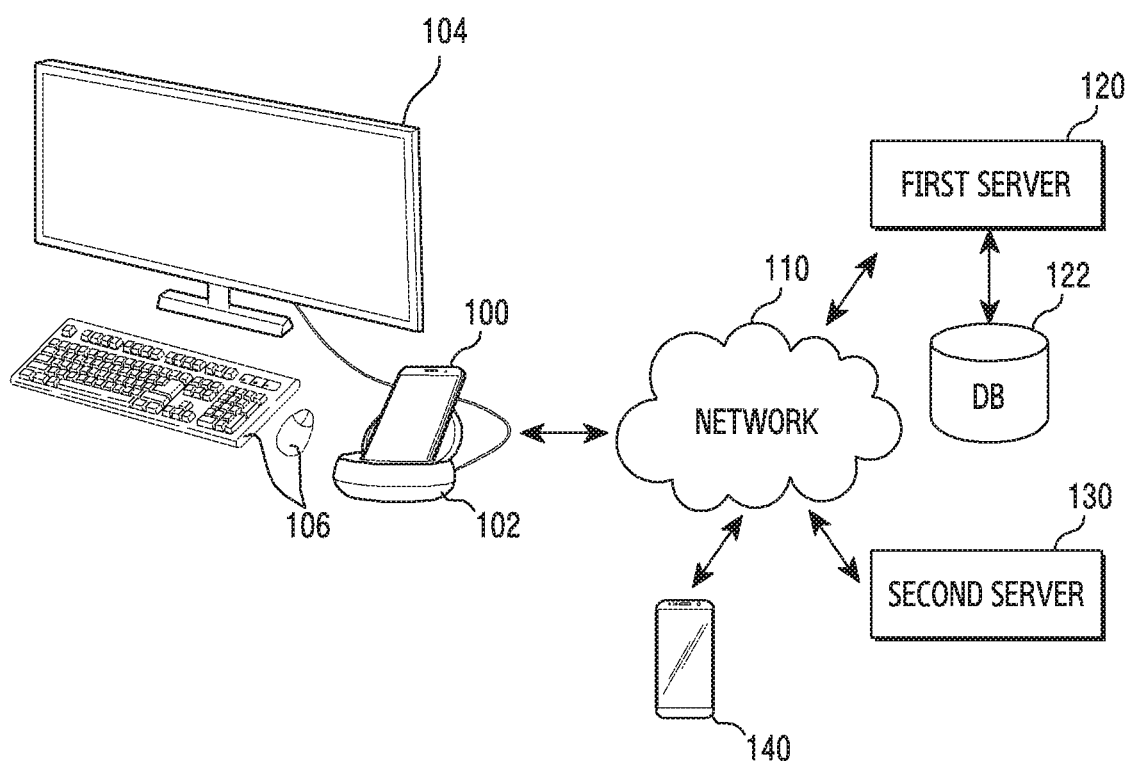
FIG. 1 illustrates a system structure according to an embodiment of the disclosure.

FIG. 1 illustrates a system structure according to an embodiment of the disclosure. A system according to an embodiment may include an electronic device 100, a docking device 102, an external output device 104, an external input device 106, a first server 120, a second server 130, and a second external electronic device 140. The external output device 104 and/or the external input device 106 may be referred to as a first external electronic device.

Referring to FIG. 1, the electronic device 100 may be an electronic device that supports a desktop extension mode. The desktop extension mode is a mode in which the electronic device 100, the docking device 102, the external output device 104, and the external input device 106 are connected to provide a usage environment similar to a general personal computer. For example, the electronic device 100 operating in a desktop extension mode may serve as a main body in a personal computer environment, the external output device 104 may serve as a monitor in the personal computer environment, and the external input device 106 may serve as a keyboard and/or mouse in a personal computer environment. For example, the electronic device 100 operating in a desktop extension mode may use the external output device 104 as an output device of the electronic device 100, and may use the external input device 106 as an input device of the electronic device 100. The electronic device 100 operating in a desktop extension mode may change a user interface and/or environment information (e.g., information on resolution, density or direction, etc.) associated with a user interface to be suitable to the external output device 104, and may display the changed user interface through the external output device 104.

According to various embodiments of the disclosure, when docked to the docking device 102, the electronic device 100 may operate in a desktop extension mode. When operating in the desktop extension mode, the electronic device 100 may provide a user interface similar to a Windows™ OS to the external output device 104. For example, the electronic device 100 may change a user interface and/or environment information associated with a user interface during a desktop extension mode, and provide the same to the external output device 104. The electronic device 100 may receive a user input through the external input device 106.

According to various embodiments of the disclosure, when an application installed in the electronic device 100 is being executed, the electronic device 100 may transmit application execution-related information and state information of the electronic device 100 to a first server 120 through a network 110. At least one of the state information and application execution-related information of the electronic device 100 may be obtained at a time point when execution of the application is detected, at a time point when execution of the application is terminated, or while the application is being executed. According to an embodiment, the state information of the electronic device 100 may include information indicating whether the electronic device 100 is connected to the external output device 104 via the docking device 102 (or directly connected thereto), identification information of the external output device 104 connected to the electronic device 100, information indicating whether the external input device 106 is connected to the electronic device 100, identification information of the external input device 106 connected to the electronic device 100, or a combination thereof. The information indicating whether the electronic device 100 is connected to the external output device 104 may include information indicating whether the electronic device 100 is operating in a desktop extension mode. The application execution-related information may include at least one of user profile information (e.g., device information, log information, location information, voice information, gender, race, age, an occupation, an area of interest, etc.), an application type (or categories, sub categories), input information (e.g., key input information, frequently used keys, etc.) generated while an application is being executed, an input device used for execution of an application, an application execution time, a frequency of application execution, an application execution pattern, whether an application is being executed, a screen size of an application execution screen, an application execution screen mode (e.g., a landscape mode, a portrait mode, etc.), whether an application has an audio output, information associated with an application error, information on exceptions, or a combination thereof. The device information may include a hardware model, international mobile equipment identity (IMEI) number, a unique device identifier, a media access control (MAC) address, an internet protocol (IP) address, an operating system version, information associated with device configuration used for a service access, or a combination thereof. The log information may include a service use time and period, a key word input through a service, information stored in a cookie, or a combination thereof. The information described above is a description for the sake of understanding, and the application execution-related information of the disclosure is not limited thereto. For example, the application execution-related information of the disclosure may include all pieces of information that can be obtained in association with an application, while the application is being executed.

According to various embodiments of the disclosure, the electronic device 100 may perform control to display, on the external output device 104, information on whether execution of at least one application is possible, in a state of being connected to the external output device 104. For example, when operating in a desktop extension mode, the electronic device 100 may perform control to separately display, on the external output device 104, an application, normal execution of which is possible in a desktop extension mode, and an application, normal execution of which is impossible in the desktop extension mode. According to an embodiment, the electronic device 100 may obtain information on whether execution of at least one application is possible, via communication with the first server 120, in a state of being connected to the external output device 104.

According to various embodiments of the disclosure, in a state of being connected to the external output device 104, the electronic device 100 may perform control to display, on the external output device 104, information on a recommended application that can be executed in a state of being connected to the external output device 104. For example, when operating in a desktop extension mode, the electronic device 100 may display, on the external output device 104, as a recommended application, at least one of: an application that can be normally executed in the desktop extension mode, an application having a high frequency of execution in the desktop extension mode, an application having a long average execution time in the desktop extension mode, or an application that can be executed in a full screen mode in the desktop extension mode. The recommended application may include at least one application installed in the electronic device 100, at least one application not being installed therein, or a combination thereof. According to an embodiment, the recommended application may include an application associated with at least one of the external output device 104 connected to the electronic device 100, the external input device 106 connected to the electronic device 100, or user profile information. For example, when the external output device 104 connected to the electronic device 100 is a monitor, the recommended application displayed on the external output device 104 (e.g., monitor) may include a recommended application that can be normally executed in a desktop extension mode and associated with the monitor. In another example, when the external output device 104 connected to the electronic device 100 is a monitor and the external input device 106 connected to the electronic device 100 is a keyboard, a recommended application displayed on the monitor, which is the external output device 104, may include an application that can be normally executed in a desk extension mode and associated with the keyboard. According to an embodiment, in a state of being connected to the external output device 104, the electronic device 100 may obtain information on the recommended application via communication with the first server 120.

According to various embodiments of the disclosure, the docking device 102 may be a device for connecting the electronic device 100 with the external electronic device. The docking device 102 may be connected with various external electronic devices through wired and/or wireless communication. For example, the docking device 102 may be connected to the external output device 104. The docking device 102 may be connected to the external output device 104 through a wire (e.g., a high definition multimedia interface (HDMI), a display port (DP), a universal serial bus (USB) type C), or connected in a wireless manner.

According to various embodiments of the disclosure, the external output device 104 may output video and/or audio data. For example, the external output device 104 may receive video and/or audio data from the electronic device 100 through the docking device 102, and output the received video and/or audio data. The external output device 104 may be an external electronic device, such as a display, a headset, an earphone, and the like, having a function of outputting video and/or audio data.

According to various embodiments, an external input device 106 may include at least one of a mouse, a keyboard, a joystick, a microphone, or a remote controller. The external input device 106 may be connected to the electronic device 100 through a wire or in a wireless manner, or may be connected to the docking device 102 through a wire or in a wireless manner.

According to various embodiments of the disclosure, the first server 120 may store and manage application-related information. According to an embodiment, the first server 120 may store and manage information on various types of applications. According to an embodiment, the first server 120 may store and manage information on a particular type of application (e.g., a game application). According to an embodiment, the first server 120 may receive state information and application execution-related information from the electronic device 100 and/or the second external electronic device 140, and determine whether execution is possible according to the state information, based on the received information. For example, the first server 120 may determine whether execution of a first application is possible in the electronic device 100 which is in a desk extension mode, based on the state information and application execution-related information, received from at least one of the electronic device 100 and/or the second external electronic device 140. According to an embodiment, the first server 120 may determine a recommended application according to the state information, based on the state information and application execution-related information, received from the electronic device 100 and/or the second external electronic device 140. For example, the first server 120 may determine, as a recommended application of a desktop extension mode, at least one of an application that can be normally executed in a desktop extension mode, an application having a high frequency of execution in a desktop extension mode, an application having a long average execution time in a desktop extension mode, or an application that can be executed in a full screen mode in a desktop extension mode. According to an embodiment, the first server 120 may determine a recommended application according to an external electronic device, based on the state information and application execution-related information, received from the electronic device 100 and/or the second external electronic device 140. For example, the first server 120 may determine a recommended application corresponding to a case where a keyboard is connected to the electronic device 100 which is in a desktop extension mode, a recommended application corresponding to a case where the mouse is connected, a recommended application corresponding to a case where a joystick is connected, a recommended application corresponding to a case where TV is connected, or a recommended application corresponding to a case where a monitor is connected. According to various embodiments, the first server 120 may store, in a database (DB) 122, the state information and application execution-related information, received from the electronic device 100 and/or the second external electronic devices 140. According to an embodiment, the first server 120 may store, in the DB 122, pieces of information (e.g., whether execution of an application according to the state information is possible, a recommended application according to the state information, a recommended application according to an external electronic device, etc.) determined based on information received from the electronic device 100 and/or the second external electronic devices 140, or transmit the same to the electronic device 100 through the network 110. The DB 122 may be separately configured as shown and connected to the first server 120, and may be included in the first server 120.

The second server 130 may have registered therein applications from a content provider and transmit the registered application to the electronic device 100 through the network 110. According to various embodiments, the first server 120 and the second server 130 may be configured as one integrated server.

Figure 2:
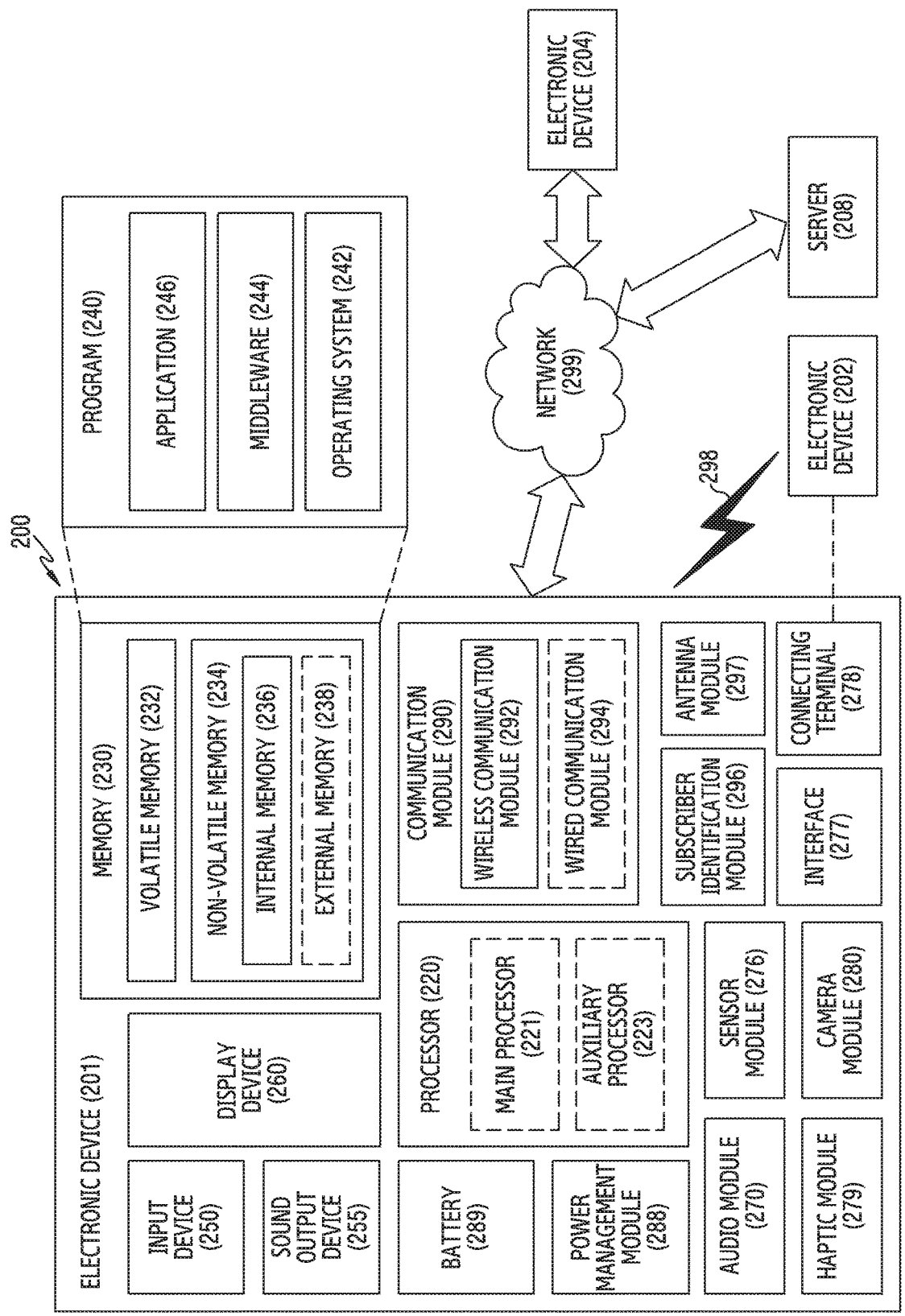
FIG. 2 is a block diagram of an electronic device in a network environment according to an embodiment of the disclosure.

FIG. 2 is a block diagram illustrating an electronic device in a network environment 200 according to an embodiment.

Referring to FIG. 2, an electronic device 201 in the network environment 200 may communicate with an external electronic device 202 via a first network 298 (e.g., a short-range wireless communication network), or an external electronic device 204 or a server 208 via a second network 299 (e.g., a long-range wireless communication network). According to an embodiment, the electronic device 201 may communicate with the external electronic device 204 via the server 208. According to an embodiment, the electronic device 201 may include a processor 220, a memory 230, an input device 250, a sound output device 255, a display device 260, an audio module 270, a sensor module 276, an interface 277, a haptic module 279, a camera module 280, a power management module 288, a battery 289, a communication module 290, a subscriber identification module (SIM) 296, or an antenna module 297. In some embodiments, at least one (e.g., the display device 260 or the camera module 280) of the components may be omitted from the electronic device 201, or one or more other components may be added in the electronic device 201. In some embodiments, some of the components may be implemented as single integrated circuitry. For example, the sensor module 276 (e.g., a fingerprint sensor, an iris sensor, or an illuminance sensor) may be implemented as embedded in the display device 260 (e.g., a display).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may load a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), and an auxiliary processor 223 (e.g., a graphics processing unit (GPU), an image signal processor (ISP), a sensor hub processor, or a communication processor (CP)) that is operable independently from, or in conjunction with, the main processor 221. Additionally or alternatively, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display device 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input device 250 may receive a command or data to be used by other component (e.g., the processor 220) of the electronic device 201, from the outside (e.g., a user) of the electronic device 201. The input device 250 may include, for example, a microphone, a mouse, or a keyboard.

The sound output device 255 may output sound signals to the outside of the electronic device 201. The sound output device 255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 260 may visually provide information to the outside (e.g., a user) of the electronic device 201. The display device 260 may include, for example, a display, a hologram device, or a projector and control circuitry to control a corresponding one of the display, hologram device, and projector. According to an embodiment, the display device 260 may include touch circuitry adapted to detect a touch, or sensor circuitry (e.g., a pressure sensor) adapted to measure the intensity of force incurred by the touch.

The audio module 270 may convert a sound into an electrical signal and vice versa. According to an embodiment, the audio module 270 may obtain the sound via the input device 250, or output the sound via the sound output device 255 or a headphone of an external electronic device (e.g., the external electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the external electronic device 202) directly (e.g., wiredly) or wirelessly. According to an embodiment, the interface 277 may include, for example, an HDMI, a universal serial bus (USB) interface, a secure digital (SD) card interface, or an audio interface.

A connecting terminal 278 may include a connector via which the electronic device 201 may be physically connected with the external electronic device (e.g., the external electronic device 202). According to an embodiment, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the external electronic device 202, the external electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, Wi-Fi direct, or infrared data association (IrDA)) or the second network 299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the SIM 296.

The antenna module 297 may transmit or receive a signal or power to or from the outside (e.g., the external electronic device) of the electronic device 201. According to an embodiment, the antenna module 297 may include one or more antennas, and, therefrom, at least one antenna appropriate for a communication scheme used in the communication network, such as the first network 298 or the second network 299, may be selected, for example, by the communication module 290 (e.g., the wireless communication module 292). The signal or the power may then be transmitted or received between the communication module 290 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the external electronic devices 202 and 204 may be a device of a same type as, or a different type, from the electronic device 201. According to an embodiment, all or some of operations to be executed at the electronic device 201 may be executed at one or more of the external electronic device 202, the external electronic device 204 or the server 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, or client-server computing technology may be used, for example.

According to an embodiment, an electronic device 201 may be the electronic device 100 of FIG. 1, and the external electronic device 202 may be the docking device 102, the external output device 104, or the external input device 106 of FIG. 1. The external electronic device 204 may be the second external electronic device 140 of FIG. 1. The server 208 may be the first server 120 and/or the second server 130 of FIG. 1, and the network 299 may be the network 110 of FIG. 1. According to an embodiment, the electronic device 201 may be connected to an external electronic device (e.g., the external electronic device 202, the external output device 104, or the external input device 106) through a docking device (e.g., the docking device 102) connected to the connecting terminal 278, and/or may be directly connected to the external electronic device through the connecting terminal 278. The electronic device 201 may output display data to an external electronic device (e.g., the external output device 104), and receive input data from an external electronic device (e.g., the external input device 106). According to an embodiment, the external electronic devices 201 and 204 and the server 208 may transmit or receive at least one of: state information of the electronic device 201 and the external electronic device 204, application execution-related information, information on whether an application is being executed, or a recommended application.

Figure 3:
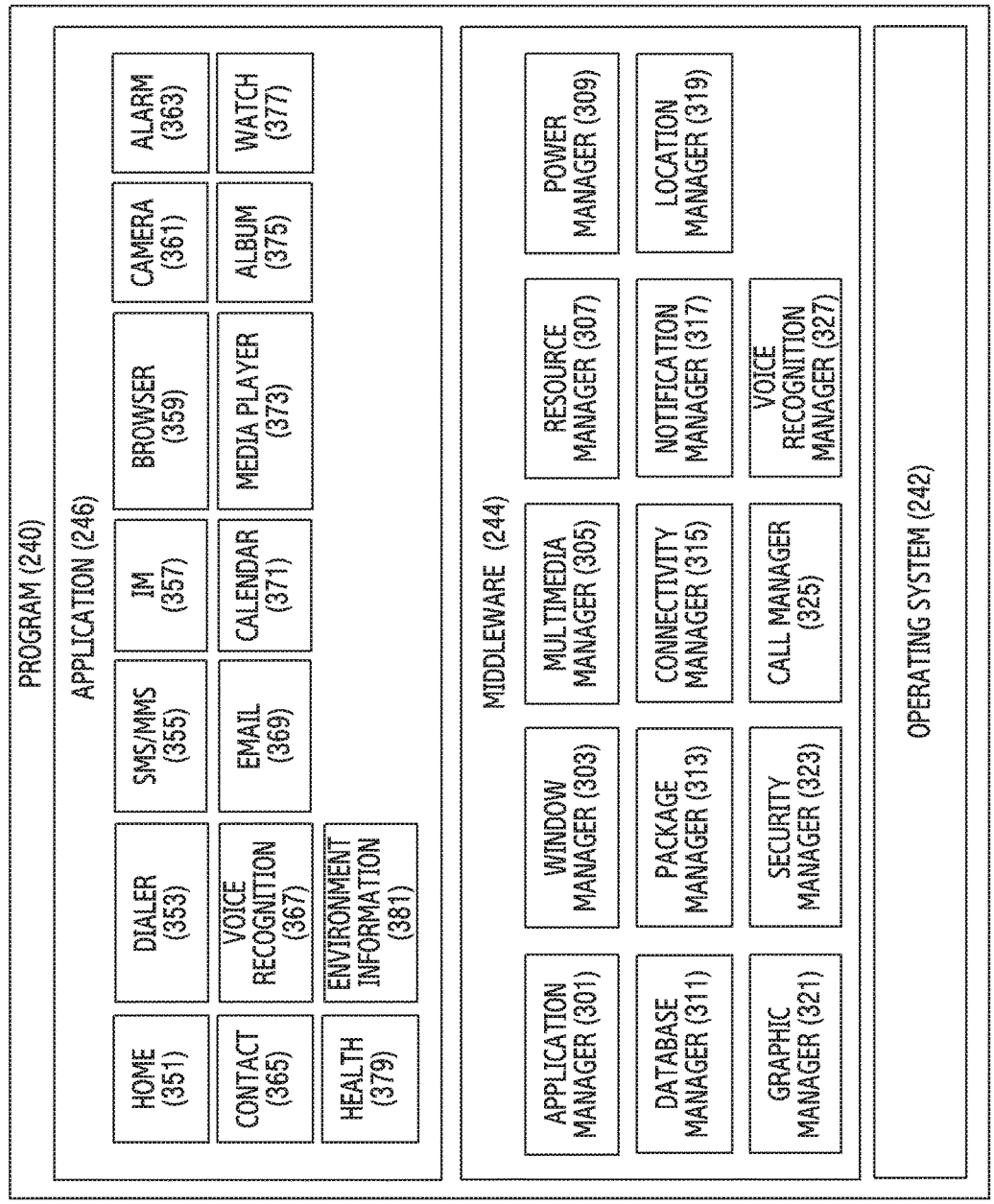
FIG. 3 is a block diagram of a program according to an embodiment of the disclosure.

FIG. 3 is a block diagram 300 of a program according to various embodiments.

Referring to FIG. 3, the program 240 may include the OS 242 for controlling one or more resources of the electronic device 201, middleware 244, or the application 246 that can be executed on the OS 242. The operating system may include, for example, Android™, iOS™, Windows™, Symbian™, Tizen™, or Bada™. At least some of the programs may be preloaded into the electronic device 201 during manufacturing process or may be downloaded from an external electronic device (e.g., the external electronic device 202, external electronic device 204, or server 208) on the environment used by a user, or may be updated.

The OS 242 may control (e.g., allocate or recover) system resources (e.g., a process, a memory, or power) of the electronic device 201. The OS 242 may additionally or alternatively include other hardware devices of the electronic device 201, such as the input device 250, the sound output device 255, the display device 260, the audio module 270, the sensor module 276, the interface 277, the haptic module 279, the camera module 280, the power management module 288, the battery 289, the communication module 290, the SIM 296, and one or more driver programs for driving the antenna module 297.

The middleware 244 may provide various functions to the application 246 so that the application 246 may use functions or information provided by the one or more resources of the electronic device 201. The middleware 244 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a call manager 325, or a voice recognition manager 327. The application manager 301 may manage, for example, the life cycle of the application 246. The window manager 303 may manage, for example, GUI resources used on the screen. The multimedia manager 305 may identify formats required for reproducing various media files, and may encode or decode a media file by using a codec suitable for the corresponding format. The resource manager 307 may manage, for example, a source code of the application 246 or a memory space. The power manager 309 may manage, for example, battery capacity, temperature, or power, and may determine or provide power information required for the operation of the electronic device 201 based on corresponding information. According to an embodiment, the power manager 309 may operate in conjunction with a basic input/output system (BIOS).

The database manager 311 may, for example, generate, search, or change a database to be used by the application 246. The package manager 313 may manage, for example, installation or update of an application distributed in the form of a package file. The connectivity manager 315 may manage, for example, a wireless or wired connection between the electronic device 201 and an external electronic device. The notification manager 317 may provide a function for notifying a user of the generated event (e.g., calls, messages, or alarms). The location manager 319 may manage, for example, the location information of the electronic device 201. The graphic manager 321 may manage a graphic effect to be provided to a user and a user interface relating to the graphic effect. The security manager 323 may provide, for example, system security or user authentication. The call manager 325 may manage, for example, voice call or video call functions of the electronic device 201. The voice recognition manager 327 may transmit voice data of a user to the server 208, and receive a command corresponding to a function to be performed in the electronic device 201 or text data that is converted based on the corresponding voice data. According to an embodiment, the middleware 344 may dynamically delete some existing elements or add new elements. According to an embodiment, at least a part of the middleware 244 may be included as a part of the OS 242, or may be implemented in software separate from the OS 242.

The application 246 may include, for example, home 351, dialer 353, an SMS/MMS 355, an instant message (IM) 357, a browser 359, a camera 361, an alarm 363, contact 365, voice recognition 367, an e-mail 369, a calendar 371, a media player 373, an album 375, a watch 377, health 379 (e.g., measurement of an amount of exercise, blood sugar, etc.), or an application on environmental information 381 (e.g., pressure, humidity, or temperature information). According to an embodiment, the application 246 may further include an information exchange application (not shown) capable of supporting information exchange between the electronic device 201 and an external electronic device. The information exchange application may include, for example, a notification relay application for transferring, to an external electronic device, designated information (e.g., calls, messages, or alarms), or a device management application for managing an external electronic device. The notification relay application may transfer, to an external electronic device, for example, notification information corresponding to an event (e.g., e-mail reception) generated in another application (e.g., the e-mail 369 application) of the electronic device 201, or receive the notification information from the external electronic device, and provide the same to a user of the electronic device 201. The device management application may control, for example, power (e.g., turn on or turn off power) of an external electronic device that communicates with the electronic device 201, or power of some of the elements thereof (e.g., the display device 260 or camera module 280), or may control functions (e.g., brightness, resolution, or focus of the display device 260 or camera module 280). The device management application may additionally or alternatively support the installation, delete, or update of an application being operated on an external electronic device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., an internal memory 236 or an external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4:
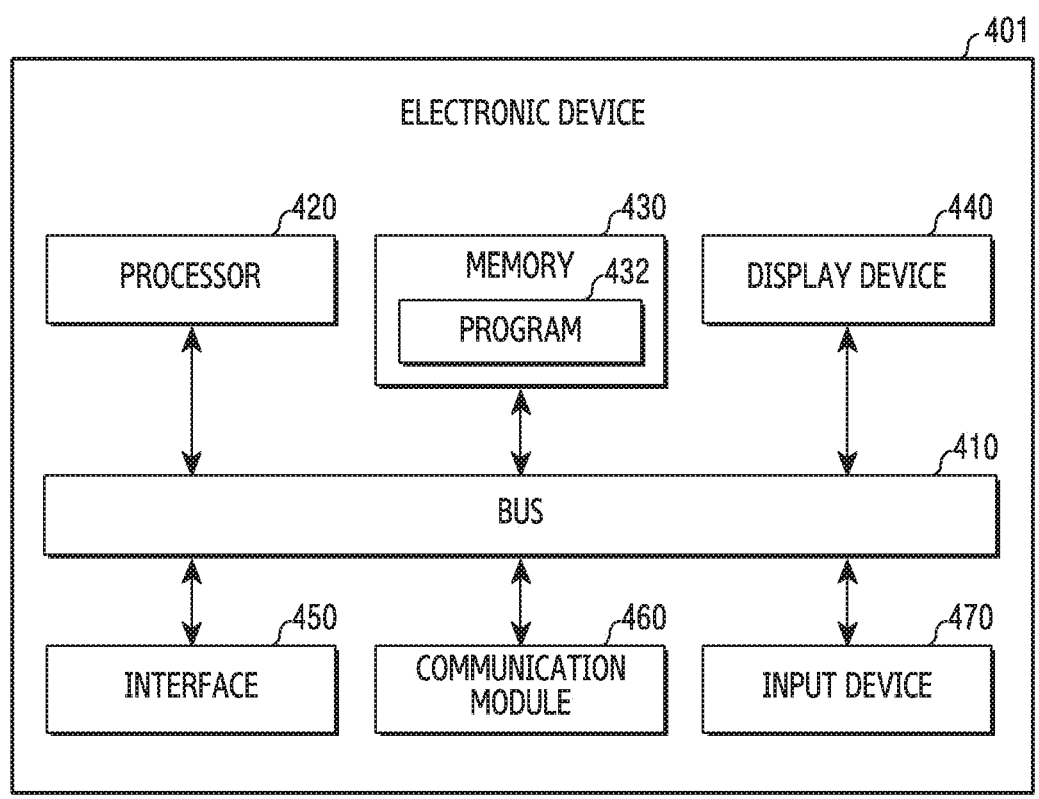
FIG. 4 is a block diagram of an electronic device according to an embodiment of the disclosure.

FIG. 4 is a block diagram of an electronic device according to an embodiment of the disclosure. The electronic device of FIG. 4 may be the electronic device 100 shown in FIG. 1 and/or electronic device 201 shown in FIG. 2.

Referring to FIG. 4, an electronic device 401 may include a bus 410, a processor 420, a memory 430, a display device 440, an interface 450, a communication module 460, and an input device 470. In some embodiments, the electronic device 401 may omit at least one of the elements, or may further include other elements.

According to an embodiment of the disclosure, the bus 410 may include, for example, a circuit for connecting the processor 420, the memory 430, the display device 440, the interface 450, the communication module 460, and the input device 470 to each other and performing transmission of communication (e.g., control messages and/or data) between the elements.

According to various embodiments of the disclosure, the processor 420 may drive software (e.g., a program 432) included in the memory 430 so as to control at least one other element of the electronic device 401 connected to the processor 420.

According to various embodiments of the disclosure, the processor 420 may obtain information indicating a type (or category) of an application installed in the electronic device 401. According to an embodiment, the processor 420 may transmit, to a server (e.g., the first server 120), an application type information request signal including application identification information, and in response thereto, may obtain information indicating an application type. The application identification information may include at least one of an application name, an application ID, and an application package name. According to an embodiment, the processor 420 may obtain information indicating an application type from a file (e.g., a manifest file) containing application-related information. According to an embodiment, upon downloading the application, the processor 420 may obtain category information of the corresponding application from a download server (e.g., the second server 130), and may obtain application type information from the obtained category information. According to an embodiment, the processor 420 may obtain application type information at a time point when an application installation event occurs, at a time point when an information change event for an installed application is detected, or at a predetermined period. The application type may include, for example, games, education, finance, weather, news, health, books, video players, beauty, business, photography, social, shopping, travel, entertainment, music, events, maps, kids, tools, medical care, childbirth, or parenting, and the like.

According to various embodiments of the disclosure, the processor 420 may perform control operations to transmit state information of the electronic device 401 and application execution-related information to a server (e.g., the first server 120 and the server 208). According to an embodiment, when execution of an application corresponding to a first predetermined type, among applications installed in the electronic device 401, is detected, the processor 420 may transmit, to a server, the application execution-related information and the state information of the electronic device 401, through the communication module 460. The first type may indicate, when executed, types of applications for which execution-related information should be reported. According to an embodiment, at least one application type among various application types may be designated as a first type by a service provider or a user. For example, a game type may be set as the first type. In another example, all application types may be set as the first type. According to an embodiment, when execution of the first type of application is detected, the processor 420 may obtain at least one of state information of the electronic device 401 and application execution-related information, at a time point when execution of the application is detected, at a time point when execution of the application is terminated, or while the application is being executed. The state information of the electronic device 401 may include information indicating whether the electronic device 401 is connected to an external output device (e.g., the external output device 104), identification information of an external output device connected to the electronic device 401, information indicating whether an external input device (e.g., the external input device 106) is connected to the electronic device 401, identification information of the external input device connected to the electronic device 401, or a combination thereof. The information indicating whether the electronic device 401 is connected to the external output device may include information indicating whether the electronic device 401 is operating in a desktop extension mode. The identification information of the external output device may include at least one of a type of the external output device, a product name of the external output device, and an identification code of the external output device. The identification information of the external input device may include at least one of a type of the external input device, a product name of the external input device, and an identification code of the external input device. The application execution-related information may include at least one of an application type (or a category), the application's user profile information (e.g., gender, race, age, occupation, an area of interest, etc.), input information generated during the application execution, an input device used for application execution, an application execution time, a frequency of application execution, an application execution pattern, whether an application is being executed, a screen size of an application execution screen, an application execution screen mode (e.g., a landscape mode, a portrait mode, etc.), whether an application has an audio output, information associated with an application error, information on exceptions, or a combination thereof. According to an embodiment, the processor 420 may control the communication module 460 such that the state information of the electronic device 401 and application execution-related information are transmitted to a server at a time point when the application execution is terminated or a time point when a preconfigured event occurs. The preconfigured event may include at least one of a short-range wireless communication network connection event and an information transmission request event by a user input. According to an embodiment, the processor 420 may perform control such that at least some pieces of information among the state information of the electronic device 401 and the application execution-related information are transmitted to a server at a time point when the application execution starts, and the other pieces of information is transmitted to the server at a time point when the application execution is terminated or a time point when a preconfigured event occurs. According to an embodiment, the processor 420 may perform control such that at least some pieces of information among the state information of the electronic device 401 and the application execution-related information are periodically transmitted to a server while an application is being executed.

According to various embodiments of the disclosure, when a connection with an external output device (e.g., the external output device 104) is detected, the processor 420 may operate in a desktop extension mode. According to an embodiment, the processor 420 may detect a connection with the external output device 104 through a docking device (e.g., the docking device 102).

According to various embodiments of the disclosure, when detecting an application display event, the processor 420 may collect state information of the electronic device 401. The application display event may include at least one of a management application execution event for managing at least one other application, an application list view event, an event of selecting an item (e.g., folder) containing at least one application, or an event by which a screen-off state is changed to a screen-on state. The management application that manages at least one other application may include a launcher application (e.g., a game launcher application). For example, when detecting execution of a game launcher application, the processor 420 may determine that an event for displaying game applications has been generated. In another example, when detecting a user input on an application list view item, the processor 420 may determine that an event for displaying the applications installed in the electronic device 401 has been generated. Further, in another example, when detecting a user input on the folder item containing at least one application, the processor 420 may determine that an event for displaying at least one application contained in the folder has been generated.

According to various embodiments of the disclosure, the processor 420 may determine whether execution of at least one application is possible, based on the state information of the electronic device 401. According to an embodiment, in response to the detection of an application display event, the processor 420 may determine whether execution of at least one application is possible, based on the state information of the electronic device 401. According to an embodiment, when the state of the electronic device 401 corresponds to a first state where the external output device is not connected to the electronic device 401, the processor 420 may determine that all applications installed in the electronic device 401 are executable. According to an embodiment, when the state of the electronic device 401 corresponds to a second state where the external output device is directly connected to the electronic device 401 or connected thereto through a docking device, the processor 420 may determine whether each of applications installed in the electronic device 401 (or applications to be displayed in response to the application display event) is executable in a state of being connected to the external output device to the electronic device 401. For example, the processor 420 may perform control such that a first signal including state information of the electronic device 401 and information indicating applications installed in the electronic device 401 is transmitted to a server. In response to the first signal, the processor 420 may receive a first response signal including information indicating whether each application installed in the electronic device 401 is executable in a second state. The processor 420 may, based on the received first response signal, determine whether each application installed in the electronic device 401 is executable in the second state. The first response signal may include additional information based on the state information of the electronic device 401. For example, the first response signal may further include information on an application, which is suitable to be executed using an external input device connected to the electronic device 401, among applications installed in the electronic device 401. For example, when an external input device connected to the electronic device 401 is a keyboard, the first response signal may further include information indicating an application which is suitable to be executed in a state where the keyboard is connected. In another example, the processor 420 may perform control such that a second signal including information indicating applications installed in the electronic device 401 is transmitted to a server. As a response to the second signal, the processor 420 may receive a second response signal including information indicating whether each application installed in the electronic device 401 is executable in each state of the electronic device 401. The processor 420 may, based on the received second response signal, determine whether each application installed in the electronic device 401 is executable in the second state which is the current state of the electronic device 401. The second response signal may include additional information associated with various pieces of state information. For example, the second response signal may further include information indicating that which external input device is suitable to execute each of applications installed in the electronic device 401 in a state of being connected to the external input device. For example, the second response signal may include information indicating that a first application is suitable to be executed in a state where a keyboard is connected to the electronic device 401, and a second application is more suitable to be executed in a state where a joystick is connected to the electronic device 401.

According to an embodiment, in relation to an application that can be executed in a second state, the first response signal and/or the second response signal may include information associated with the suitability of execution of the application in the second state. For example, in relation to each of applications that can be executed in the second state, the first response signal and/or the second response signal may include information indicating whether an application is suitable for the second state or the suitability of execution in the second state. Whether or not the application is suitable for a second state or the suitability of execution in the second state is determined based on at least one of: an execution time of an application in the second state of other electronic devices, a frequency of execution, an execution pattern, the size of an execution screen, an execution screen mode, an input means, information associated with an error, or information on exceptions. For example, at least one application, which has an average execution time longer than a threshold time, in a second state of other electronic devices, may be determined as an application suitable for the second state, and at least one application, which has an average execution time shorter than a threshold time, in the second state of other electronic devices, may be determined as an application that is not suitable for the second state. In another example, based on an average execution time in a second state of other electronic devices, the suitability of execution for each application in the second state may be determined. For example, it may be determined that the suitability of execution of a first application having an average execution time of one hour, in a second state of other electronic devices, has a value higher than that of a second application having an average execution time of 5 minutes, in the second state of other electronic devices. According to an embodiment, whether an application is suitable for a second state or the suitability of execution in the second state may be determined based on whether the window size for an application is adjustable. For example, an application for which the window size is adjustable may be determined as an application relating to a state of being connected to the external output device, and an application for which the window size is not adjustable may be determined as an application that is not related to a state of being connected to the external output device. Whether an application is suitable for a second state, and/or the suitability of execution for each application in the second state may be determined by a server. However, according to various embodiments, an electronic device may determine the suitability of execution by obtaining relevant information from a server.

According to various embodiments of the disclosure, based on state information of the electronic device 401, the processor 420 may perform control to display, on the display device 440 or an external output device (e.g., the external output device 104), information indicating whether execution of at least one application is possible. According to an embodiment, when the state of the electronic device 401 corresponds to a first state where an external output device is not connected to the electronic device 401, the processor 420 may perform control to display, on the display device 440, information indicating that all applications installed in the electronic device 401 are executable. According to an embodiment, when the state of the electronic device 401 corresponds to a second state of being connected to the external output device to the electronic device 401, the processor 420 may perform control to display, on an external output device, information indicating whether each application installed in the electronic device 401. The processor 420 may indicate whether execution of an application is possible using icons, symbols, text, images, colors, transparency, definition, or a combination thereof. For example, the processor 420 may perform control to display an icon as it is of the application on the screen, thereby indicating that the application is executable. In another example, the processor 420 may perform control to process an icon color of the application in black and white and display the same on the screen, thereby indicating that execution of the application is impossible. In another example, the processor 420 may perform control to add a symbol indicating of non-executable to the icon of the application and then display the same on the screen, thereby indicating that execution of the application is impossible. According to an embodiment, the processor 420 may perform control to distinguish between a display area for an executable application and a display area for a non-executable application, thereby indicating whether each application is executable in the corresponding state. According to an embodiment, the processor 420 may perform control such that a non-executable application is not displayed on the screen. According to an embodiment, the processor 420 may indicate whether an application is suitable for a second state by using icons, symbols, text, images, colors, transparency, definition, size, or a combination thereof. For example, the processor 420 may add, to the icon of the application, a symbol indicating that the application is suitable for the second state, thereby indicating that the application is not only executable in the second state but also suitable for the second state. According to an embodiment, the processor 420 may indicate the suitability of execution in the second state by using icons, symbols, text, images, colors, transparency, definition, size, or a combination thereof. For example, the processor 420 may add a symbol corresponding to the suitability of execution in the second state to the icon of the application, thereby indicating the suitability of execution of the application in the second state. According to an embodiment, the processor 420 may arrange applications installed on the electronic device 401, based on whether an application is suitable for a second state and/or the suitability of execution in the second state. For example, the processor 420 may arrange applications in descending order by the suitability of execution in the second state, and control the applications to be displayed according to the arranged order.

According to various embodiments of the disclosure, when the state information of the electronic device 401 corresponds to the second state, the processor 420 may perform control to display, on the external output device 104, information on a recommended application associated with the second state. According to an embodiment, in response to detection of an application display event, the processor 420 may perform control to transmit a signal requesting transmission of a recommended application information to a server. In response to a signal requesting transmission of the recommended application information, the processor 420 may receive, from the server, information on a recommended application for each state of the electronic device 401. According to an embodiment, the processor 420 may detect execution of a launcher application and perform control to transmit a signal indicating the execution of the launcher application. In response to transmission of the signal indicating the execution of the launcher application, the processor 420 may receive, from the server, information on a recommended application for each state of the electronic device 401. According to an embodiment, in response to detection of an application display event in a second state, the processor 420 may perform control to transmit, to a server, a signal requesting transmission of information on the recommended application associated with the second state. In response to a signal requesting transmission of the recommended application information associated with the second state, the processor 420 may receive information on a recommended application associated with the second state from the server. According to an embodiment, the processor 420 may detect the execution of a launcher application in a second state and perform control to transmit a signal to the server indicating that the launcher application is being executed in the second state. In response to transmission of a signal indicting that the launcher application is being executed in the second state, the processor 420 may receive recommended application information associated with the second state from the server. According to an embodiment, information on a recommended application may include information on at least one of: an application that can be normally executed in the second state, applications having a high frequency of execution in the second state, applications having a long average execution time in the second state, and applications executable in a full screen mode in the second state. According to an embodiment, information on the recommended application may include a recommended application associated with at least one of: an external input device connected to an electronic device, an external output device, or user profile information. For example, the recommended application may include at least one of: an application recommended when an external input device is a keyboard, an application recommended when the external input device is a joystick, an application recommended when the external output device is a television, an application recommended when the external output device is a monitor, a recommended application corresponding to the user age, a recommended application corresponding to the user's occupation, a recommended application corresponding to the user's gender, or a combination thereof. This is an explanation for the sake of understanding, and a recommended application of the disclosure is not limited thereto. Information on a recommended application may include a recommended application type, a recommended application name, a package name of a recommended application, a video associated with the execution of a recommended application, the number of users who have used a recommended application, a graph showing a change in the number of users who have executed or installed a recommended application, the number of users who have executed a recommended application for a certain period of time, an average execution time of a recommended application, an average execution time of a recommended application during a certain period of time, the average number of times of execution of a recommended application during a certain period of time, or a combination thereof. This is a description for the sake of understanding, and the information on the recommended application of the disclosure is not limited thereto. According to an embodiment, information on the recommended application may be received, from the server, together with the information indicating whether at least one application installed in the electronic device 401 is executable. According to an embodiment, the recommended application information and the information indicating whether at least one application installed in the electronic device 401 is executable may be received from the server via a separate signal.

According to various embodiments of the disclosure, the memory 430 may store software (e.g., the program 432) and input data and output data for a command associated with the software. According to an embodiment, the memory 430 (e.g., the memory 230) may store at least one application execution-related information. According to an embodiment, the memory 430 may store application execution-related information detected while an application is being executed, under the control of the processor 420. According to an embodiment, the memory 430 may store information indicating whether execution of at least one application is possible according to the state of the electronic device, under the control of the processor 420. According to an embodiment, the memory 430 may store information on a recommended application according to the state of the electronic device, under the control of the processor 420.

According to various embodiments of the disclosure, the display device 440 (e.g., the display device 260) may display various user interfaces under the control of the processor 420. According to an embodiment, the display device 440 may display a user interface including a list of applications under the control of the processor 420. According to an embodiment, the display device 440 may display an application execution screen under the control of the processor 420. According to an embodiment, the display device 440 may display graphic data indicating that the electronic device 401 is operating in a desktop extension mode under the control of the processor 420 during the desktop extension mode of the electronic device 401. According to an embodiment, the display device 440 may be disabled during the desktop extension mode of the electronic device 401 under the control of the processor 420, thereby not displaying graphical data. According to an embodiment, the display device 440 may display graphic data corresponding to a screen-off state during the desktop extension mode under the control of the processor 420. According to an embodiment, the display device 440 may include a touch circuitry or a pressure sensor capable of measuring the intensity of the pressure of the touch. According to an embodiment, at least a part of the display device 440 may operate as an input device while the electronic device 401 is operating in the desktop extension mode. For example, the display device 440 may detect a user input through the touch circuitry and/or the pressure sensor while the electronic device 401 is operating in the desktop extension mode.

According to various embodiments of the disclosure, the interface 450 (e.g., the interface 277) and/or the communication module 460 (e.g., the communication module 290) may transmit and receive a signal and/or data to and from other electronic devices (e.g., the external output device, external input device, server) connected in a wireless or wired manner.

According to various embodiments of the disclosure, the input device 470 (e.g., input device 150) may receive control commands or data associated with video photographing from the outside (e.g., user) of the electronic device 401.

Figure 5:
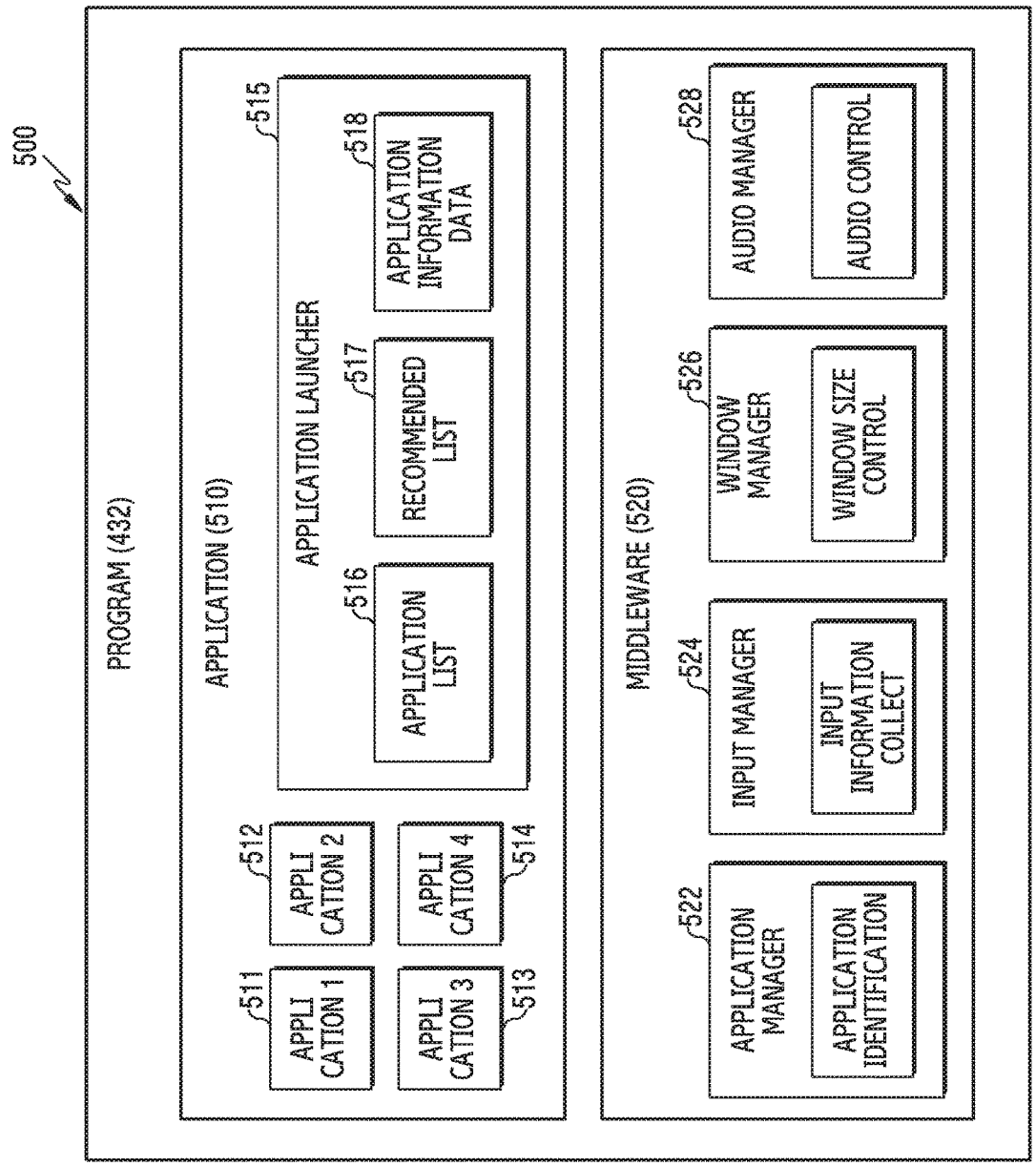
FIG. 5 is a block diagram of a program according to an embodiment of the disclosure.

FIG. 5 is a block diagram 500 of a program according to an embodiment of the disclosure.

Referring to FIG. 5, the program 432 may be the program 240 shown in FIG. 2. According to an embodiment, the program 432 may include an application 510 and middleware 520.

The middleware 520 may include an application manager 522, an input manager 524, a window manager 526, or an audio manager 528. According to various embodiments, the application manager 522 (e.g., the application manager 301) may store an instruction that causes a processor (e.g., the processor 420) to identify the type (or category) of an application. According to an embodiment, when an application is installed in the electronic device 401, the application manager 522 may store an instruction that causes a processor (e.g., the processor 420) to identify the type of application being installed. For example, the application manager 522 may store an instruction that causes a processor (e.g., the processor 420) to communicate with the server and determine the type of application by analyzing information of the application being installed. For example, the application manager 522 may store an instruction that causes a processor (e.g., the processor 420) to identify the type of application, using the package name of the application being installed, or download category information, and the like. According to an embodiment, when information on an application is changed or when a particular application requests information on another application type, the application manager 522 may store an instruction that causes a processor (e.g., the processor 420) to perform communication with a server through a communication module (e.g., the communication module 460) and identify information on the type of the corresponding application. According to an embodiment, the application manager 522 may store an instruction that causes a processor (e.g., the processor 420) to periodically perform communication with a server through a communication module (e.g., the communication module 460) and identify information on the type of the application installed in the electronic device 401.

According to various embodiments of the disclosure, the input manager 524 may manage input information related to application execution. For example, the input manager 524 may store information input for application execution, information input while an application is being executed, time information generated while an application is being executed, an application execution pattern, the number of times of application execution, and information on an input device used for application execution.

According to various embodiments, the window manager 526 (e.g., the window manager 303) may store an instruction that causes a processor (e.g., the processor 420) to adjust the size of an application execution screen. For example, the window manager 526 may store an instruction that causes the processor (e.g., the processor 420) to adjust the size of an application execution screen based on the screen size of an external output device. For example, the window manager 526 may store an instruction for adjusting the size of the application execution screen such that the application execution screen occupies the entire area of a screen of the external output device. The window manager 526 may store an instruction that causes the processor (e.g., the processor 420) to adjust the size of the application execution screen regardless of information of the executed application.

According to various embodiments of the disclosure, the audio manager 528 may store an instruction that causes a processor (e.g., the processor 420) to adjust the audio of an application. For example, when execution of a specific application is detected in a state where at least one application is being executed, the audio manager 528 may store instruction for controlling audio data of the specific application to not to be output regardless of audio data of at least one application. The audio manager 528 may store an instruction for controlling the audio data generated by execution of a specific type of application to not be output when execution of a specific type of application is detected. The audio manager 528 may store an instruction that causes a processor (e.g., the processor 420) to control output of audio data of a first type of application based on a user input. According to an embodiment, the audio manager 528 may store an instruction that causes a processor (e.g., the processor 420) to change an output path of audio data when a connection with the external output device is detected. For example, the audio manager 528 may store an instruction for changing an output path of audio data so as to output the audio data to an external output device when a connection with an external output device having an audio output function is detected.

The application 510 may include, for example, a plurality of applications (e.g., application 1 511, application 2 512, application 3 513, and application 4 514) and an application launcher 515. According to various embodiments, the application launcher 515 may store an instruction which, when executed, causes an application list 516 including applications installed in the electronic device 401, a recommended list 517 including recommended applications, or application information data 518 to be displayed on the external output device. According to an embodiment, the application list 516 may store an instruction which, in a state where an external output device is connected to the electronic device 401 (e.g., a second state or a state of being operated in a desktop extension mode), distinguishes between a list indicating executable applications and a list indicating non-executable applications, and displays the same on the external output device. In addition, the application launcher 515 may store an instruction that causes the application-related information to be additionally displayed. The application information data 518 may include application execution-related information provided by the input manager 524. The application launcher 515 may store an instruction that causes a processor (e.g., the processor 420) to transfer application information data 518 to a server through a communication module (e.g., the communication module 460) and to perform the role of receiving additional information from the server.

Figure 6A:
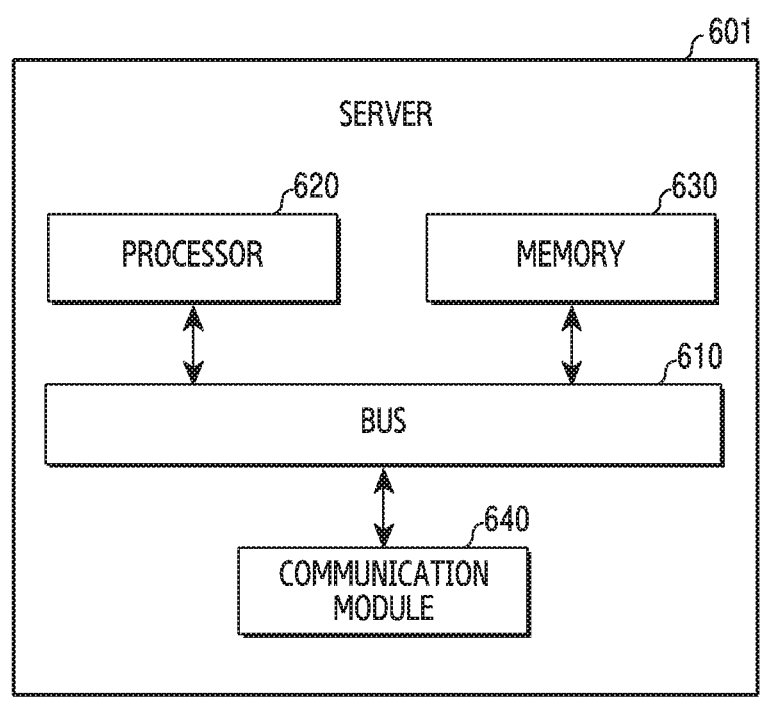
FIG. 6A is a block diagram of a server according to an embodiment of the disclosure.

FIG. 6A is a block diagram of an electronic device according to an embodiment of the disclosure. A server of FIG. 6A may be the first server 120 and/or the second server 130 shown in FIG. 1.

Referring to FIG. 6A, a server 601 may include a bus 610, a processor 620, a memory 630, and a communication module 640. In some embodiments, the server 601 may omit at least one of the above elements or may further include other elements.

According to various embodiments of the disclosure, the bus 610 may include, for example, a circuit for connecting the processor 620, the memory 630, and the communication module 640 to each other and transmitting communications (e.g., control messages and/or data) performed between the elements.

According to various embodiments of the disclosure, the processor 620 may drive software included in the memory 630 so as to control at least one other element of the server 601 connected to the processor 620.

According to various embodiments of the disclosure, the processor 620 may store and manage information for various types of applications. According to an embodiment, the processor 620 may receive an application type information request signal including identification information for at least one application from the electronic device (e.g., the electronic device 401) through the communication module 640. The processor 620 may control the communication module 640 to obtain type information for at least one application based on application information previously stored in the memory 630, and to transfer the obtained type information to the electronic device. The application identification information may include at least one of an application name, an application ID, and an application package name. The application type may include, for example, games, education, finance, weather, news, health, books, video players, beauty, business, photography, social, shopping, travel, entertainment, music, events, maps, kids, tools, medical care, birth, or parenting, and the like.

According to various embodiments of the disclosure, the processor 620 may receive state information of an electronic device (e.g., the electronic device 401 or second external electronic device 140) and application execution-related information from at least one electronic device (e.g., the electronic device 401 or second external electronic device 140). The state information of the electronic device (e.g., the electronic device 401 or second external electronic device 140) may include information indicating whether the electronic device (e.g., the electronic device 401 or second external electronic device 140) is connected to an external output device (e.g., the external output device 104), identification information of the external output device connected to the electronic device (e.g., the electronic device 401 or second external electronic device 140), information indicating whether an external input device (e.g., the external input device 106) is connected to the electronic device (e.g., the electronic device 401 or second external electronic device 140), identification information of the external input device connected to the electronic device (e.g., the electronic device 401 or second external electronic device 140), or a combination thereof. The information indicating whether the electronic device (e.g., the electronic device 401 or second external electronic device 140) is connected to the external output device may include information indicating whether the electronic device (e.g., the electronic device 401 or second external electronic device 140) is operating in a desktop extension mode. The identification information of the external output device may include at least one of a type of the external output device, a product name of the external output device, and an identification code of the external output device. The identification information of the external input device may include at least one of a type of the external input device, a product name of the external input device, and an identification code of the external input device. The application execution-related information may include at least one of an application type (or a category), user profile information (e.g., gender, race, age, occupation, an area of interest, etc.) of the application, information on input generated while an application is being executed, an input device used for application execution, an application execution time, a frequency of application execution, an application execution pattern, whether an application is being executed, the screen size of an application execution screen, an application execution screen mode (e.g., a landscape mode, a portrait mode, etc.), whether an application has an audio output, information associated with an application error, information on exceptions, or a combination thereof.

According to various embodiments of the disclosure, the processor 620 may classify applications registered in the server 601, based on state information of each electronic device (e.g., the electronic device 401 or second external electronic device 140) and application execution-related information, which are received from a plurality of electronic devices (e.g., the electronic device 401 or second external electronic device 140). According to an embodiment, the processor 620 may classify applications registered in the server 601 into applications, executions of which are possible, and applications, executions of which are impossible in a state of being connected to the external output device, based on the state information of each electronic device (e.g., the electronic device 401 or second external electronic device 140) and the application execution-related information, which are received from a plurality of electronic devices (e.g., the electronic device 401 or second external electronic device 140). For example, the processor 620 may analyze application execution-related information associated with a state of being connected to a first external electronic device, received from a plurality of electronic devices (e.g., the electronic device 401 or second external electronic device 140), and determine an average execution time of each application. The processor 620 compares an average execution time of each of the applications, received from a plurality of electronic devices (e.g., the electronic device 401 or second external electronic device 140), with a first threshold time, and determine whether each application is executable in a state of being connected to the external output device. For example, the processor 620 may determine applications having an average execution time, received from a plurality of electronic devices (e.g., the electronic device 401 or second external electronic device 140), less than a first threshold time, in a state of being connected to the first external electronic device, as applications, executions of which are impossible in a state of being connected to the external output device, and may determine applications having an average execution time greater than or equal to the first threshold time, in a state of being connected to the first external electronic device, as applications, executions of which are possible in a state of being connected to the external output device. In another example, the processor 620 may analyze application execution-related information associated with a state of being connected to the first external electronic device, received from a plurality of electronic devices (e.g., the electronic device 401 or second external electronic device 140), and check whether an error has occurred in each application. The processor 620 may determine applications having an error occurred in a state of being connected to the first external electronic device, as applications that cannot be executed in a state of being connected to the external output device, and may determine applications that do not have an error in a state of being connected to the first external electronic device, as applications that can be executed in a state of being connected to the external output device. According to an embodiment, the processor 620 may classify applications previously registered in the server 601 into applications, executions of which are possible, and applications, executions of which are impossible in a state of being connected to the external output device, based on the application-related information previously registered in the server 601. For example, based on application-related information registered by a developer and/or a service provider of each application, the processor 620 may determine whether each application is executable in a state of being connected to an external output device.

According to various embodiments of the disclosure, the processor 620 may determine a type of an external input device suitable for each of the applications, determined to be executable in a state of being connected to an external output device, based on information received from a plurality of electronic devices (e.g., the electronic device 401 or second external electronic device 140). For example, the processor 620 may make a determination on which type of external input device is suitable for executing each of the applications that can be executed in a state of being connected to an external output device, based on information received from a plurality of electronic devices (e.g., the electronic device 401 or second external electronic device 140). The type of external input device, which is suitable for the application, is determined by an execution time, a frequency of execution, an execution pattern, the size of an execution screen, an execution screen mode, and an input means in electronic devices (e.g., the electronic device 401 or second external electronic device 140) while being connected to the external output device. For example, when an average execution time of a first application being executed using a keyboard in the electronic devices (e.g., the electronic device 401 or second external electronic device 140) while being connected to the external output device is longer than an average execution time of the first application being executed using the joystick, the processor 620 may determine that the type of external input device suitable for the first application is the keyboard. According to various embodiments, the processor 620 may determine information associated with the suitability of execution of each of the applications in a state of being connected to the external output device, determined being executable in a state of being connected to an external output device, based on information received from a plurality of electronic devices (e.g., the electronic device 401 or second external electronic device 140). For example, the processor 620 may determine information indicating whether each of the applications is suitable for a state of being connected to the external output device or the suitability of execution in a state of being connected to the external output device, based on information received from a plurality of electronic devices (e.g., the electronic device 401 or second external electronic device 140. Whether an application is suitable for a state of being connected to the external output device or the suitability of execution in a state of being connected to the external output device may be determined by at least one of: an execution time, a frequency of execution, an execution pattern, the size of an execution screen, an execution screen mode, and an input means in electronic devices (e.g., the electronic device 401 or second external electronic device 140) while being connected to the external output device. For example, the processor 620 may determine at least one application, which has an average execution time longer than a second threshold time, in the electronic devices (e.g., the electronic device 401 or second external electronic device 140) while being connected to the external output device, as an application suitable to be executed in the electronic device 401 in a state of being connected to the external output device. The processor 620 may determine at least one application having an average execution time less than a second threshold time, in the electronic devices (e.g., the electronic device 401 or second external electronic device 140) in a state of being connected to the external output device, as an application that is not suitable to be executed in the electronic device 401 in a state of being connected to the external output device. In another example, the processor 620 may determine the suitability of execution for each application in the electronic device 401, based on the average execution time in the electronic devices (e.g., the electronic device 401 or second external electronic device 140) while being connected to the external output device. For example, the processor 620 may determine that the suitability of execution of a first application in the electronic device 401, of which an average execution time of the first application in the electronic devices (e.g., the electronic device 401 or second external electronic device 140) while being connected to the external output device is one hour, has a value higher than that of the suitability of execution of a second application in the electronic device 401, of which an average execution time of the second application in the electronic devices (e.g., the electronic device 401 or second external electronic device 140) while being connected to the external output device is five minutes. According to an embodiment, in relation to each of the applications being executable in a state of being connected to the external output device, the processor 620 may determine information indicating whether the application is suitable for a state of being connected to the external output device, or the suitability of application execution in a state of being connected to the external output device, based on whether the window size is adjustable for the application. For example, the processor 620 may determine an application for which the window size adjustment is possible as an application which is suitable for a state of being connected to the external output device, and may determine an application for which window size adjustment is impossible, as an application which is not suitable for a state of being connected to the external output device.

According to various embodiments of the disclosure, the processor 620 may determine at least one recommend application for a state of being connected to the external output device, based on the state information of the electronic device (e.g., the electronic device 401 or second external electronic device 140) and application execution-related information, received from a plurality of electronic devices (e.g., the electronic device 401 or second external electronic device 140). The recommended application may include an application that can be normally executed in a state of being connected to an external output device, applications having a higher number of times of execution in a state of being connected to the external output device, applications having a long average execution time in a state of being connected to the external output device, or an application that can be executed in a full screen mode in a state of being connected to an external output device. According to an embodiment, the processor 620 may classify a recommended application based on at least one of an external input device, an external output device, or user profile information. For example, the processor 620 may determine a recommended application according to an external input device, a recommended application according to an external output device, or a recommended application according to the user profile information, based on application execution-related information and state information of the electronic device (e.g., the electronic device 401 or second external electronic device 140), received from a plurality of electronic devices (e.g., the electronic device 401 or second external electronic device 140). For example, as a result of analyzing application execution-related information for the first application, when the average execution time consumed using the keyboard is 10 minutes and the average execution time consumed using the joystick is 1 hour, the processor 620 may determine the first application as a recommended application related to the joystick. In another example, as a result of analyzing application execution-related information for a second application, when the average input time by a mouse is 1 minute and the average input time by a keyboard input is 20 minutes, the processor 620 may determine the second application as a recommended application associated with the keyboard. In another example, as a result of analyzing application execution-related information for a third application, when the average execution time consumed using the monitor is 5 minutes and the average execution time consumed using the television is 30 minutes, the processor 620 may determine the third application as a recommended application related to the television. In another example, as a result of analyzing application execution-related information for a fourth application, when the proportion of users is high in his/her 20's, the processor 620 may determine the fourth application as a recommended application associated with the 20's. According to an embodiment, the recommended application may have one or more classification information. For example, the first application may be determined as a recommended application associated with each of "external input device: keyboard," "external output device: monitor," and "user age: 20's." According to an embodiment, the processor 620 may determine a recommended application associated to a full-screen mode, based on the state information of the electronic device (e.g., the electronic device 401 or second external electronic device 140) and application execution-related information, received from a plurality of electronic devices (e.g., the electronic device 401 or second external electronic device 140). The above-described examples of the classification and/or determination of recommended application are for the sake of understanding, and the recommended application classification and/or determination method thereof of the disclosure is not limited thereto.

According to various embodiments of the disclosure, the processor 620 may receive an application information request signal from the electronic device 401 and, in response to the reception of the application information request signal, may perform control to transmit information associated with the at least one application to the electronic device 401. According to an embodiment, the processor 620 may receive a recommended application information transmission request signal from the electronic device 401. In response to the reception of the recommended application information transmission request signal, the processor 620 may perform control to transmit, to the electronic device 401, information on a recommended application for each state of the electronic device 401. The recommended application information for each state of the electronic device 401 includes recommended application information corresponding to a state where an external output device is connected to the electronic device 401, recommended application information corresponding to a state where the external output device is not connected to the electronic device 401, a recommended application information for each external output device, recommended application information for each external input device, recommended application information for each user profile, or recommended application information according to whether to support a full screen mode. According to an embodiment, the processor 620 may receive a recommended application information transmission request signal including at least one of the state information of the electronic device 401 and the user profile information from the electronic device 401. The processor 620 may perform control to determine recommended applications corresponding to the state information of the electronic device 401 and transmit information on the determined recommended applications to the electronic device 401. For example, when the state information of the electronic device 401 is: "whether an external output device is connected: YES, a connected external output device: a monitor, and a connected external input device: a keyboard and a mouse," and the user profile information is "age: 20's, gender: male," the processor 620 may perform control to transmit, to the electronic device 401, at least one of recommended application information corresponding to a state of being connected to the external output device, recommended application information associated with the monitor, recommended application information associated with the keyboard, recommended application information associated with the mouse, and recommended application information associated with a male in his 20's. According to an embodiment, when the user profile information is not included in the recommended application information transmission request signal, the processor 620 may determine a recommended application by using the user profile information of the electronic device 401 previously registered in the memory 630. The recommended application information includes a recommended application type, a recommended application name, a package name of a recommended application, a video associated with the execution of a recommended application, the number of users who have used a recommended application, a graph indicating a change in the number of users who have executed or installed a recommended application, the number of users who have executed a recommended application during a certain period of time, an average execution time of a recommended application, an average execution time of a recommended applications during a certain period of time, the average number of times of execution of a recommended application, or a combination thereof. This is a description for the sake of understanding, and the recommended application information of the disclosure is not limited thereto.

According to an embodiment, the processor 620 receives, from the electronic device 401, a signal including information indicating applications installed in the electronic device 401 and, in response thereto, may perform control to transmit, to the electronic device 401, information indicating whether execution of the corresponding application is possible. For example, the processor 620 may receive, from the electronic device 401, a first signal including information indicating applications installed in the electronic device 401 and state information of the electronic device 401. The processor 620 may perform control to transmit, in response to the first signal, a first response signal including information indicating whether each application corresponding to the state information of the electronic device 401 is executable, to the electronic device 401. In another example, the processor 620 may receive, from the electronic device 401, a second signal including information indicating applications installed in the electronic device 401. As a response to the second signal, the processor 620 may perform control to transmit a second response signal including information indicating whether each application installed in the electronic device 401 is executable in each state of the electronic device to the electronic device 401. According to an embodiment, the first response signal and/or second response signal may include, for applications executable in a state of being connected to an external output device, information related to the suitability of execution in a state of being connected to an external output device. For example, in relation to each application that can be executed in a state of being connected to an external output device, the first response signal and/or second response signal may include information indicating whether the application is suitable for a state of being connected to the external output device, or the suitability of execution in a state of being connected to the external output device.

According to an embodiment, the processor 620 may control the communication module 640 to transmit, to the electronic device 401, both information indicating whether execution of at least one application installed in the electronic device 401 is possible and information on the recommended application.

According to various embodiments of the disclosure, the memory 630 may store software (e.g., the program 432), and input data and output data for instructions related thereto. According to an embodiment, the memory 630 may store state information of at least one electronic device (e.g., the electronic device 401 or second external electronic device 140) and application execution-related information, which are received from at least one electronic device (e.g., the electronic device 401 or second external electronic device 140). According to an embodiment, the memory 630 may store the recommended application information under the control of the processor 620. According to an embodiment, the memory 630 may store, for at least one application, information indicating whether execution of the application is possible according to the state of the electronic device, under the control of the processor 620.

According to various embodiments of the disclosure, the communication module 640 may transmit and receive signals and/or data to and from at least one electronic device through a network. The communication module 640 may support establishment of a wireless communication channel between the server 601 and the electronic device, and communication through the established communication channel.

Figure 6B:
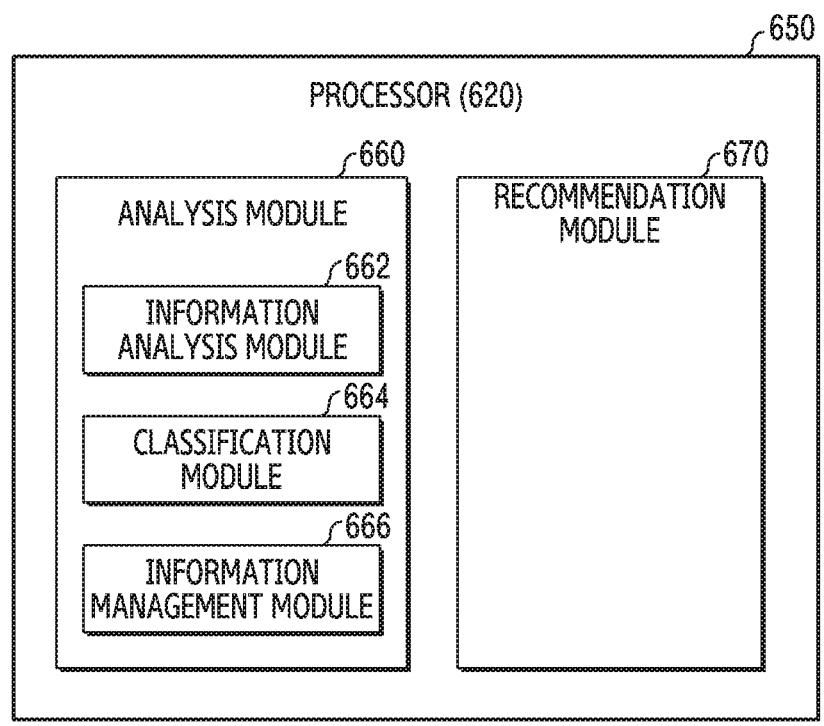
FIG. 6B is a block diagram of a processor according to an embodiment of the disclosure.

FIG. 6B is a block diagram 650 of a processor according to an embodiment of the disclosure.

Referring to FIG. 6B, the processor 620 may be the processor 620 shown in FIG. 6A. According to an embodiment, the processor 620 may include an analysis module 660 and a recommendation module 670.

According to various embodiments of the disclosure, the analysis module 660 may include an information analysis module 662, a classification module 664, or an information management module 666. According to an embodiment, the information analysis module 662 may perform a role of analyzing state information of the electronic device and application execution-related information, received from at least one electronic device. For example, the information analysis module 662 may analyze information received from at least one electronic device to determine whether the application is normally being executed in a state where the electronic device is connected to the external output device, an input device associated with the execution of the application, and information such as an application execution pattern. According to an embodiment, the classification module 664 may classify a plurality of applications based on various pieces of information. For example, the classification module 664 may classify applications registered in the server 601 into applications, executions of which are possible, and applications, executions of which are impossible depending on whether executions of applications are possible in a state of being connected to an external output device. In another example, the classification module 664 may classify, to recommended applications, some of the applications, executions of which are possible in a state of being connected to the external output device, based on information received from the at least one electronic device. In another example, the classification module 664 may classify, based on information received from at least one electronic device, recommended applications to a recommended application depending on an external input device, a recommended application depending on an external output device, a recommended application depending on a user profile, and a recommended application depending on whether the full screen mode is supported. According to an embodiment, the information management module 666 may generate lists of applications, classified by the classification module 664, and manage the generated lists.

According to various embodiments of the disclosure, the recommendation module 670 may determine a recommended application list, based on information received from the at least one electronic device. The recommendation module 670 may perform a control operation to transmit the determined recommended application list to the corresponding electronic device.

According to various embodiments of the disclosure, an electronic device (e.g., the electronic device 401) includes: a housing including a first surface and a second surface oriented in a direction opposite to the first surface; a touch screen display (e.g., the display device 440) exposed through a portion of the first surface; at least one wireless and/or wired communication circuit (e.g., the interface 450 and/or communication module 460) located inside the housing; at least one processor (e.g., the processor 420) located inside the housing and electrically connected to the communication circuit (e.g., the interface 450 and/or communication module 460) and the display; and a memory e.g., the memory 430) located inside the housing and electrically connected to the processor (e.g., the processor 420), wherein the memory (e.g., the memory 430) is configured to store a plurality of application programs downloaded through the communication circuit, the plurality of application programs include a first application program including a first user interface and a second application program including a second user interface, the memory (e.g., the memory 430) may store instructions which, when executed, cause the processor (e.g., the processor 420) to: receive information on a first application program from an external server through a communication circuit; in a first operation, display, on the display, a plurality of first icons arranged in a matrix, the plurality of first icons include a first application icon representing the first application program and a second application icon representing the second application program, when a first user input for selecting the first application icon is received, display the first user interface by using a first set of display properties, and when a second user input for selecting the second application icon is received, and display the second user interface by using the first set of display properties; in a second operation in which the electronic device is electrically connected to an external display device through the communication circuit, display a first window including a plurality of second icons arranged in a matrix, by the external display device, the plurality of second icons include a third icon representing the first application program, the third icon includes at least a portion of the first application icon and an indicator indicating that the first application program is changed to be used in the second operation based on at least a part of information; and when a third user input for selecting the third icon is received, display a third user interface, which has been changed according to the second operation, on the external display device, using a second set of display properties.

According to various embodiments of the disclosure, the first set of display properties and the second set of display properties differ in at least one of resolution, display size, density, or direction.

According to various embodiments of the disclosure, the instructions may cause the processor (e.g., the processor 420) to make a control to prevent the first application icon from indicating the first set of display properties.

According to various embodiments of the disclosure, the plurality of second icons further includes the second application icon, and the instructions cause a processor (e.g., the processor 420) to, in the second operation, when a fourth user input for selecting the second application icon is received, display the second user interface on the external display device by using the first set of display properties.

According to various embodiments of the disclosure, the first application program and the second application program may be a game application program.

According to various embodiments of the disclosure, the instructions cause a processor (e.g., the processor 420) to provide information on the operations of the first application program and the second application program executed in the second operation, to the external server (e.g., the server 601) via a communication circuit (e.g., the interface 450 and/or communication module 460).

According to various embodiments of the disclosure, the information on the operations includes at least one of an application type, user profile information, an input device used for application execution, an execution time, a frequency of execution, an execution screen size, an execution screen mode (landscape mode/portrait mode), whether an application has an audio output, or information associated with an application error.

According to various embodiments of the disclosure, the instructions cause a processor (e.g., the processor 420) to, in the second operation, when a fifth user input for selecting the third icon is received, display a second window containing usage information associated with the first application program on the external display device, and the usage information may be received from the external server (e.g., the server 601).

According to various embodiments of the disclosure, an electronic device (e.g., the electronic device 401) may include: a memory (e.g., the memory 430) for storing at least one application; a wireless and/or wired communication interface (e.g., the interface 450 or communication module 460); and a processor (e.g., the processor 420), the processor (e.g., the processor 420) is configured to: detect a display event for the at least one application; in response to the detection of the display event, determine whether the electronic device is connected to the external output device through the communication interface (e.g., the interface 450 or communication module 460); when the electronic device is connected to the external output device, determine whether the at least one application is executable, based on a state of connection with the external output device, and display, on the external output device, information indicating whether the at least one application is executable.

According to various embodiments of the disclosure, in an electronic device (e.g., the electronic device 401), a processor (e.g., the processor 420) may be configured to: receive, from a server (e.g., the server 601), information indicating whether execution of the at least one application is possible in a state of being connected to the external output device, and information on at least one recommended application that can be executed in a state of being connected to the external output device, through a communication interface (e.g., the interface 450 or communication module 460); and display, on the external output device, whether execution of the at least one application is possible and information on the at least one recommended application, at least partially based on the received information.

According to various embodiments of the disclosure, the information on the recommended application may include information on an application related to at least one of the external output device, the external input device connected to the electronic device, the user profile information of the electronic device, and whether a full screen support is possible.

According to various embodiments of the disclosure, in relation to an application, execution of which is possible in a state of being connected to the external output device, a processor (e.g., the processor 420) may be configured to further display, on the external output device, a symbol indicating the degree of suitability for execution of the application in a state of being connected to the external output device.

According to various embodiments of the disclosure, in an electronic device (e.g., the electronic device 401), a processor (e.g., the processor 420) may be configured to: detect execution of the at least one application, in response to the detection of the application execution, obtain state information indicating whether the electronic device and the external output device are connected and information related to execution of the application, and transmit, to a server (e.g., the server 601), the obtained state information of the electronic device (e.g., the electronic device 401) and the obtained information related to execution of the application.

According to various embodiments of the disclosure, the state information may include at least one of: information indicating whether the electronic device (e.g., the electronic device 401) is connected to an external input device, identification information of an external output device connected to the electronic device (e.g., the electronic device 401), and identification information of an external input device connected to the electronic device (e.g., the electronic device 401).

According to various embodiments of the disclosure, the information related to execution of the application may include at least one of: user profile information, an application type, input information generated while an application is being executed, an input device used for application execution, application execution time, a frequency of application execution, an application execution pattern, whether an application is being executed, a screen size of the application execution screen, an application execution screen mode, whether an application has an audio output, information associated with an application error, or information on exceptions.

According to various embodiments of the disclosure, a server (e.g., the server 601) includes: a communication module (e.g., the communication module 640); and a processor (e.g., the processor 620), and the processor (e.g., the processor 620) may obtain connection state information of the external output device and execution-related information of at least one application from at least one electronic device, determine whether execution of the at least one application is possible in a state of being connected to the external output device, based on the information on the connection state information of the external output device and the execution-related information of at least one application, and transmit, to the other electronic device (e.g., the electronic device 401), information indicating whether the at least one application is executable in a state of being connected to the external output device.

According to various embodiments of the disclosure, the processor (e.g., the processor 620) may perform control to transmit, to the other electronic device (e.g., the electronic device 401), information on at least one recommended application, which is executable in a state of being connected with the external output device.

According to various embodiments of the disclosure, the information on the recommended application may include information on an application related to at least one of an external output device, an external input device, user profile information, and whether full screen support is possible.

According to various embodiments of the disclosure, in relation to at least one application that can be executed in a state of being connected with the external output device, the processor (e.g., the processor 620) may be configured to control to transmit, to the other electronic device (e.g., the electronic device 401), the degree of suitability for execution of the application in a state of being connected with the external output device.

According to various embodiments of the disclosure, connection state information of the external output device may include information indicating whether the electronic device is connected to the external input device, identification information of the external output device connected to the electronic device, or identification information of an external input device connected to the electronic device.

According to various embodiments of the disclosure, the application execution-related information may include user profile information, an application type, information on input generated while an application is being executed, an input device used for application execution, an application execution time, a frequency of application execution, an application execution pattern, whether an application is being executed, a screen size of an application execution screen, an application execution screen mode, whether an application has an audio output, information associated with an application error, or information on exceptions.

Figure 7A:
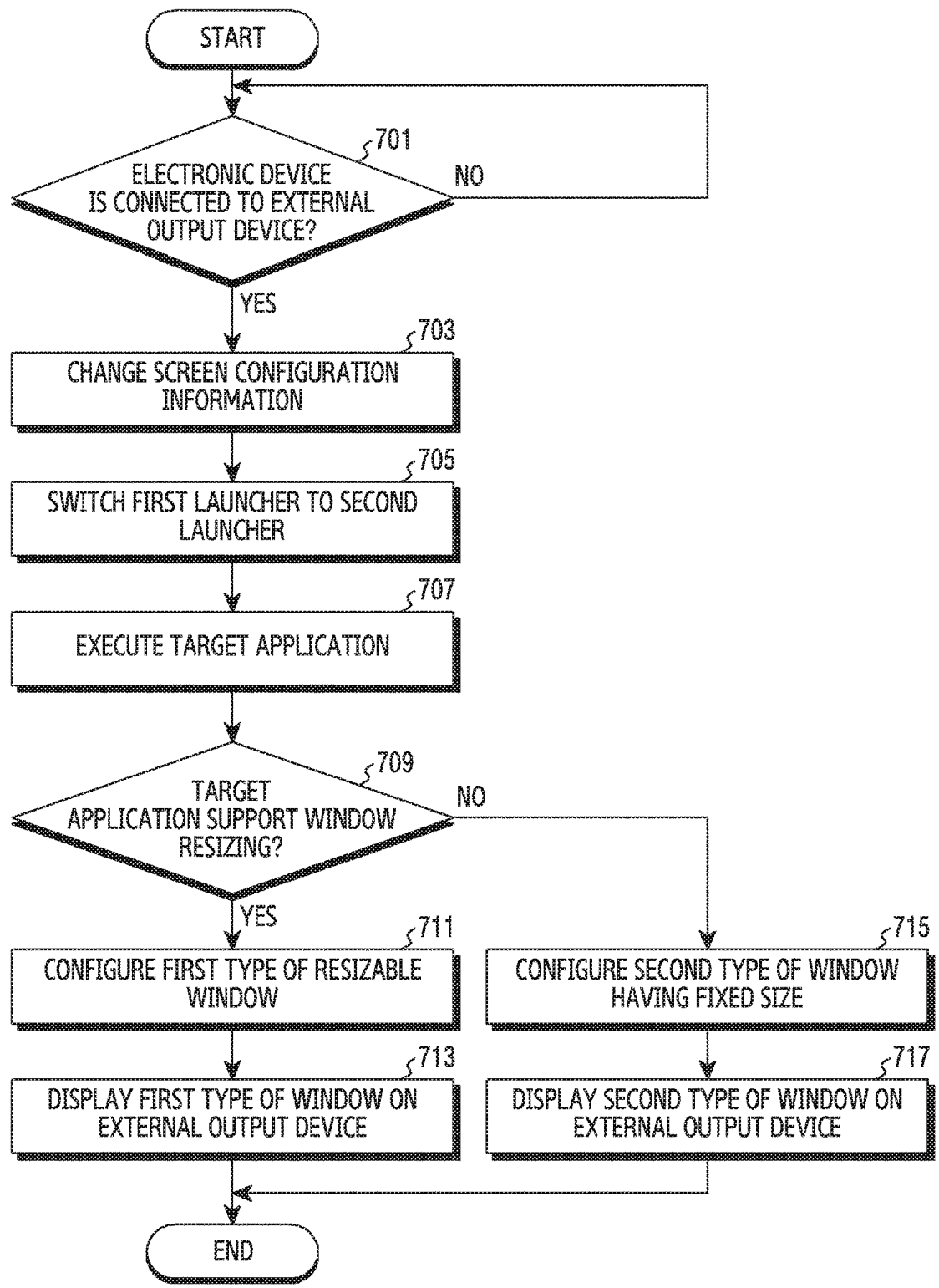
FIG. 7A is a flow diagram illustrating an application window in an electronic device according to an embodiment of the disclosure.

FIG. 7A is a flow diagram illustrating an application window in an electronic device according to an embodiment of the disclosure. In the following embodiment, respective operations may be sequentially performed, but are not necessarily performed sequentially. For example, the respective operation sequences may be changed, and at least two operations may be performed in parallel. Here, the electronic device may be the electronic device 100 of FIG. 1, the electronic device 201 of FIG. 2, and/or the electronic device 401 of FIG. 4.

Referring to FIG. 7A, in operation 701, the electronic device may determine whether the electronic device is connected to an external output device. For example, a processor (e.g., the processor 220 or processor 420) of the electronic device may determine whether the electronic device is connected to an external output device via a docking device (a relay device), a cable, or the like. In another example, a processor (e.g., the processor 220 or processor 420) of the electronic device may determine whether the electronic device is connected to an external output device in a wireless manner.

When the electronic device is connected to an external output device, in operation 703, the electronic device may change screen configuration information. For example, the processor (e.g., the processor 220 or processor 420) of the electronic device may change information on the resolution, density, or direction of the screen, generated in the electronic device, to be suitable for the external output device. The processor (e.g., the processor 220 or processor 420) of the electronic device may set the resolution, density, or direction of the screen generated in the electronic device.

In operation 705, the electronic device may switch a first launcher to a second launcher. For example, the processor (e.g., the processor 220 or processor 420) of the electronic device may execute a first launcher for providing a UI and UX, used for displaying on the display device of the electronic device before the electronic device is connected to an external output device. For example, when the electronic device is connected to the external output device, the processor (e.g., the processor 220 or processor 420) of the electronic device may execute a second launcher that provides UI and UX for the external output device.

In operation 707, the electronic device may execute a target application. For example, the processor (e.g., the processor 220 or processor 420) of the electronic device may execute the target application by selecting an application on a screen provided by the second launcher. In another example, the processor (e.g., the processor 220 or processor 420) of the electronic device may maintain execution of an application which is being executed before the electronic device is connected to the external output device.

In operation 709, the electronic device may determine whether the target application supports window resizing. For example, the processor (e.g., the processor 220 or processor 420) of the electronic device may determine whether the target application supports window resizing, based on whether support for resizing is declared in the manifest of the target application, whether the target application is a preload application, and/or whether the target application is included in a white list.

When the target application supports window resizing, in operation 711, the electronic device may configure a first type of resizable window. For example, the processor (e.g., the processor 220 or processor 420) of the electronic device may create a first type of window for displaying an execution screen of the target application in a screen created based on screen configuration information, which is changed suitably to the external output device. The first type of window may be created to be resizable.

In operation 713, the electronic device may display the first type of window on the external output device. For example, the processor (e.g., the processor 220 or processor 420) of the electronic device may display the execution screen of the target application in the first type of window. A processor (e.g., the processor 220 or processor 420) of the electronic device may resize the first type of window.

When the target application does not support the window resizing, in operation 715, the electronic device may configure a second type of window having a fixed size. For example, the processor (e.g., the processor 220 or processor 420) of the electronic device may create a second type of window for displaying an execution screen of the target application in a screen created based on screen configuration information, which is changed suitably to the external output device. The second type of window may be created to be un-resizable.

In operation 717, the electronic device may display the second type of window on the external output device. For example, the processor (e.g., the processor 220 or processor 420) of the electronic device may display an execution screen of the target application in the second type of window. The electronic device may not allow resizing of the second type of window.

Figure 7B:
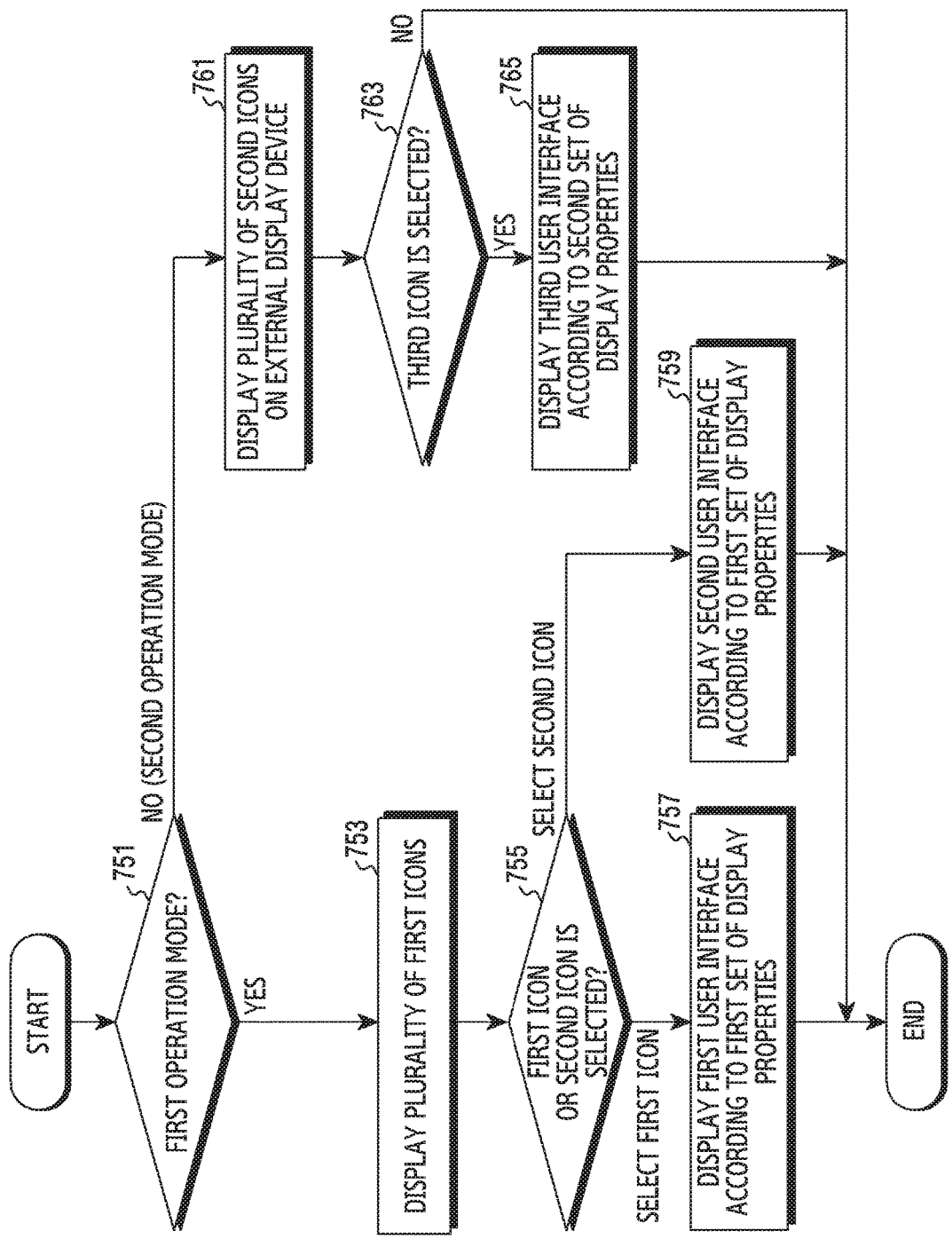
FIG. 7B is a flow diagram illustrating a user interface in an electronic device according to an embodiment of the disclosure.
Figure 7C:
FIG. 7C illustrates a screen configuration for displaying a list of applications in an electronic device which is not connected to an external output device according to an embodiment of the disclosure.

FIG. 7B is a flow diagram illustrating a user interface in an electronic device according to an embodiment of the disclosure. In the following embodiment, respective operations may be performed sequentially, but are not necessarily performed sequentially. For example, the respective operation sequences may be changed, and at least two operations may be performed in parallel. Here, the electronic device may be the electronic device 100 of FIG. 1, the electronic device 201 of FIG. 2, and/or the electronic device 401 of FIG. 4. Hereinafter, the operational procedure of FIG. 7B will be described with reference to FIG. 7C. FIG. 7C shows a screen configuration 770 for displaying a list of applications in an electronic device which is not connected to an external output device according to various embodiments of the disclosure.

Referring to FIGS. 7B and 7C, in operation 751, the electronic device may determine whether the electronic device is in a first operation mode or not. For example, the processor (e.g., the processor 220 or processor 420) of the electronic device may determine whether the electronic device is in a first operation mode, which is a state of not being connected to an external display device (e.g., the external output device 104), or in a second operation mode, which is a state of being connected to the external display device (e.g., the external output device 104). According to an embodiment, the electronic device may be directly connected to an external display device (e.g., the external output device 104), or may be connected thereto in a wired or wireless manner via a docking device (a relay device).

In the first operation mode, in operation 753, the electronic device may display a plurality of first icons. The processor of the electronic device (e.g., the processor 220 or processor 420) may display a plurality of first icons arranged in a matrix on a display device (e.g., the display device 260 or display device 440). The plurality of first icons may include a first application icon representing the first application program and a application second icon representing the second application program. For example, as shown in FIG. 7C, the processor of the electronic device (e.g., the processor 220 or processor 420) may display a plurality of icons representing each of the plurality of application programs by arranging the same in a matrix. According to an embodiment, the first application program may include a first user interface, and the second application program may include a second user interface. The first user interface may include a first type of resizable window, and the second user interface may include a second type of window having a fixed size. According to an embodiment, the first application program and the second application program may be a game application program.

In operation 755, the electronic device may detect whether a user input for selecting a first application icon or second application icon is received. For example, the processor (e.g., the processor 220 or processor 420) of the electronic device may detect whether a first user input for selecting a first application icon is received or a second user input for selecting a second application icon is received.

When the first user input for selecting the first application icon is received, in operation 757, the electronic device may display a first user interface by using a first set of display properties. The first set of display properties may include at least one of resolution, display size, density, or direction of the display device (e.g., the display device 260 or display device 440). For example, the processor (e.g., the processor 220 or processor 420) of the electronic device may display a first user interface according to at least one of the resolution, display size, density, or direction of the display device (e.g., the display device 260 or display device 440).

When the second user input for selecting a second application icon is received, in operation 759, the electronic device may display a second user interface by using the first set of display properties. For example, the processor (e.g., the processor 220 or processor 420) of the electronic device may display a second user interface according to at least one of the resolution, display size, density, or direction of the display device (e.g., the display device 260 or display device 440).

Figure 9A:
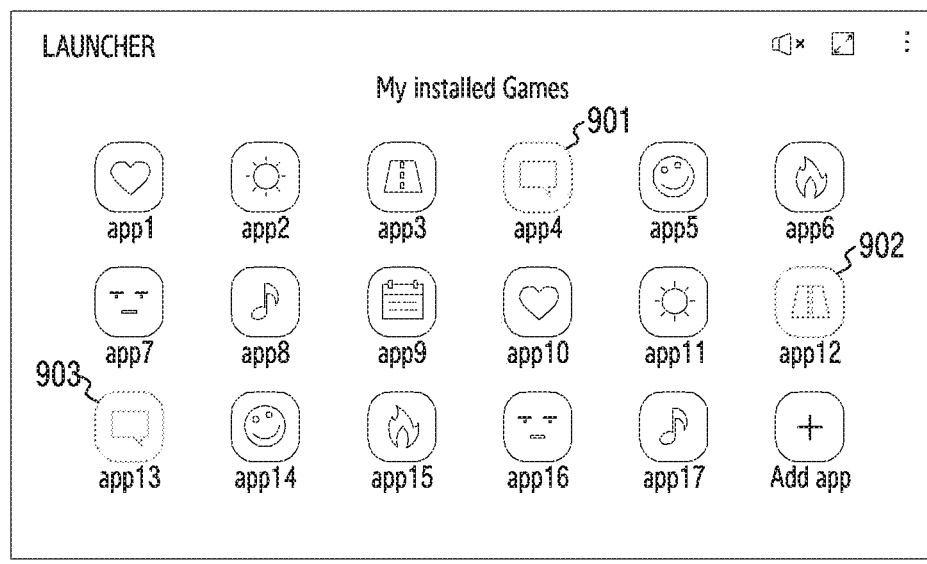
FIGS. 9A, 9B, 9C, and 9D illustrate a screen configuration for displaying a list of applications in an electronic device according to an embodiment of the disclosure.
Figure 9B:
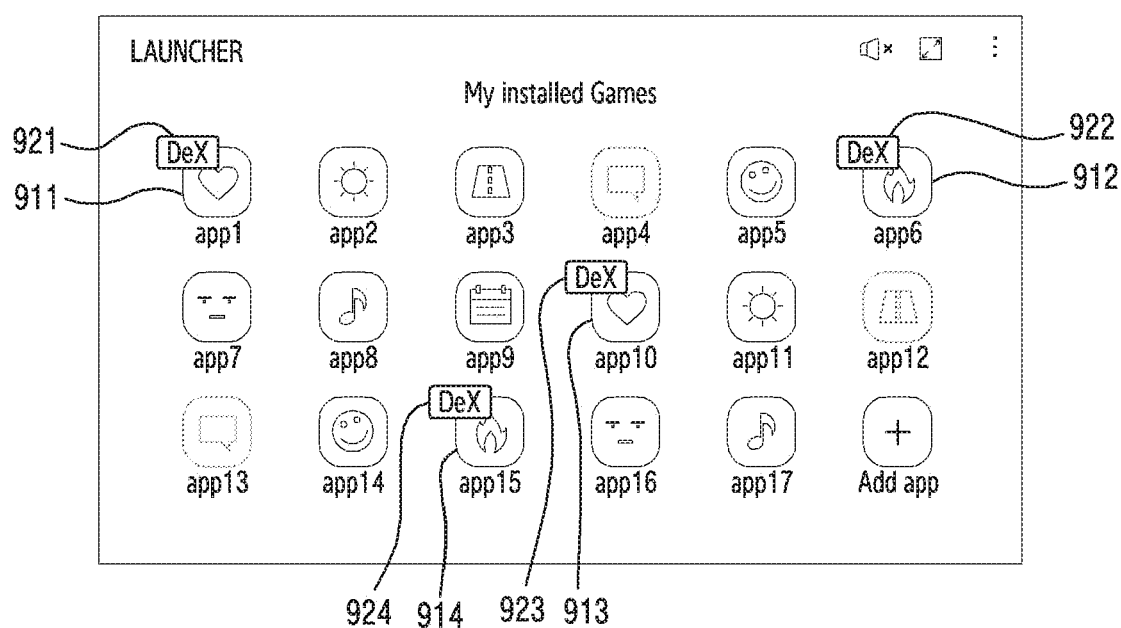

In the second operation mode, in operation 761, the electronic device may display a plurality of second icons on the external display device (e.g., the external output device 104). The processor (e.g., the processor 220 or processor 420) of an electronic device may control an external display device (e.g., the external output device 104) to display a first window including a plurality of second icons arranged in a matrix. The plurality of second icons may include a third icon representing a first application program. The third icon includes at least a portion of the first application icon and an indication indicating that the first application program has been changed to be used in the second operation mode, at least partially based on the information for a first application program received from the external server. For example, as shown in FIG. 9B, a processor (e.g., the processor 220 or processor 420) of the electronic device may display a third icon including at least a portion of a first application icon 911 and a preconfigured symbol 921 indicating that the first application program is suitable to be executed in a desktop extension mode (e.g., DeX mode). According to an embodiment, the first application icon 911 shown in FIG. 9B may be the same icon as an icon representing the first application program among a plurality of first icons shown in FIG. 7C.

In operation 763, the electronic device may detect whether a user input for selecting the third icon is received. For example, the processor (e.g., the processor 220 or processor 420) of the electronic device may detect whether a third user input for selecting a third icon is received.

When the third user input for selecting the third icon is received, in operation 765, the electronic device may control an external display device (e.g., the external output device 104) to display a third user interface, which is changed using a second set of display properties to be suitable to the second operation mode. The second set of display properties may include at least one of resolution, display size, density, or direction of the external display device (e.g., the external output device 104). For example, the processor (e.g., the processor 220 or processor 420) of the electronic device may display the third user interface according to at least one of resolution, display size, density, or direction of the external display device (e.g., the external output device 104). The first set of display properties and the second set of display properties may differ in at least one of resolution, display size, density, or direction.

Although not shown in FIG. 7B, a plurality of second icons may further include a second application icon. In response to the reception of a fourth user input for selecting the second application icon in the second operation mode, the electronic device may perform control to display the second user interface on the external display device (e.g., the external output device 104) by using the first set of display properties. For example, since the second user interface includes the second type of window having a fixed size, the second user interface is not displayed according to the second set of display properties, which is the display property for the external display device (e.g., the external output device 104), but is displayed on the external display device (e.g., the external output device 104) according to the first set of display properties, which is the display property for the display device (e.g., the display device 260 or display device 440) of the electronic device.

Figure 8:
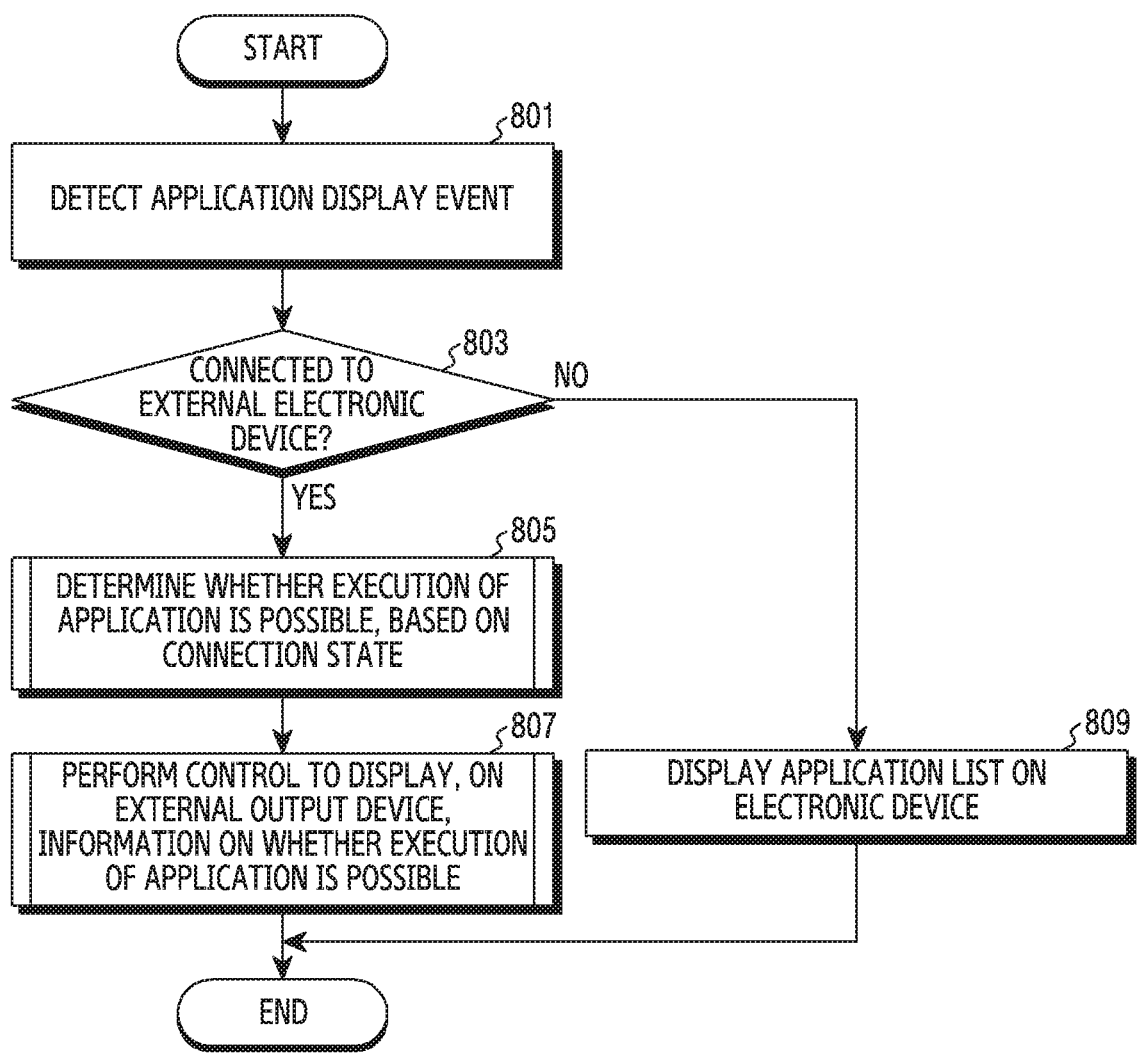
FIG. 8 is a flow diagram illustrating a list of applications in an electronic device according to an embodiment of the disclosure.
Figure 9C:
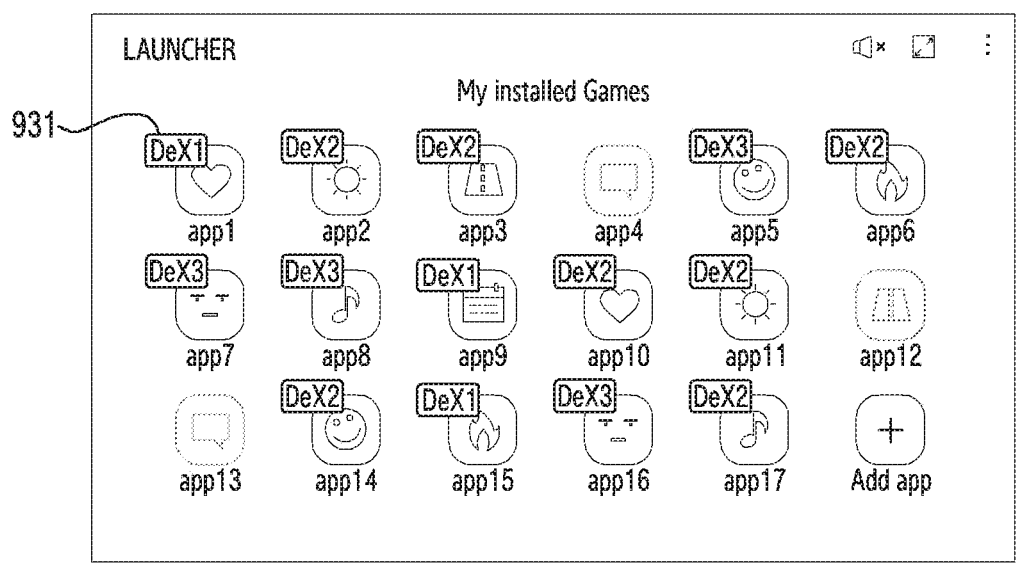

FIG. 8 is a flow diagram illustrating a list of applications in an electronic device according to an embodiment of the disclosure. In the following embodiment, respective operations may be performed sequentially, but are not necessarily performed sequentially. For example, the respective operation sequences may be changed, and at least two operations may be performed in parallel. Here, the electronic device may be the electronic device 100 of FIG. 1, the electronic device 201 of FIG. 2, and/or the electronic device 401 of FIG. 4. Hereinafter, the operation procedure of FIG. 8 will be described with reference to FIGS. 9A, 9B, 9C, and 9D. FIGS. 9A, 9B, and 9C illustrate a screen configuration for displaying a list of applications in an electronic device according to various embodiments of the disclosure.

Referring to FIGS. 8, 9A, 9B, 9C, and 9D, in operation 801, the electronic device may detect an application display event. The application display event may include at least one of: a management application execution event that manages at least one other application, an application list view event, an event of selecting an item (e.g., folder) including at least one application, an event by which a screen-off state is changed to a screen-on state. For example, when execution of a game launcher application is detected, the processor (e.g., the processor 220 or processor 420) may determine that an event of displaying game applications has been generated. In another example, when a user input to the application list view item is detected, a processor (e.g., the processor 220 or processor 420) may determine that an event of displaying applications installed in the electronic device has been generated. In another example, when a user input to a folder item including at least one application is detected, a processor (e.g., the processor 220 or processor 420) may determine that an event of displaying at least one application included in the folder has been generated. According to an embodiment, at least one event of the above described events may be detected based on a user input, performed by an input device (e.g., the input device 250 or input device 470) of the electronic device, or an external input device (e.g., the external input device 106) connected to the electronic device.

In operation 803, the electronic device may determine whether the electronic device is in a state of being connected to an external output device. According to various embodiments, a processor (e.g., the processor 220 or processor 420) may collect state information of the electronic device, and determine whether the electronic device is connected to an external output device (e.g., the external output device 104), based on the collected state information. According to an embodiment, a processor (e.g., the processor 220 or processor 420) may determine whether the electronic device is in a state of being connected to the external output device, based on signals transmitted and received via an interface (e.g., the interface 450). According to an embodiment, a processor (e.g., the processor 220 or processor 420) may determine whether the electronic device is in a state of being connected to the external output device, based on a current operation mode of the electronic device. For example, when the current operating mode of the electronic device is a desktop extension mode, the processor (e.g., the processor 220 or processor 420) may determine that the external output device is connected to the electronic device. The state information of the electronic device may include information indicating whether the electronic device is connected to the external output device, identification information of the external output device, information indicating whether the electronic device is connected to an external input device, identification information of the external input device, or a combination thereof.

In response to a state of not being connected to the external output device, in operation 809, the electronic device may display a list of applications including at least one application on a display device (e.g., the display device 260 or display device 440) of the electronic device.

In response to a state of being connected to the external output device, in operation 805, the electronic device may determine whether the at least one application is executable, based on a state of connection with the external electronic device. According to various embodiments, a processor (e.g., the processor 220 or processor 420) may determine whether at least some of the applications installed in the electronic device are executable in a state of being connected to the external electronic device. According to an embodiment, a processor (e.g., the processor 220 or processor 420) may control a communication module (e.g., the communication module 460) to transmit, to a server, a first signal including state information of the electronic device and identification information for at least one application installed in the electronic device. The processor (e.g., the processor 220 or processor 420) may receive, in response to the first signal, a first response signal including information on whether execution of at least one application is possible. For example, the first response signal may include information on applications, executions of which are possible, and information on applications, executions of which are impossible in a state of being connected to the external output device, among the applications installed in the electronic device. According to an embodiment, the first response signal may further include information indicating an application suitable to be executed using an external input device connected to the electronic device, among applications installed in the electronic device. For example, when the external input device connected to the electronic device is a keyboard, the first response signal may further include information on an application suitable to be executed using the keyboard, among the applications installed in the electronic device. According to an embodiment, a processor (e.g., the processor 220 or processor 420) may control a communication module (e.g., the communication module 460) to transmit, to the server, a second signal including identification information on at least one application installed in the electronic device. As a response to the second signal, the processor (e.g., the processor 220 or processor 420) may receive a second response signal including information on whether at least one application installed in the electronic device is executable in each state of the electronic device. For example, the second response signal may include information on applications, executions of which are possible and information on applications, executions of which are impossible in a state of being connected to the external output device. According to an embodiment, the second response signal may further include information indicating which external input device is suitable for executing the respective applications installed in the electronic device. For example, the second response signal may further include information indicating that a keyboard is suitable for executing the first application and a joystick is suitable for executing the second application.

In operation 807, the electronic device may perform control to display, on the external output device, information on whether execution of at least one application is possible. According to various embodiments, a processor (e.g., the processor 220 or processor 420) may perform control, based on state information of the electronic device, to display information indicating whether the at least one application is executable on a display device (e.g., the display device 440) or an external output device (e.g., the external output device 104). When the state of the electronic device corresponds to a state of being connected to the external output device, the processor (e.g., the processor 220 or processor 420) may perform control to display, on the external output device, information indicating whether at least one application installed in the electronic device is executable. According to an embodiment, a processor (e.g., the processor 220, processor 420) may indicate whether execution of an application is possible using at least one of icons, symbols, text, images, colors, transparency, definition, and a display area, or a combination thereof.

For example, as shown in FIG. 9A, a processor (e.g., the processor 220 or processor 420) may perform control such that icons 901, 902, and 903 of applications that are not executable in a state of being connected to an external electronic device are more blurred than icons of applications that are executable, so as to indicate whether each application is executable or not. According to an embodiment, a processor (e.g., the processor 220 or processor 420) may indicate whether at least one application is a suitable application to be executed in a state of being connected to the external output device, or the suitability of execution thereof, by using at least one of icons, symbols, text, images, color, transparency, definition, and size, or a combination thereof.

For example, as shown in FIG. 9B, a processor (e.g., the processor 220 or processor 420) may perform control to additionally display preconfigured symbols 921, 922, 923, and 924 on the first application icons 911, 912, 913, and 914 of applications, suitable being executed in a state of being connected to an external output device, so that it is possible to indicate that the corresponding applications are suitable applications to be executed in a state of being connected to the external output device.

In another example, as shown in FIG. 9C, a processor (e.g., the processor 220 or processor 420) may additionally display symbols 931 representing the suitability of execution of each of the icons of applications that can be executed in a state of being connected to the external output device, so that it is possible to indicate the degree of suitability of execution of the applications in a state of being connected to the external output device. The suitability of execution of each application may be determined, for example, based on the average execution time in a second state of other electronic devices. For example, the suitability of execution for an application of which an average execution time in the second state of other electronic devices is longer than a first reference time may be DeX 1, which is the highest grade, the suitability of execution for an application having an average execution time shorter than the first reference time and longer than a second reference time may be DeX 2, which is the next grade. The suitability of execution for an application of which the average execution time to the second state in other electronic devices is shorter than the second reference time may be DeX 3, which is the lowest grade. The grades (e.g., DeX 1, DeX 2, DeX 3) indicating the suitability of execution are illustrative, and the suitability of execution of the disclosure is not limited thereto. According to an embodiment, a processor (e.g., the processor 220 or processor 420) may additionally indicate at least one type of application, by using at least one of icons, symbols, text, image, color, transparency, definition, and size, or a combination thereof.

Figure 9D:
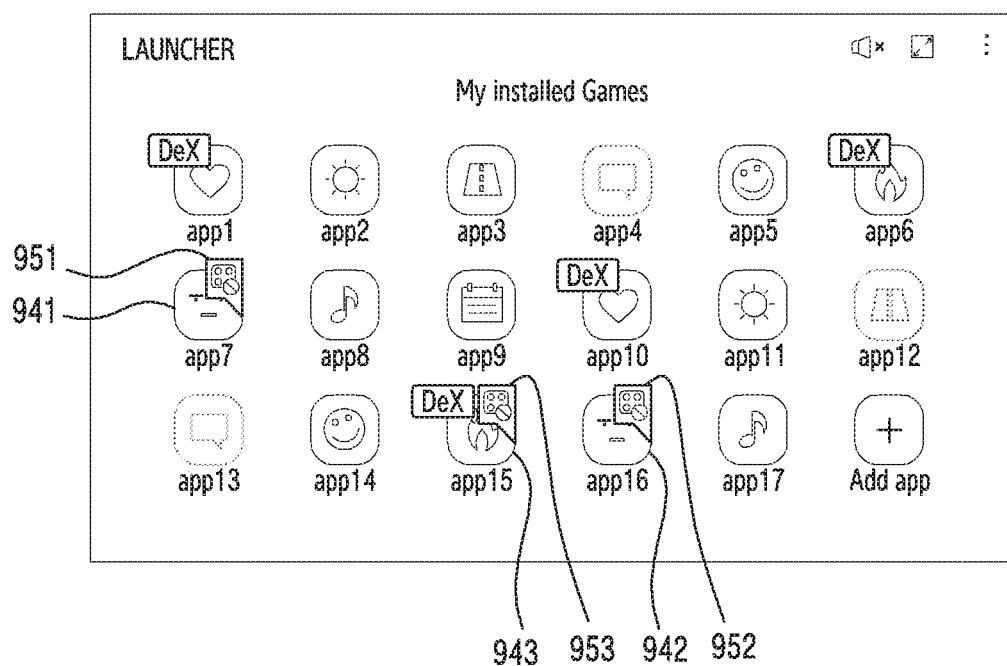

For example, as shown in FIG. 9D, a processor (e.g., the processor 220 or processor 420) may perform control to additionally display preconfigured symbols 951, 952, and 953 onto icons 941, 942, and 943 of applications, so that it is possible to indicate that the type of the corresponding applications is not a game type but the type of other applications is a game type. According to an embodiment, a processor (e.g., the processor 220 or processor 420) may perform control to arrange the corresponding applications, based on at least one of: whether each application is executable, whether each application is a suitable application, the suitability of execution, types of applications, and the system control suitability of the application, and display the applications on an external output device in its arranged order. According to an embodiment, a processor (e.g., the processor 220 or processor 420) may perform control to display, on the external output device 104, information on a recommended application associated with the state of being connected to the external output device. The operation of displaying information on the recommended application will be described in detail with reference to FIG. 12, and FIGS. 13A, 13B, and 13C.

Figure 10:
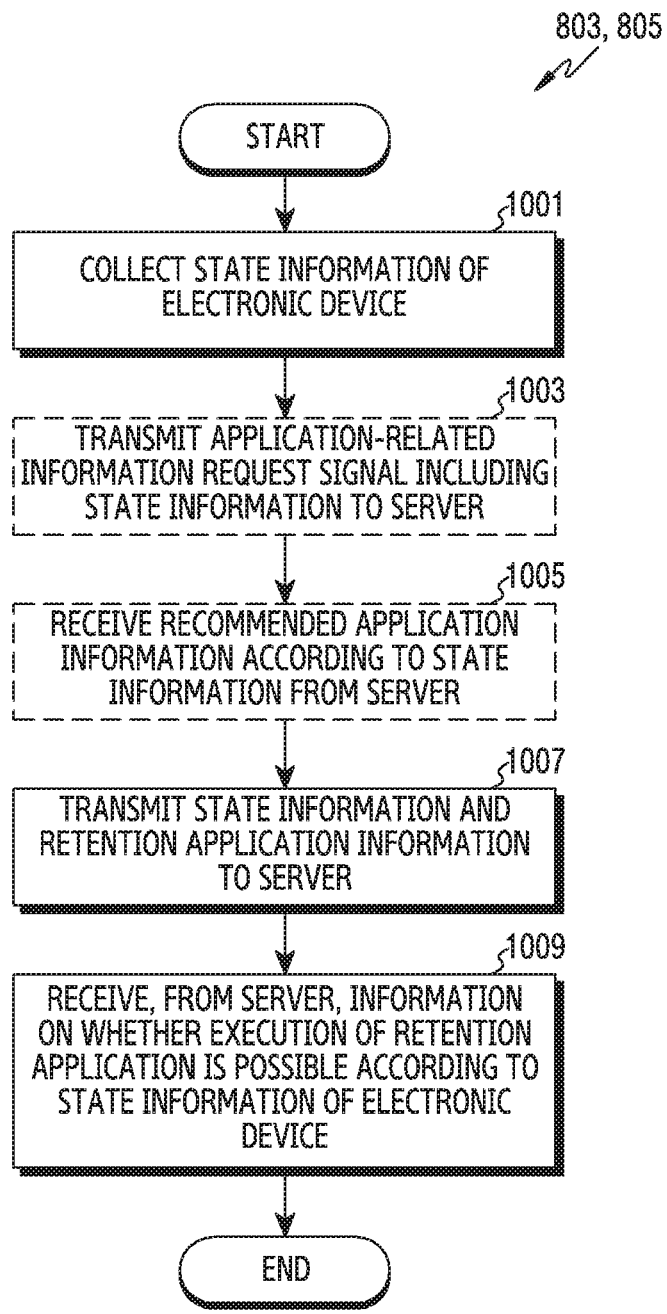
FIG. 10 is a flow diagram illustrating a process of obtaining information on whether execution of an application is possible in an electronic device according to an embodiment of the disclosure.

FIG. 10 is a flow diagram illustrating a process of obtaining information on whether execution of an application is possible in an electronic device according to an embodiment of the disclosure. Operation 803 and operation 805 in FIG. 8 will be described in detail below. In the following embodiment, respective operations may be performed sequentially, but are not necessarily performed sequentially. For example, the respective operation sequences may be changed, and at least two operations may be performed in parallel. The operation indicated by a dotted line in FIG. 10 may be omitted according to an embodiment. Here, the electronic device may be the electronic device 100 of FIG. 1, the electronic device 201 of FIG. 2, and/or the electronic device 401 of FIG. 4.

Referring to FIG. 10, in operation 1001, the electronic device may collect state information of the electronic device. For example, a processor (e.g., the processor 220 or processor 420) may collect state information of the electronic device as described in operation 803 of FIG. 8.

In operation 1003, the electronic device may transmit an application-related information request signal including state information to the server. According to an embodiment, a processor (e.g., the processor 220 or processor 420) may transmit an application-related information request signal including information indicating that the electronic device is connected to the external output device. The information indicating that the electronic device is connected to the external output device may include information indicating that the electronic device is operating in a desktop extension mode. The application-related information request signal may be a signal requesting information of a recommended application associated with a state of the electronic device. According to an embodiment, a processor (e.g., the processor 220 or processor 420) may transmit, to the server, application-related information request signal including at least one of: information indicating that the electronic device is connected to the external output device, identification information of an external output device, information indicating that the electronic device is connected to an external input device, and identification information of an external input device. According to an embodiment, the application-related information request signal may include at least one of identification information of the electronic device and user profile information, in addition to the state information.

In operation 1005, the electronic device may receive, from the server, recommended application information according to the state information. According to an embodiment, in response to transmission of the application-related information request signal, a processor (e.g., the processor 220 or processor 420) may receive, from the server, recommended application information according to the state information of the electronic device. For example, the processor (e.g., the processor 220 or processor 420) may receive information on the recommended applications corresponding to a state of being connected to the external output device. According to an embodiment, the recommended application information includes information on recommendation applications associated with an external output device connected to the electronic device, information on recommendation applications associated with an external input device connected to the electronic device, information on recommendation applications associated with a user profile, or a combination thereof.

In operation 1007, the electronic device may transmit, to the server, state information and retention application information of the electronic device. According to an embodiment, in response to reception of the recommended application information, a processor (e.g., the processor 220 or processor 420) may transmit, to the server, the state information and retention application information of the electronic device. According to an embodiment, a processor (e.g., the processor 220 or processor 420) may transmit, to the server, state information that is not transmitted in operation 1003 among the state information of the electronic device and the retention application information. For example, in operation 1003, when only information indicating that the electronic device is connected to the external output device is transmitted to the server, in operation 1007, a processor (e.g., the processor 220 or processor 420) may transmit, to the server, retention application information and at least one of identification information of the external output device, information indicating that the external input device is connected to the electronic device, and identification information of an external input device. The retention application information may include identification information of at least one application installed in the electronic device. The identification information of the application may include at least one of an application name, an application ID, and an application package name. According to an embodiment, when all pieces of state information of the electronic device is transmitted to the server in operation 1003, in operation 1007, a processor (e.g., the processor 220 or processor 420) may transmit, to the server, only the retention application information.

In operation 1009, the electronic device may receive, from the server, information on whether execution of the retention application depending on the state information of the electronic device is possible. According to an embodiment, in response to transmission of the retention application information and the state information of the electronic device, a processor (e.g., the processor 220 or processor 420) may receive, from the server, a response signal including information on whether execution of an application is possible depending on the state information of an electronic device. For example, the processor (e.g., the processor 220 or processor 420) may receive a response signal including information indicating whether each of the retained applications is executable in a state of being connected to an external output device. According to an embodiment, the response signal may further include information on an application that is suitable to be executed using an external input device connected to the electronic device, among the retained applications. For example, when the external input device connected to the electronic device is a keyboard, the response signal may further include information on an application that is suitable to be executed using the keyboard, among the retained applications. According to an embodiment, the response signal may include information associated with the suitability of execution of an application that can be executed in a state of being connected to the external output device to the electronic device. For example, in relation to each application that can be executed in a state where the external electronic device is connected to the electronic device, the response signal may include information indicating whether or not the application is suitable to the corresponding state or the suitability of execution in the corresponding state. Whether or not the application is suitable to the corresponding state or the suitability of execution in the corresponding state is determined based on at least one of an execution time, a frequency of execution, an execution pattern, a size of the execution screen, an execution screen mode, an input means, information associated with an error, or information on exceptions. For example, at least one application of which an average execution time in other electronic devices while being connected to the external output device is longer than a threshold time may be determined as an application relating to a state of being connected to the external output device, and at least one application of which an average execution time in other electronic devices while being connected to the external output device is shorter than the threshold time may be determined as an application that is not suitable for a state of being connected to the external output device. In another example, based on the average execution time in other electronic devices while being connected to the external output device, the suitability of execution of each application for the corresponding state may be determined. For example, it may be determined that the suitability of execution of a first application having an average execution time of 1 hour in other electronic devices while being connected to the external output device has a value higher than that of the suitability of execution of a second application having an average execution time of 5 minutes in other electronic devices while being connected to the external output device. According to an embodiment, whether an application is suitable for the corresponding state or the suitability of execution in the corresponding state may be determined based on whether a window size is adjustable for an application. For example, an application for which a window size is adjustable may be determined as an application relating to a state of being connected to the external output device, and an application for which the window size is not adjustable may be determined as an application not suitable for a state of being connected to the external output device.

Figure 11:
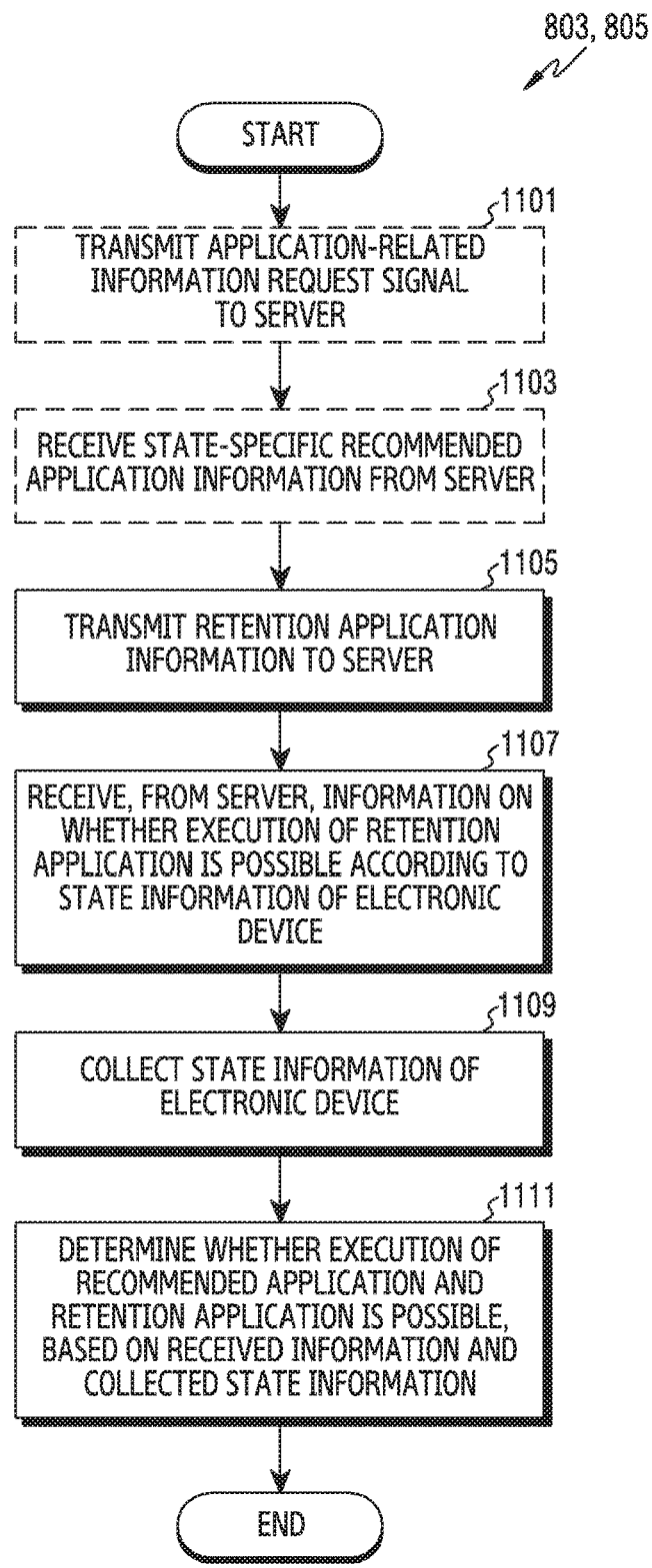
FIG. 11 is a flow diagram illustrating a process of obtaining information on whether execution of an application is possible in an electronic device according to an embodiment of the disclosure.

FIG. 11 is a flow diagram for obtaining information on whether execution of an application is possible in an electronic device according to an embodiment of the disclosure. Operation 803 and operation 805 in FIG. 8 will be described in detail below. In the following embodiment, respective operations may be performed sequentially, but are not necessarily performed sequentially. For example, the respective operation sequences may be changed, and at least two operations may be performed in parallel. The operation indicated by a dotted line in FIG. 11 may be omitted according to an embodiment. Here, the electronic device may be the electronic device 100 of FIG. 1, the electronic device 201 of FIG. 2, and/or the electronic device 401 of FIG. 4.

Referring to FIG. 11, in operation 1101, the electronic device may transmit an application-related information request signal to the server. The application-related information request signal may include at least one of electronic device identification information, and user profile information. The application-related information request signal may be a signal for requesting information on a recommended application.

In operation 1103, the electronic device may receive, from the server, state-specific recommended application information. According to an embodiment, in response to transmission of the application-related information request signal, a processor (e.g., the processor 220 or processor 420) may receive, from the server, recommended application information corresponding to various states. For example, the recommended application information may include recommended application information corresponding to a state of being connected to the external output device, and recommended application information corresponding to a state of not being connected to the external output device. The recommended application corresponding to a state of being connected to the external output device may include recommended application information for each external output device, recommended application information for each external input device, or recommended application information related to a user profile.

In operation 1105, the electronic device may transmit retention application information of the electronic device to the server. According to an embodiment, in response to reception of the recommended application information, a processor (e.g., the processor 220 or processor 420) may transmit the retention application information of the electronic device to the server. The retention application information may include identification information of at least one application installed in the electronic device. The identification information of the application may include at least one of an application name, an application ID, and an application package name.

In operation 1107, the electronic device may receive, from the server, information on the retention application of the electronic device whether the retention application is executable in each state of the electronic device. According to an embodiment, in response to transmission of the retention application information, a processor (e.g., the processor 220 or processor 420) may receive, from the server, a response signal including information on whether execution of applications corresponding to various states is possible. For example, in relation to each of the retained applications, the processor (e.g., the processor 220 or processor 420) may receive a response signal including whether it is executable in a state of being connected to the external output device and whether it is executable in a state of not being connected to the external output device. According to an embodiment, the response signal may further include information indicating that which external input device is suitable for executing each of the retained applications. For example, the response signal may further include information indicating that a keyboard is suitable for executing the first application and a joystick is suitable for executing the second application According to an embodiment, the response signal may include the information associated with the suitability of execution, which is the same as the response signal described in operation 1009 of FIG. 10.

In operation 1109, the electronic device may collect state information of the electronic device. For example, the processor (e.g., the processor 220 or processor 420) may collect state information of the electronic device as described in operation 803 of FIG. 8.

In operation 1111, based on the information received from the server and the collected state information, the electronic device may determine whether execution of the recommended application and execution of the retention application are possible. According to an embodiment, a processor (e.g., the processor 220 or processor 420) may determine, based on the information on the state-specific recommended application received in operation 1103, recommended applications corresponding to the state information of the electronic device as applications to be display on the screen. According to an embodiment, a processor (e.g., the processor 220 or processor 420) may determine whether execution of the retention application is possible, based on the information on whether state-specific execution of the retention application is possible and the state information of the electronic device, received in operation 1107.

In FIGS. 9A, 9B, 9C, 9D, and 10 described above, the recommended application information and information on whether execution of the retention application is possible are received through separate signals. However, according to an embodiment, the recommended application information and information on whether execution of the retention application is possible may be received through one signal.

Figure 12:
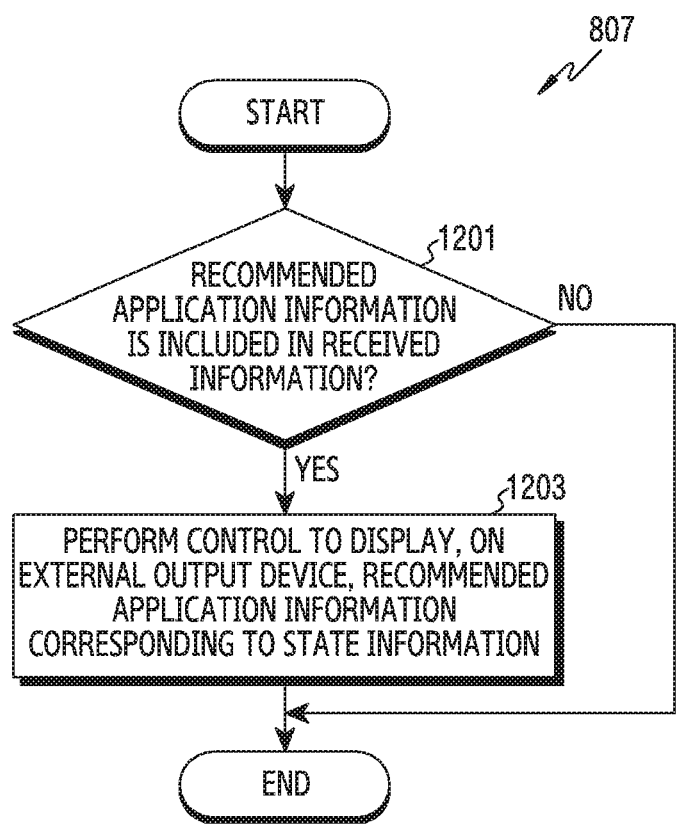
FIG. 12 is a flow diagram illustrating a list of recommended applications in an electronic device according to an embodiment of the disclosure.

FIG. 12 is a flow diagram illustrating a list of recommended applications in an electronic device according to an embodiment of the disclosure. Hereinafter, operation 807 of FIG. 8 will be described in detail. In the following embodiment, respective operations may be performed sequentially, but are not necessarily performed sequentially. For example, the respective operation sequences may be changed, and at least two operations may be performed in parallel. Here, the electronic device may be the electronic device 100 of FIG. 1, the electronic device 201 of FIG. 2, and/or the electronic device 401 of FIG. 4. Hereinafter, the operation procedure of FIG. 12 will be described with reference to FIGS. 13A and 13B.

Figure 13A:
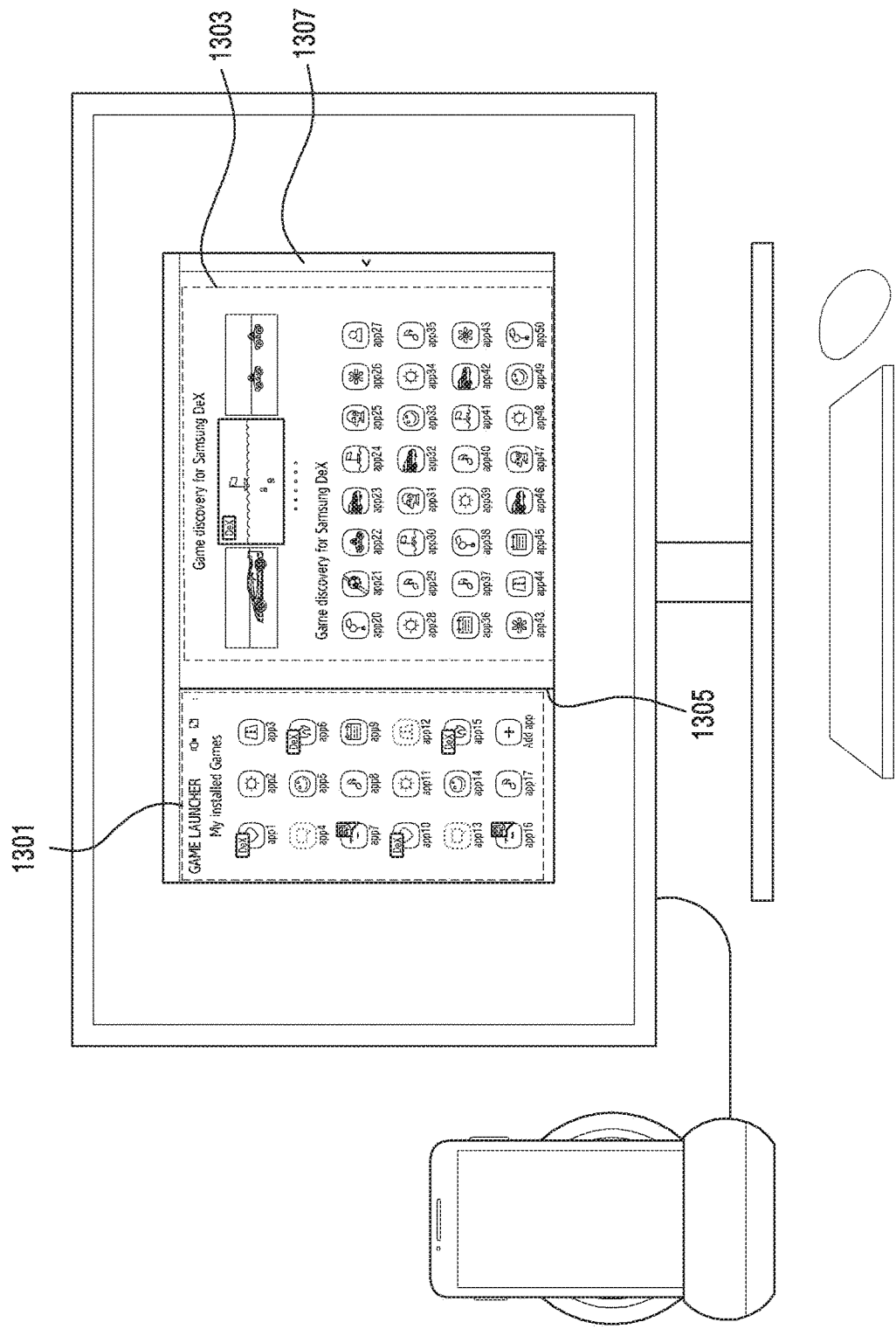
FIGS. 13A, 13B, and 13C illustrate a screen configuration for displaying a list of recommended applications in an electronic device according to an embodiment of the disclosure.
Figure 13B:
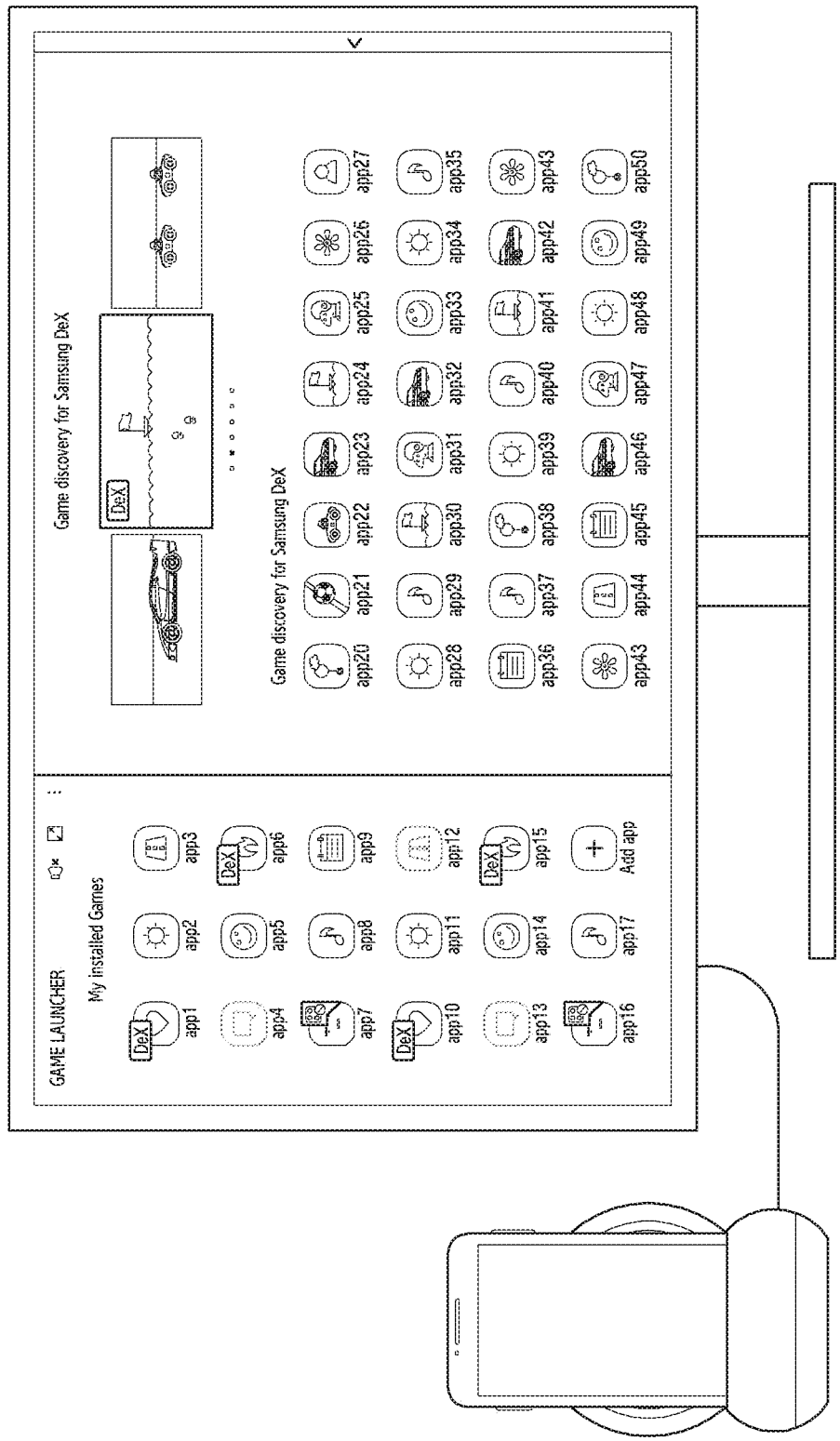
Figure 13C:
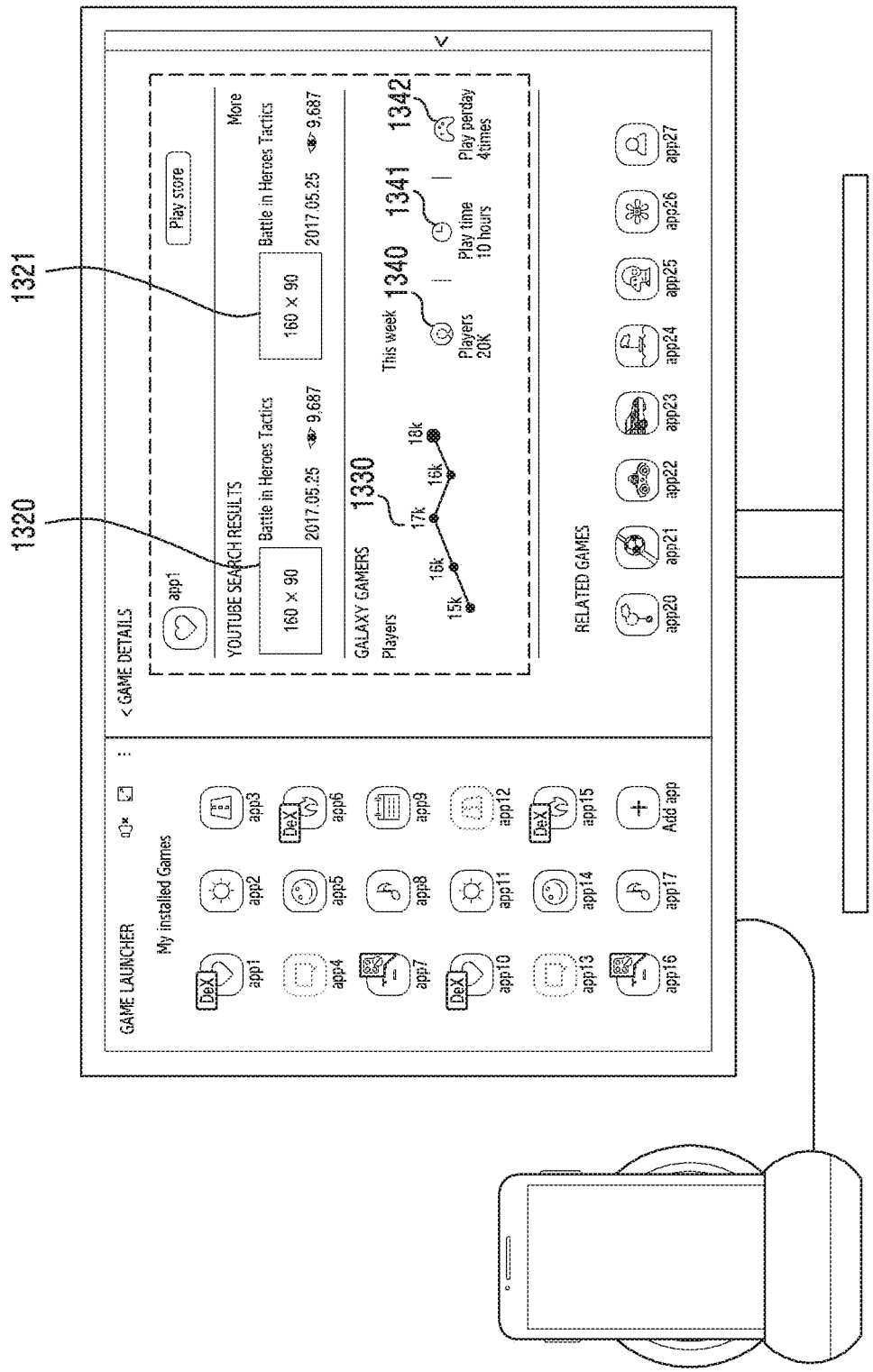

FIGS. 13A, 13B, and 13C show a screen configuration for displaying a list of recommended applications in an electronic device according to various embodiments of the disclosure.

Referring to FIGS. 12, 13A, 13B, and 13C, in operation 1201, the electronic device may determine whether the obtained information includes recommended application information. The obtained information may be information obtained by communicating with the server in operation 805 of FIG. 8.

When the information received from the server includes the recommended application information, in operation 1203, the electronic device may perform control to display the recommended application information on the external output device. According to various embodiments, a processor (e.g., the processor 220 or processor 420) may perform control to display, on the external output device, the recommended application information together with information indicating whether execution of the retention application is possible. For example, as shown in FIG. 13A, a processor (e.g., the processor 220 or processor 420) may perform control to display, on a monitor which is an external output device, a window including a retention application list 1301 indicating whether execution of the retention application is possible and a recommended application list 1303 including recommended application information. According to an embodiment, a processor (e.g., the processor 220 or processor 420) may adjust the size of an area in which the retention application list 1301 is displayed and the size of the area in which the recommended application list 1303 is displayed, based on a user input to a first area (e.g., first area 1305) previously designated in the window and/or a user input method. According to an embodiment, a processor (e.g., the processor 220 or processor 420) may perform control not to display the recommended application list 1303, based on a user input to a second area (e.g., second area 1307) previously designated in the window, and/or a user input method. The processor (e.g., the processor 220 or processor 420) may adjust the window size based on the user input. For example, as shown in FIG. 13B, a processor (e.g., the processor 220 or processor 420) may adjust the window size such that the window containing the retention application list and the recommended application list occupies the entire screen area. According to an embodiment, information on the application may include a type of a recommended application, a recommended application name, a package name of a recommended application, a video related to execution of a recommended application, the number of users who have used a recommended application, a graph representing a change in the number of users who have executed or installed a recommended application, the number of users who have used a recommended application for a certain period of time, an average execution time of a recommended application, an average execution time of a recommended application during a certain period of time, the average number of times of execution of a recommended application during a certain period of time, or a combination thereof. For example, as shown in FIG. 13C, a processor (e.g., the processor 220 or processor 420) may perform control to display, in an area including a recommended application list and on a monitor which is an external output device, videos 1320 and 1321 associated with execution of a recommended, a graph 1330 representing a change in the number of users who have executed or installed a recommended application, a number of users 1340 who have executed a recommended application for a certain period of time, an average execution time 1341 of a recommended application for a certain period of time, and an average number 1342 of times of execution of a recommended application for a certain period of time. According to an embodiment, the recommended application information may include a recommended application associated with at least one of: an external input device connected to the electronic device, an external output device, or user profile information. For example, the recommended application may include a recommended application in a case where the external input device is a keyboard, a recommended application in a case where the external input device is a joystick, a recommended application in a case where the external output device is a television, a recommended application in a case where the external output device is a monitor, a recommended application corresponding to a user age, a recommended application corresponding to the user's occupation, a recommended application corresponding to the user's gender, or a combination thereof.

Figure 14:
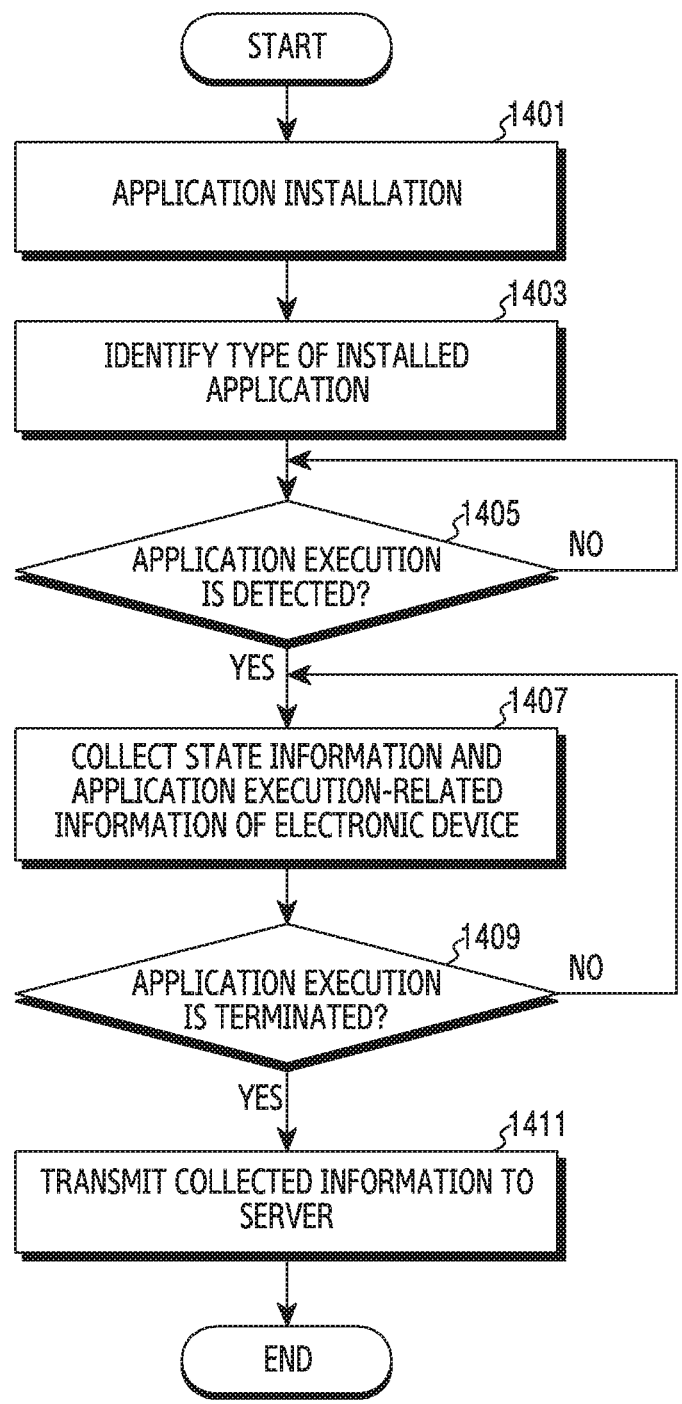
FIG. 14 is a flow diagram illustrating transmission of application execution-related information to a server, by an electronic device, according to an embodiment of the disclosure.

FIG. 14 is a flow diagram of transferring application execution-related information to an electronic device according to various embodiments of the disclosure. In the following embodiments, respective operations may be performed sequentially, but are not necessarily performed sequentially. For example, the respective operation sequences may be changed, and at least two operations may be performed in parallel. Here, the electronic device may be the electronic device 100 of FIG. 1, the electronic device 201 of FIG. 2, and/or the electronic device 401 of FIG. 4.

Referring to FIG. 14, in operation 1401, the electronic device may install an application. According to an embodiment, a processor (e.g., the processor 220 or processor 420) may download an application via a server and then install the downloaded application based on a user input.

In operation 1403, the electronic device may identify a type (or category) of application installed therein. According to an embodiment, a processor (e.g., the processor 220 or processor 420) may transmit an application type information request signal including application identification information to a server (e.g., the first server 120), and in response thereto, may receive information indicating the application type. The application identification information may include at least one of an application name, an application ID, and an application package name. According to an embodiment, a processor (e.g., the processor 220 or processor 420) may obtain information indicating an application type from a file (e.g., a manifest file) containing application-related information. According to an embodiment, upon downloading an application, a processor (e.g., the processor 220 or processor 420) may obtain category information of the corresponding application from a download server (e.g., the second server 130), and obtain application type information from the obtained category information. According to an embodiment, a processor (e.g., the processor 220 or the processor 420) may obtain application type information at a time point when an application installation event occurs, a time point when an information change event for the installed application is detected, or a preconfigured period.

In operation 1405, the electronic device may detect whether an application is being executed. According to an embodiment, a processor (e.g., the processor 220 or processor 420) may detect whether an application corresponding to a designated first type is being executed. The first type may indicate the type of applications, when executed, execution-related information of which should be reported. According to an embodiment, at least one application type among various application types may be designated as a first type by a service provider or a user. For example, a game type may be set as the first type. In another example, all application types may be set as the first type.

In response to detection of the execution of an application, in operation 1407, the electronic device may collect state information and application execution-related information of the electronic device. According to an embodiment, when execution of the application is detected, a processor (e.g., the processor 220 or processor 420) may obtain at least one of state information and application execution-related information of the electronic device, at a time point when the execution of the application is detected, at a time point when the execution of the application is terminated, or while an application is being executed. For example, the processor (e.g., the processor 220 or processor 420) may collect state information of the electronic device as described in operation 803 of FIG. 8. The application execution-related information may include at least one of: an application type (or category), user profile information of an application (e.g., gender, race, age, occupation, an area of interest, etc.), information on input generated while an application is being executed, an input device used for application execution, an application execution time, a frequency of application execution, an application execution pattern, whether an application is being executed, the screen size of an application execution screen, an application execution screen mode (e.g., landscape mode, portrait mode, etc.), whether an application has an audio output, information associated with an application error, information on exceptions, or a combination thereof.

In operation 1409, the electronic device may detect whether application execution is terminated. For example, the processor (e.g., the processor 220 or processor 420) may determine, based on a user input, whether an application execution terminate event is generated. When the application execution is not terminated, the processor (e.g., the processor 220 or processor 420) may continuously perform operation 1407. For example, a processor (e.g., the processor 220 or processor 420) may continuously collect application execution-related information until application execution is terminated.

In response to the termination of application execution, in operation 1411, the electronic device may transmit the collected information to the server. For example, the processor (e.g., the processor 220 or processor 420) may control a communication module (e.g., the communication module 460) to transmit state information and application execution-related information of the electronic device to the server.

In the above description, in response to the termination of application execution, the electronic device transmits state information and application execution-related information of the electronic device to the server. However, the disclosure is not limited thereto. For example, according to various embodiments of the disclosure, the electronic device may transmit, to the server, state information and application execution-related information at other time point than a time point when the application execution is terminated. According to an embodiment, the electronic device may control the communication module to transmit, to the server, the state information and application execution-related information of the electronic device at a time point when a preconfigured event is generated. For example, the preconfigured event may include at least one of a short-range wireless communication network connection event and an information transmission request event by a user input. According to an embodiment, the electronic device may perform control such that at least a part of information among the state information and the application execution-related information of the electronic device are transmitted to the server at a time point when the application execution starts, and the other part of information is transmitted to the server at a time when the application execution is terminated or at a time point when a preconfigured event occurs. According to an embodiment, the electronic device may perform control such that at least a part of the state information and the application execution-related information of the electronic device are periodically transmitted to the server while the application is being executed.

Figure 15:
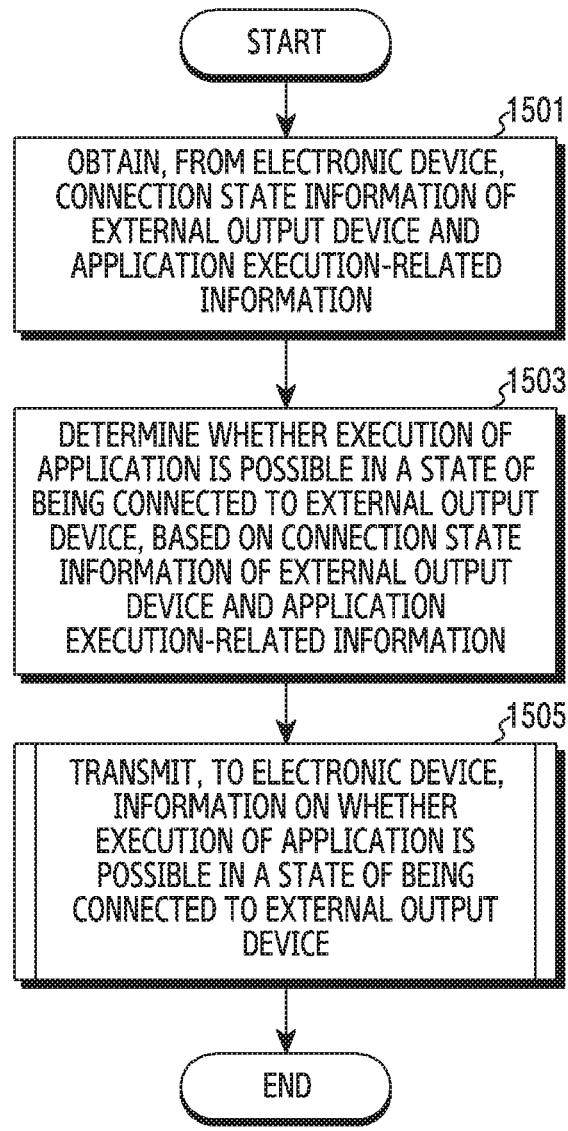
FIG. 15 is a flow diagram illustrating transmission of application classification information to an electronic device, by a server, according to an embodiment of the disclosure.

FIG. 15 is a flow diagram of transmitting application classification information to an electronic device by a server according to an embodiment of the disclosure. In the following embodiment, respective operations may be performed sequentially, but are not necessarily performed sequentially. For example, the order of respective operations may be changed, and at least two operations may be performed in parallel. Here, the server may be the first server 120 of FIG. 1 and/or the server 601 of FIG. 6.

Referring to FIG. 15, in operation 1501, a server may obtain connection state information of an external output device and application execution-related information, from at least one electronic device (e.g., the electronic device 100 or second external electronic device 140). According to an embodiment, a processor (e.g., the processor 620) may receive, from at least one electronic device (e.g., the electronic device 100 or second external electronic device 140), a signal including connection state information of an external output device and application execution-related information. The connection state information of the external output device may include information indicating whether the electronic device (e.g., the electronic device 100 or second external electronic device 140) is operating in a desktop extension mode. According to an embodiment, the server may further receive, from at least one electronic device (e.g., the electronic device 100 or second external electronic device 140), at least one of: identification information of an external output device connected thereto, information indicating whether an external input device is connected to an electronic device (e.g., the electronic device 100 or second external electronic device 140), identification information of a connected external input device, or a combination thereof. According to an embodiment, the server may further receive, from at least one electronic device (e.g., the electronic device 100 or second external electronic device 140), at least one of identification information of an electronic device (e.g., the electronic device 100 or external electronic device 140) and user profile information. The application execution-related information may include at least one of: an application type (or category), user profile information of the application (e.g., gender, race, age, occupation, an area of interest, etc.), input information generated while an application is being executed, an input device used for application execution, an application execution time, a frequency of application execution, an application execution pattern, whether an application is being executed, the screen size of application execution screen, an application execution screen mode (e.g., landscape mode, portrait mode, etc.), whether an application has an audio output, information associated with an application error, information on exceptions, or a combination thereof.

In operation 1503, the server may determine whether execution of at least one application is possible in a state of being connected to the external output device, based on connection state information of the external output device and application execution-related information. For example, a processor (e.g., the processor 620) may classify applications registered in the server into applications, executions of which are possible and applications, executions of which are impossible in a state of being connected to the external output device, based on the state information and application execution-related information of an electronic device (e.g., the electronic device 100 or second external electronic device 140), received from at least one electronic device (e.g., the electronic device 100 or second external electronic device 140). For example, the processor (e.g., the processor 620) may analyze application execution-related information associated with a state of being connected to the external output device to determine whether information associated with an application error exists. When there is no information associated with an application error, the processor (e.g., the processor 620) may determine the application as an application that can be executed in a state of being connected to the external output device. When information associated with the application error exists, the processor (e.g., the processor 620) may determine the application as an application that cannot be executed in a state of being connected to the external output device. According to an embodiment, in relation to each of the applications determined to be executable in a state of being connected to the external output device, a processor (e.g., the processor 620) may determine information associated with the suitability of execution in a state of being connected to the external output device, based on the state information and application execution-related information of an electronic device (e.g., the electronic device 100 or second external electronic device 140), received from at least one electronic device (e.g., the electronic device 100 or second external electronic device 140). For example, in relation to each of the applications executable in a state of being connected to the external output device, the processor (e.g., the processor 620) may determine information indicating whether the application is suitable for a state of being connected to the external output device or the suitability of application execution in a state of being connected to the external output device. Whether the application is suitable for a state of being connected to the external output device or the suitability of execution in a state of being connected to the external output device may be determined based on at least one of an execution time, a frequency of execution, an execution pattern, the size of an execution screen, an execution screen mode, and an input means in electronic devices (e.g., the electronic device 100 or electronic device 201) while being connected to an external output device. According to an embodiment, a processor (e.g., the processor 620) may determine at least one recommended application relating to a state of being connected to the external output device, based on the application execution-related information and state information of the electronic device (e.g., the electronic device 100 or second external electronic device 140), which are received from at least one electronic device (e.g., the electronic device 100 or second external electronic device 140). The recommended application may include at least one of an application that is normally executable in a state of being connected to the external output device, an application having a high frequency of execution in a state of being connected to the external output device, an application having a long average execution time in a state of being connected to an external output device, and an application executable in a full-screen mode in a state of being connected to an external output device. According to an embodiment, the processor (e.g., the processor 620) may classify a recommended application based on at least one of an external input device, an external output device, or user profile information.

In operation 1505, the server may transmit, to the electronic device (e.g., the electronic device 100 or electronic device 201), information indicating whether execution of at least one application is possible in a state of being connected to the external output device. According to an embodiment, a processor (e.g., the processor 620) may receive an application-related information transmission request signal from an electronic device (e.g., the electronic device 100 or electronic device 201), and in response thereto, may transmit, to the electronic device (e.g., the electronic device 100 or electronic device 201), information indicating whether execution of at least one application is possible in a state of being connected to the external output device. According to an embodiment, a processor (e.g., the processor 620) may receive, from the electronic device (e.g., the electronic device 100 or electronic device 201), a first signal including state information of the electronic device (e.g., the electronic device 100 or electronic device 201) and identification information of at least one application installed in the electronic device (e.g., the electronic device 100 or electronic device 201), and in response thereto, may transmit, to the electronic device (e.g., the electronic device 100 or electronic device 201), a first response signal including information on whether execution of at least one application installed in the electronic device (e.g., the electronic device 100 or electronic device 201) is possible. According to an embodiment, the first response signal may further include information indicating an application that is suitable to be executed using an external input device (e.g., the external input device 106) that is currently connected to the electronic device (e.g., the electronic device 100 or electronic device 201), among applications installed in the electronic device (e.g., the electronic device 100 or electronic device 201). According to an embodiment, a processor (e.g., the processor 620) may receive, from the electronic device (e.g., the electronic device 100 or electronic device 201), a second signal including identification information of at least one application installed in the electronic device (e.g., the electronic device 100 or the electronic device 201), and in response thereto, may transmit, to another electronic device, a second response signal including information on whether at least one application is executable in each state of the electronic device (e.g., the electronic device 100 or electronic device 201). According to an embodiment, the second response signal may further include information indicating which external input device is suitable for executing applications installed in the electronic device (e.g., the electronic device 100 or electronic device 201). According to an embodiment, the first response signal and/or second response signal may further include information associated with the suitability of execution of applications executable in a state of being connected to the external output device. According to an embodiment, the first response signal and/or the second response signal may further include recommended application information in a state of being connected to the external output device. According to an embodiment, in operation 1505, the electronic device (e.g., the electronic device 100 or electronic device 201) may be an electronic device which has transmitted, to the server, a state of connection with the external output device and application execution-related information.

Figure 16:
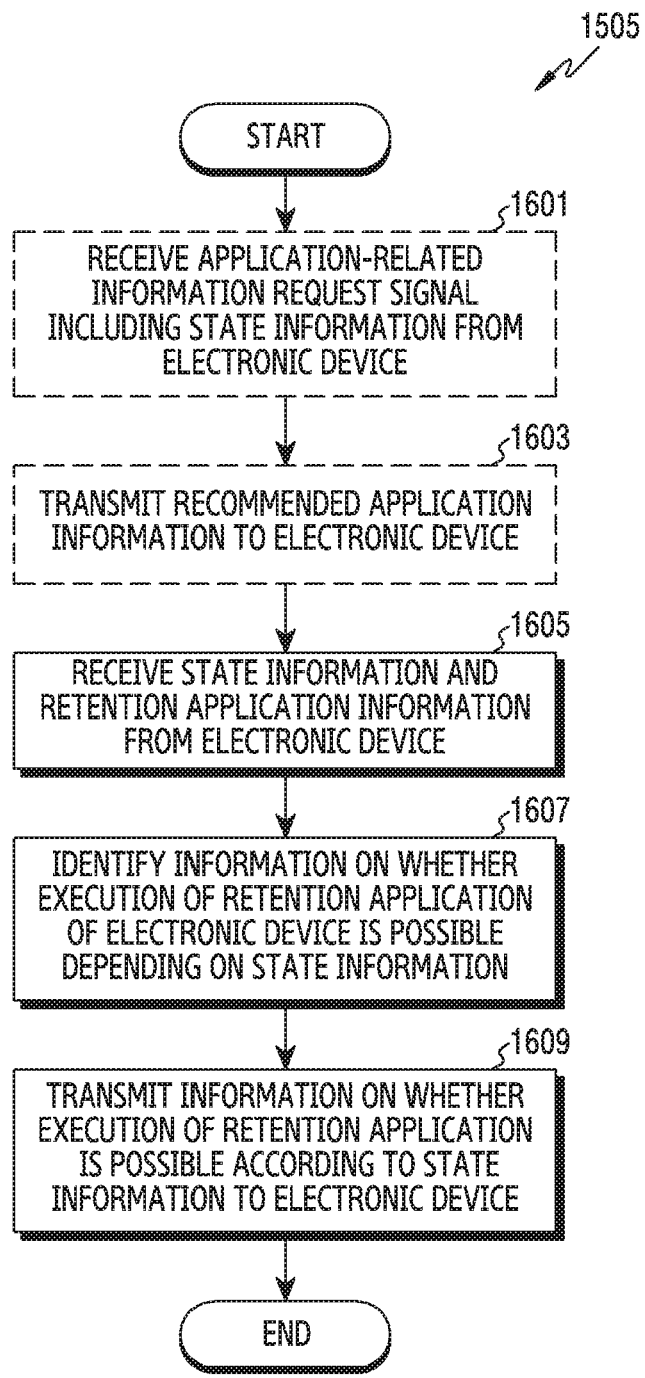
FIG. 16 is a flow diagram illustrating transmission of application-related information to an electronic device, by a server, according to an embodiment of the disclosure.

FIG. 16 is a flow diagram illustrating transmission of application-related information from a server to an electronic device according to an embodiment of the disclosure. In the following embodiment, respective operations may be performed sequentially, but are not necessarily performed sequentially. For example, the respective operation sequences may be changed, and at least two operations may be performed in parallel. The operation indicated by the dotted line in FIG. 16 may be omitted according to an embodiment. Here, a server may be the first server 120 of FIG. 1, and/or the server 601 of FIG. 6.

Referring to FIG. 16, in operation 1601, the server may receive an application-related information request signal including state information from an electronic device (e.g., the electronic device 100 or electronic device 201). According to an embodiment, a processor (e.g., the processor 620) may receive an application-related information request signal including information indicating that the electronic device (e.g., the electronic device 100 or electronic device 201) is in a state of being connected to an external output device. The information indicating that the electronic device (e.g., the electronic device 100 or electronic device 201) is in a state of being connected to the external output device may include information indicating that the electronic device (e.g., the electronic device 100 or electronic device 201) is operating in a desk extension mode. The application-related information request signal may be a signal requesting information of a recommended application associated with the state of the electronic device (e.g., the electronic device 100 or electronic device 201). According to an embodiment, the processor (e.g., the processor 620) may transmit, to the server, the application-related information request signal including at least one of information indicating that the electronic device (e.g., the electronic device 100 or electronic device 201) is in a state of being connected to the external output device, identification information of the external output device, information indicating that the electronic device (e.g., the electronic device 100 or electronic device 201) is in a state of being connected to the external input device, and identification information of the external input device. According to an embodiment, the application-related information request signal may include at least one of the identification information of the electronic device (e.g., the electronic device 100 or electronic device 201) and the user profile information, in addition to the state information.

In operation 1603, the server may transmit recommended application information to the electronic device (e.g., the electronic device 100 or electronic device 201). According to an embodiment, in response to reception of the application-related information request signal, a processor (e.g., the processor 620) may transmit, recommendation application information based on state information of the electronic device (e.g., the electronic device 100 or electronic device 201) to the electronic device (e.g., the electronic device 100 or electronic device 201). For example, the processor (e.g., the processor 620) may transmit information on the recommended applications corresponding to the state of the electronic device (e.g., the electronic device 100 or electronic device 201) to the electronic device (e.g., the electronic device 100 or electronic device 201), based on the state information received from the electronic device (e.g., the electronic device 100 or electronic device 201). According to an embodiment, the recommended application information may include information on recommended applications associated with an external output device connected to an electronic device (e.g., the electronic device 100 or electronic device 201), information on recommendation applications associated with an external input device connected to the electronic device (e.g., the electronic device 100 or electronic device 201), information on recommendation applications associated with a user profile, or a combination thereof.

In operation 1605, the server may receive state information and retention application information from the electronic device (e.g., the electronic device 100 or electronic device 201). According to an embodiment, the processor (e.g., the processor 620) may receive state information and retention application information, which are not received in operation 1601, from among the state information of the electronic device (e.g., the electronic device 100 or electronic device 201). For example, in operation 1601, when information indicating that the electronic device (e.g., the electronic device 100 or electronic device 201) is in a state of being connected to the external output device is received only as the state information of the electronic device (e.g., the electronic device 100 or electronic device 201), in operation 1605, the processor (e.g., the processor 620) may further receive retention application information and at least one of: identification information of the external output device, information indicating that an external input device is connected to the electronic device (e.g., the electronic device 100 or electronic device 201), and identification information of the external input device. The retention application information may include identification information of at least one application installed in the electronic device. The identification information of the application may include at least one of an application name, an application ID, and an application package name. According to an embodiment, the processor (e.g., the processor 620) may receive all pieces of state information of the electronic device in operation 1601, and then may receive only the retention application information in operation 1605.

In operation 1607, the server may identify information on whether execution of the retention application of the electronic device (e.g., the electronic device 100 or electronic device 201) is possible depending on the state information. For example, based on information determined in operation 1503 of FIG. 15, the processor (e.g., the processor 620) may determine whether executions of the retention applications of the electronic device (e.g., the electronic device 100 or electronic device 201) are possible according to the state information of the electronic device (e.g., the electronic device 100 or electronic device 201).

In operation 1609, the server may transmit information on whether execution of the retention application is possible according to the state information to the electronic device (e.g., the electronic device 100 or electronic device 201). According to an embodiment, in response to reception of the state information and the retention application information from the electronic device (e.g., the electronic device 100 or electronic device 201), a processor (e.g., the processor 620) may transmit, to an electronic device (e.g., the electronic device 100 or electronic device 201), a response signal including information on whether execution of an application is possible according to state information. According to an embodiment, the response signal may be configured to be the same as the response signal described in operation 1007 of FIG. 10.

Figure 17:
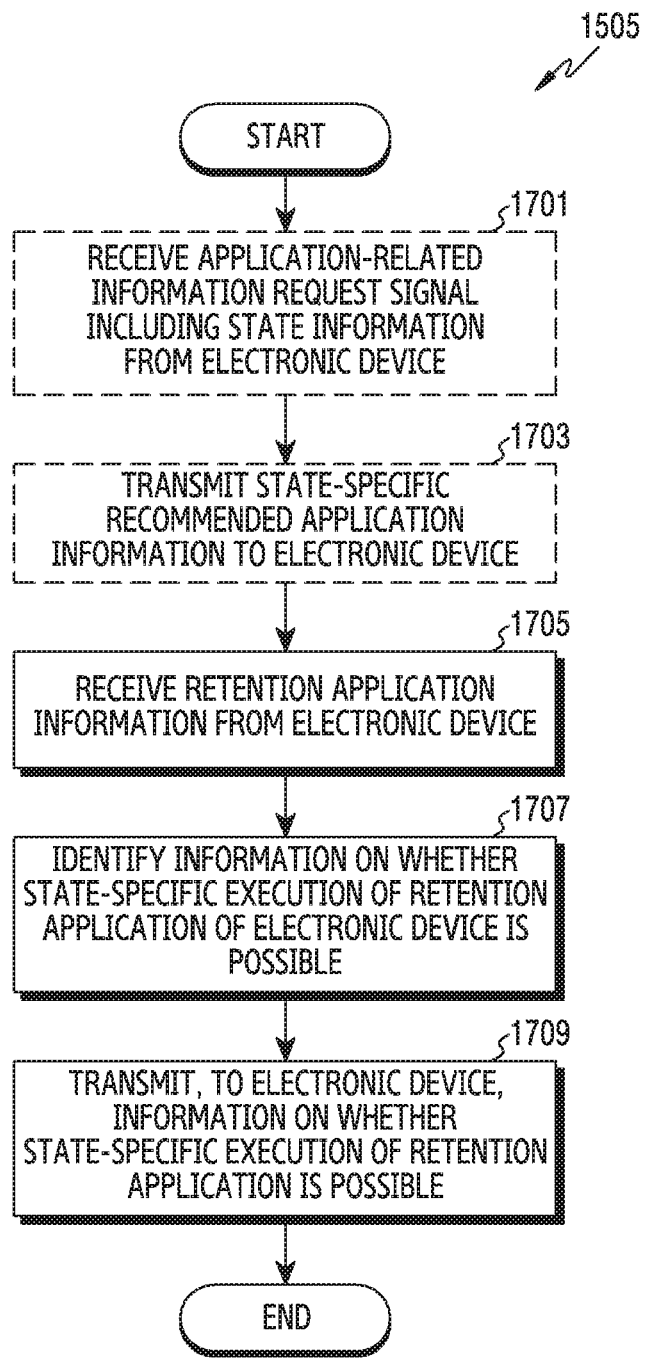
FIG. 17 is a flow diagram illustrating transmission of application-related information to an electronic device, by a server, according to an embodiment of the disclosure.

FIG. 17 is a flow diagram illustrating transmission of application-related information from a server to an electronic device according to an embodiment of the disclosure. In the following embodiment, respective operations may be performed sequentially, but are not necessarily performed sequentially. For example, the respective operation sequences may be changed, and at least two operations may be performed in parallel. The operation indicated by the dotted line in FIG. 17 may be omitted according to an embodiment. Here, the server may be the first server 120 of FIG. 1, and/or the server 601 of FIG. 6.

Referring to FIG. 17, in operation 1701, the server may receive an application-related information request signal from an electronic device (e.g., the electronic device 100 or electronic device 201). According to an embodiment, the application-related information request signal may include at least one of electronic device identification information and user profile information. The application-related information request signal may be a signal for requesting information of the recommended application.

In operation 1703, the server may transmit state specific-recommended application information to the electronic device (e.g., the electronic device 100 or electronic device 201). According to an embodiment, in response to reception of the application-related information request signal, a processor (e.g., the processor 620) may transmit recommended application information corresponding to various states. For example, the recommended application information may be configured to be the same as the recommended application information described in operation 1103 of FIG. 11.

In operation 1705, the server may receive retention application information from the electronic device (e.g., the electronic device 100 or electronic device 201). According to an embodiment, a processor (e.g., the processor 620) may receive, from the electronic device (e.g., the electronic device 100 or electronic device 201), information on an application installed in the electronic device (e.g., the electronic device 100 or electronic device 201). The retention application information may include identification information of at least one application installed in the electronic device (e.g., the electronic device 100 or electronic device 201).

In operation 1707, the server may identify information on whether state-specific execution of the retention application of the electronic device (e.g., the electronic device 100 or electronic device 201) is possible. For example, the processor (e.g., the processor 620) may identify whether state-specific execution of the retention applications of the electronic device (e.g., the electronic device 100 or electronic device 201) is possible, based on the information determined in operation 1503 of FIG. 15.

In operation 1709, the server may transmit, to the electronic device (e.g., the electronic device 100 or electronic device 201), information on whether state-specific execution of the retention application is possible. According to an embodiment, in response to reception of the retention application information of the electronic device (e.g., the electronic device 100 or electronic device 201) from the electronic device (e.g., the electronic device 100 or electronic device 201), a processor (e.g., the processor 620) may transmit, to the electronic device (e.g., the electronic device 100 or electronic device 201), a response signal including information on whether state-specific execution of the application is possible. According to an embodiment, the response signal may be configured to be the same as the response signal described in operation 1007 of FIG. 10.

Figure 18:
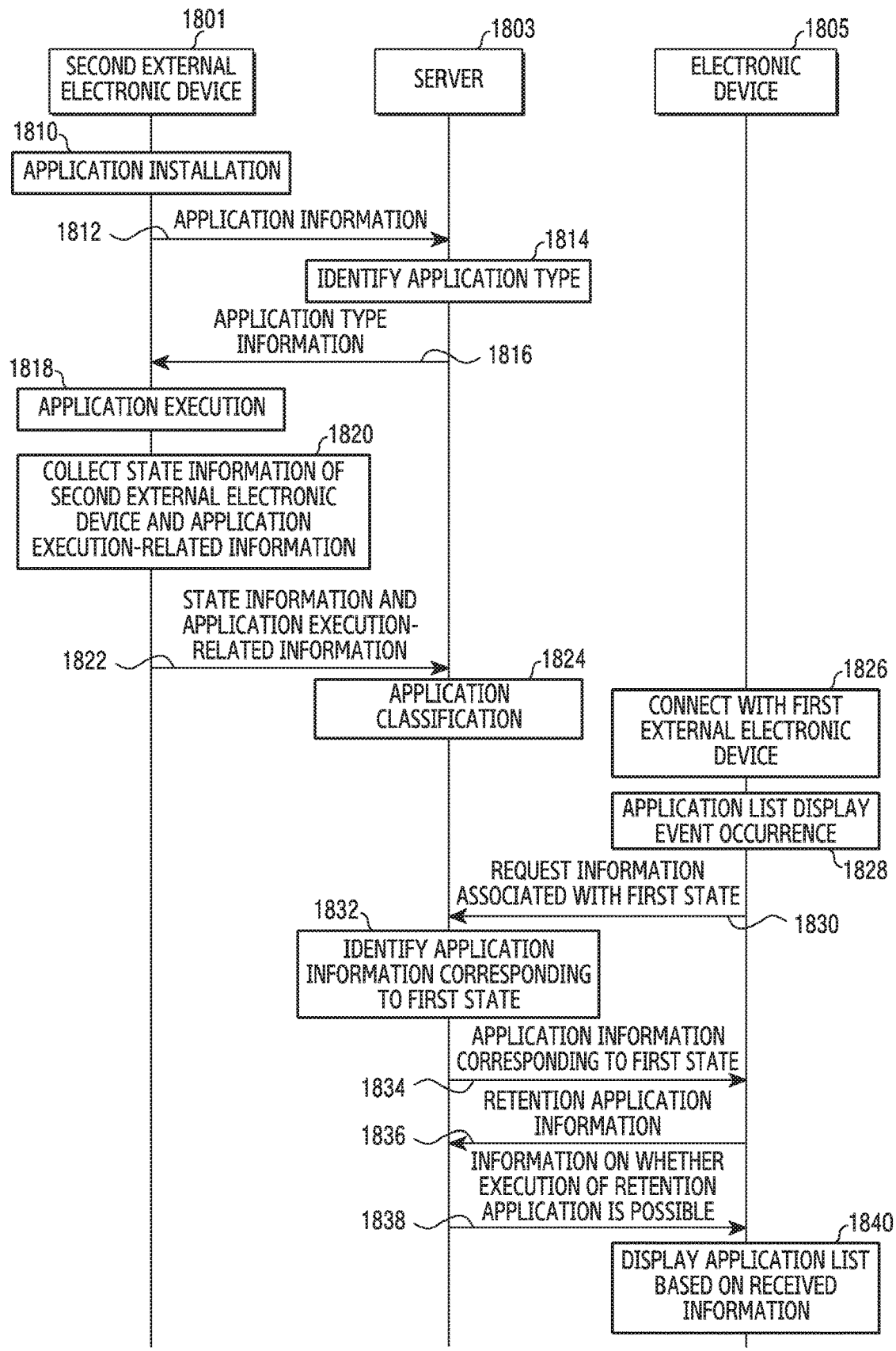
FIG. 18 illustrates a signal flow for displaying a list of applications on an electronic device in a system according to an embodiment of the disclosure.

FIG. 18 illustrates a signal flow for displaying a list of applications on an electronic device in a system according to an embodiment of the disclosure. In the following embodiment, respective operations may be performed sequentially, but are not necessarily performed sequentially. For example, the respective operation sequences may be changed, and at least two operations may be performed in parallel. Here, the server 1803 may be the first server 120 of FIG. 1 and/or the server 601 of FIG. 6, and electronic device 1805 may be the electronic device 100 of FIG. 1, the electronic device 201 of FIG. 2, and/or the electronic device 401 of FIG. 4. A second external electronic device 1801 may be the second external electronic device 140 of FIG. 1. At least one second external electronic device may exist.

Referring to FIG. 18, at least one second external electronic device (e.g., second external electronic device 1801) may install an application in operation 1810, and transmit application information to a server 1803, in operation 1812. According to an embodiment, when there is a plurality of second external electronic devices, an application installation time point and/or application information transmission time point of each of the second external electronic devices may be different from each other.

In operation 1814, the server 1803 may identify the type of an application installed in the second external electronic device 1801, based on the application information received from at least one second external electronic device. In operation 1816, the server 1803 may transmit application type information to the second external electronic device 1801. According to an embodiment, when there is a plurality of second external electronic devices, a time point at which the server 1803 transmits the application type information to each of the second external electronic devices may be different according to a time point at which each of the second external electronic devices has transmitted the application information to the server 1803.

In operation 1818, at least one second external electronic device (e.g., the second external electronic device 1801) may detect application execution, and in operation 1820, may collect state information and application execution-related information of the application, execution of which is detected. According to an embodiment, an application execution detection time point and/or information collection time point of each of the second external electronic devices may be different from each other. When an application corresponding to a predetermined type is being executed, each of the second external electronic devices may collect application execution-related information for the executed application.

At least one second external electronic device (e.g., the second external electronic device 1801) may transmit, to the server 1803, state information and application execution-related information, collected in operation 1820, in operation 1822. According to an embodiment, the collected information transmission time point of each of the second external electronic devices may be different from each other. According to an embodiment, each of the second external electronic devices may transmit at least a part of the state information and application execution-related information to the server 1803, at least one of a time point among a time point at which application execution starts, a time point at which application execution terminates, a time point at which a preconfigured event is generated, or a time point at which an application is being executed.

In operation 1824, the server 1803 may classify applications based on the state information and application execution-related information, received from the at least one second external electronic device (e.g., the second external electronic device 1801). The server 1803 may accumulate state information and application execution-related information, received from at least one second external electronic device during a predetermined time interval, and classify the applications based on the accumulated information. The server 1803 may classify applications at each time when state information and application execution-related information are received from the second external electronic device 1801, so as to update information associated with the application classification. The application classification may include at least one piece of information executable in each state of the electronic device and recommended application information for each state of the electronic device.

In operation 1826, the electronic device 1805 may detect a connection with a first external electronic device (e.g., the external output device 104 or external input device 106). For example, the electronic device 1805 may detect that the external output device 104 is directly connected or connected through a docking device. When the first external electronic device is connected, the electronic device 1805 may operate in a desktop extension mode.

In operation 1828, the electronic device 1805 may detect that an application list display event occurs. For example, when detecting an input for executing a launcher application that manages a particular type of application, the electronic device 1805 may determine that an application list display event has occurred.

In operation 1830, the electronic device 1805 may transmit a signal requesting information associated with a first state to the server 1803. The first state may be a state where the electronic device 1805 and the external output device 104 are connected. For example, the electronic device may transmit a signal requesting recommended application information associated with the state of being connected to the external output device 104.

In operation 1832, the server 1803 may identify application information corresponding to the first state, and in operation 1834, may transmit the identified application information to the electronic device 1805. For example, the server 1803 may identify recommended applications that are executable in the first state, and may transmit information on the identified recommended applications to the electronic device 1805.

In operation 1836, the electronic device 1805 may transmit information on a retention application of the electronic device 1805 to the server 1803. For example, the electronic device 1805 may transmit identification information of the retention application to the server 1803.

In operation 1838, the server 1803 may transmit, to the electronic device 1805, information indicating whether execution of the retention application is possible For example, based on the result of classifying applications in operation 1824, the server 1803 may transmit, to the electronic device 1805, information whether execution of each of the applications installed in the electronic device 1805 is possible in a first state and information indicating the suitability of execution in the first state.

In operation 1840, the electronic device 1805 may display a list of applications on the display of the first external electronic device, based on the received information. For example, the electronic device 1805 may generate a list of applications based on the information received in operation 1834 and the information received in operation 1838. The generated application list may include an application that can be executed in a first state and an application that cannot be executed in the first state, and/or information on a recommended application information associated with the first state.

Figure 19:
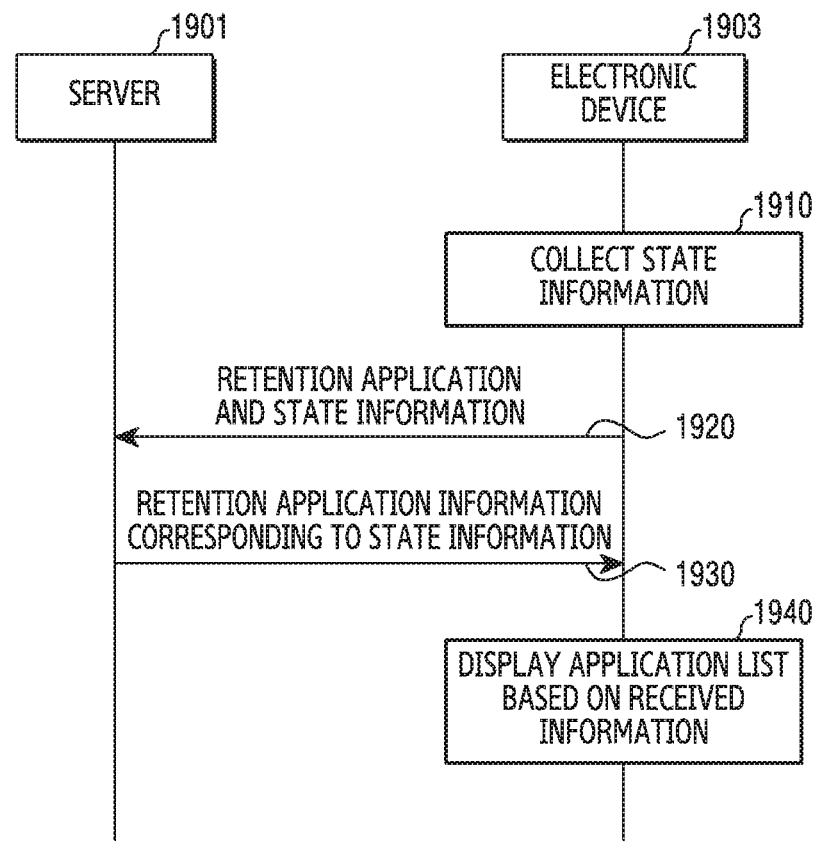
FIG. 19 illustrates a signal flow for displaying a list of applications on an electronic device in a system according to an embodiment of the disclosure.

FIG. 19 illustrates a signal flow for displaying a list of applications on an electronic device in a system according to an embodiment of the disclosure. FIG. 19 is an embodiment of operations of an electronic device and a server. In the following embodiment, respective operations may be performed sequentially, but are not necessarily performed sequentially. For example, the respective operation sequences may be changed, and at least two operations may be performed in parallel. Here, a server 1901 may be the first server 120 of FIG. 1, the server 601 of FIG. 6, and the server 208 of FIG. 2, and an electronic device 1903 may be the electronic device 100 of FIG. 1, the electronic device 201 of FIG. 2, and/or the electronic device 401 of FIG. 4.

Referring to FIG. 19, in operation 1910, the electronic device 1903 may collect state information. For example, the electronic device 1903 may collect state information including at least one of: whether to connect to an external output device, whether to connect to an external input device, identification information of a connected external output device, identification information of a connected external input device, or a combination thereof.

In operation 1920, the electronic device 1903 may transmit retention application information and collected state information to the server 1901. For example, the electronic device 1903 may transmit, to the server 1901, identification information of at least one application installed in the electronic device 1903 and the collected state information.

In operation 1930, the server 1901 may transmit, to the electronic device 1903, information on whether execution of the retention application corresponding to the state information is possible. For example, when the state information received from the electronic device 1903 indicates that the electronic device 1903 is connected to a monitor, which is an external output device, and a keyboard, which is an external input device, the server 1901 may transmit, to the electronic device 1903, information indicating whether execution of each retention application installed in the electronic device 1903 is possible in a state of being connected to the external output device.

In operation 1940, the electronic device 1903 may display a list of applications on the display of the external electronic device, based on the received information. For example, the electronic device 1903 may generate a list of applications based on information indicating whether execution of a retention application is possible in a state of being connected to the external output device and the suitability of execution thereof. The generated application list may be configured as shown in FIG. 9A, 9B, 9C, 9D, 13A, 13B, or 13C.

Figure 20:
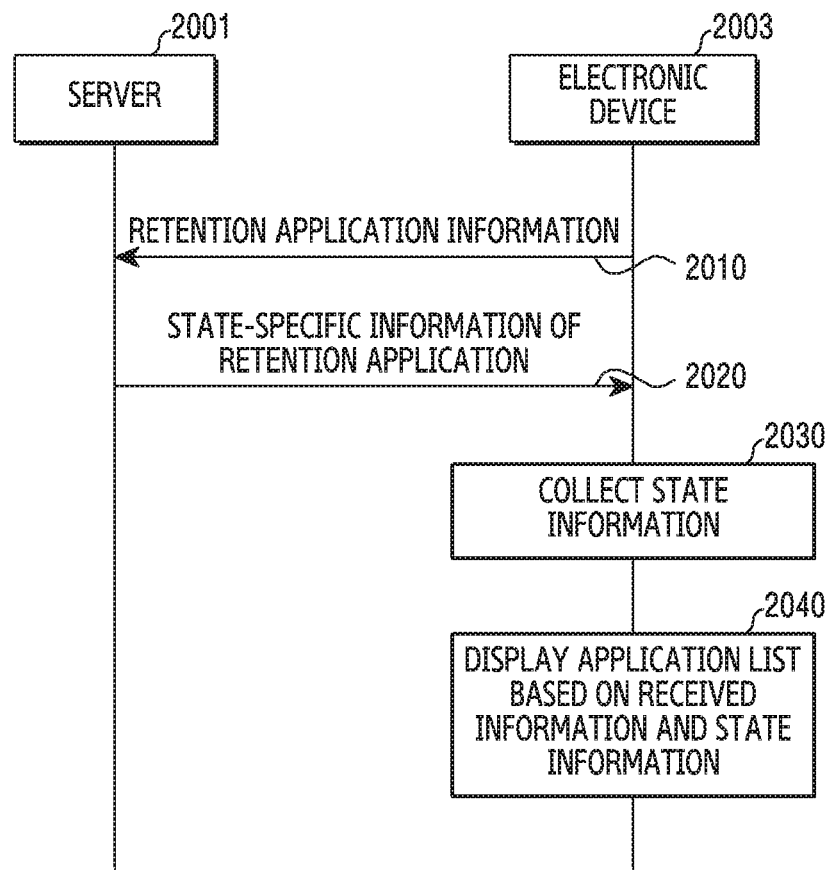
FIG. 20 illustrates a signal flow for displaying a list of applications on an electronic device in a system according to an embodiment of the disclosure.

FIG. 20 illustrates a signal flow for displaying a list of applications on an electronic device in a system according to an embodiment of the disclosure. FIG. 20 is an embodiment of operations of an electronic device and a server. In the following embodiment, respective operations may be performed sequentially, but are not necessarily performed sequentially. For example, the respective operation sequences may be changed, and at least two operations may be performed in parallel. Here, server 2001 may be the first server 120 of FIG. 1 and/or the server 601 of FIG. 6, and electronic device 2003 may be the electronic device 100 of FIG. 1, the electronic device 201 of FIG. 2, and/or the electronic device 401 of FIG. 4.

Referring to FIG. 20, in operation 2010, the electronic device 2003 may transmit retention application information to the server 2001. For example, the electronic device 2003 may transmit identification information of at least one application installed in the electronic device 2003 to the server 2001.

In operation 2020, the server 2001 may transmit, to the electronic device 2003, information whether state-specific execution of a retention application is possible. For example, the server 2001 may transmit, to the electronic device 2003, information indicating whether execution of each of retention applications installed in the electronic device 2003 is possible in a state of being connected to the external output device, and information indicating whether execution of each of retention applications installed in the electronic device 2003 is possible in a state of not being connected to the external electronic device.

In operation 2030, the electronic device 2003 may collect state information. For example, the electronic device 2003 may collect state information including: whether to connect to an external output device, whether to connect to an external input device, identification information of a connected external output device, identification information of a connected external input device, or a combination thereof. According to an embodiment, the electronic device 2003 may collect state information from the server 2001 before information on whether state-specific execution of the retention application is possible is received.

In operation 2040, the electronic device 2003 may display a list of applications on the display of the external electronic device based on the received information and the collected state information. For example, the second electronic device 1903 may extract information corresponding to the collected state information, from the information on whether state-specific execution of the retention application is possible, received in operation 2020, and may generate an application list based on the extracted information. The generated application list may be configured as shown in FIG. 9A, 9B, 9C, 9D, 13A, 13B, or 13C.

According to various embodiments of the disclosure, an operation method for an electronic device (e.g., the electronic device 401) may include operations of: detecting a display event for at least one application; in response to detection of the display event, determining whether the electronic device is in a state of being connected to an external output device through an interface (e.g., the interface 450); in response to the connected state with the external output device, determining whether execution of at least one application is possible, based on a state of connection with the external output device; and displaying, on the external output device, the information indicating whether execution of the at least one application is possible.

According to various embodiments of the disclosure, the determining of whether execution of the at least one application is possible may include an operation of receiving, from a server (e.g., the server 601), information indicating whether execution of the at least one application is possible in a state of being connected to the external output device and information on at least one recommended application that can be executed in a state of being connected to the external output device, wherein the received information of the recommended application is displayed on the external output device.

According to various embodiments of the disclosure, an operation method of the electronic device (e.g., the electronic device 401) may further include operations of: detecting an execution of the at least one application; in response to detection of execution of the application, obtaining state information indicating whether the electronic device and the external output device are connected and information related to execution of the application; and transmitting, to a server, the obtained state information of the electronic device and the obtained information related to execution of the application.

According to various embodiments of the disclosure, the state information may include at least one of: information indicating whether the electronic device (e.g., the electronic device 401) is connected to an external input device, identification information of the external output device connected to the electronic device, and identification information of an external input device connected to the electronic device.

According to various embodiments of the disclosure, the information related to execution of the application may include at least one of: user profile information, an application type, input information generated while an application is being executed, an input device used for application execution, an application execution time, a frequency of application execution, an application execution pattern, whether an application is being executed, a screen size of an application execution screen, an application execution screen mode, whether an application has an audio output, information associate with an application error, or information on exceptions.

According to various embodiments of the disclosure, an operation method of a server (e.g., the server 601) may include operations of: obtaining, from at least one electronic device, connection state information of an external output device and application execution-related information; determining whether execution of the at least one application is possible in a state of being connected to the external output device, based on the connection state information of the external output device and the application execution-related information; and transmitting, to another electronic device (e.g., the electronic device 401), information on whether execution of the at least one application is possible in a state of being connected to the external output device.

According to various embodiments of the disclosure, the method may further include transmitting, to another electronic device (e.g., the electronic device 401), information on at least one application, execution of which is possible in a state of being connected to the external output device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a first surface and a second surface oriented in a direction opposite to the first surface;
   a touch screen display exposed through a portion of the first surface;
   at least one communication circuit;
   at least one processor electrically connected to the at least one communication circuit and the touch screen display; and
   a memory electrically connected to the at least one processor,
   wherein the memory is configured to store a plurality of application programs downloaded through the at least one communication circuit, the plurality of application programs including a first application program having a first user interface and a second application program having a second user interface, and wherein the memory stores instructions which, when executed, cause the at least one processor to:
- control to receive information related to the first application program from an external server through the at least one communication circuit,
- in a first operation, control to display, on the touch screen display, a plurality of first icons, wherein the plurality of first icons include a first application icon representing the first application program and a second application icon representing the second application program, wherein, when a first user input for selecting the first application icon is received, control to display the first user interface on the touch screen display according to a first set of display properties, and wherein, when a second user input for selecting the second application icon is received, control to display the second user interface on the touch screen display according to the first set of display properties, and
- in a second operation performed while the electronic device is electrically connected to an external display device through the at least one communication circuit, control the external display device to display a first window including a plurality of second icons, wherein the plurality of second icons include a third icon representing the first application program, the third icon including at least a portion of the first application icon and an indication indicating that the first application program has been changed to be executed in the second operation, based on at least a part of the information related to the first application program received from the server, and
- wherein, when a third user input for selecting the third icon is received, control to:
  - display, on the external display device, a third user interface, which has been changed according to the second operation, according to a second set of display properties, and
  - display, on the external display device, a second window containing usage information associated with the first application program, and wherein the usage information is received from the external server.

2. The electronic device of claim 1, wherein the first set of display properties and the second set of display properties differ in at least one of resolution, display size, density, or direction.

3. The electronic device of claim 1, wherein the instructions further cause the at least one processor to control to prevent the first application icon from indicating the first set of display properties.

4. The electronic device of claim 1,
wherein the plurality of second icons further comprise the second application icon, and
wherein the instructions further cause the at least one processor to, in the second operation, when a fourth user input for selecting the second application icon is received, control to display the second user interface on the external display device according to the first set of display properties.

5. The electronic device of claim 1, wherein the first application program and the second application program comprise a game application program.

6. The electronic device of claim 5, wherein the instructions further cause the at least one processor to provide information related to operations of the first application program and the second application program, being executed in the second operation, to the external server through the at least one communication circuit.

7. The electronic device of claim 6, wherein the information related to operations of the first application program and the second application program includes at least one of an application type, user profile information, an input device used for application execution, an execution time, a frequency of execution, an execution screen size, an execution screen mode, whether an application has an audio output, or information related to an application error.

* * * * *